(12) United States Patent
Letukas et al.

(10) Patent No.: US 12,240,552 B2
(45) Date of Patent: Mar. 4, 2025

(54) MOBILITY VEHICLE

(71) Applicant: PRIDE MOBILITY PRODUCTS CORPORATION, Duryea, PA (US)

(72) Inventors: Anthony Letukas, Dallas, PA (US); Robert William Davies, Mountaintop, PA (US); Nicholas E. Kuzma, Dallas, PA (US); Stephen Antonishak, Alden, PA (US); James P. Mulhern, Nanticoke, PA (US)

(73) Assignee: PRIDE MOBILITY PRODUCTS CORPORATION, Duryea, PA (US)

( * ) Notice: Subject to any disclaimer, the term of this patent is extended or adjusted under 35 U.S.C. 154(b) by 0 days.

(21) Appl. No.: 18/365,600

(22) Filed: Aug. 4, 2023

(65) Prior Publication Data

US 2024/0034402 A1 Feb. 1, 2024

Related U.S. Application Data

(63) Continuation of application No. 17/739,909, filed on May 9, 2022, now Pat. No. 11,780,497, which is a
(Continued)

(51) Int. Cl.
*B62D 9/00* (2006.01)
*B62D 1/14* (2006.01)
(Continued)

(52) U.S. Cl.
CPC .................. *B62D 9/00* (2013.01); *B62D 1/14* (2013.01); *B62D 5/046* (2013.01); *B62D 6/003* (2013.01);
(Continued)

(58) Field of Classification Search
CPC .......... B62D 1/14; B62D 5/046; B62D 6/003; B62D 7/09; B62D 7/18; B62D 9/00;
(Continued)

(56) References Cited

U.S. PATENT DOCUMENTS

| | | | |
|---|---|---|---|
| 2,979,839 A | 8/1959 | Hugger | |
| 4,301,881 A | 11/1981 | Griffin | |

(Continued)

FOREIGN PATENT DOCUMENTS

| | | | | |
|---|---|---|---|---|
| CN | 2362543 Y | * | 2/2000 | ............... B60C 3/06 |
| CN | 213008561 U | * | 4/2021 | |

(Continued)

OTHER PUBLICATIONS

Australian Examination Report No. 1 for Australian Patent Application No. 2018224858 dated May 11, 2020, 9 pages.
(Continued)

*Primary Examiner* — Anne Marie M Boehler
*Assistant Examiner* — Felicia L. Brittman-Alabi
(74) *Attorney, Agent, or Firm* — Morgan, Lewis & Bockius LLP

(57) ABSTRACT

In some embodiments, a vehicle may include a frame having longitudinal axis. The vehicle may include a steering assembly having a steering input and at least one wheel. The steering assembly may be coupled to the frame and configured to steer the vehicle based on input from a steering input. The vehicle may include a first drive wheel and a second drive wheel. The vehicle may include a steering position sensor configured to detect steering input including a position of the steering input and at least one of i) a rate of change of position of steering input and ii) steering position time. The vehicle may include at least one controller configured to process a signal from the steering position sensor and, in response to the processed signal, drive the first drive wheel and the second drive wheel, the first drive wheel being driven independent of the second drive wheel.

24 Claims, 48 Drawing Sheets

Related U.S. Application Data continuation of application No. 16/488,527, filed as application No. PCT/US2018/019569 on Feb. 23, 2018, now Pat. No. 11,358,633.

(60) Provisional application No. 62/526,489, filed on Jun. 29, 2017, provisional application No. 62/463,622, filed on Feb. 25, 2017.

(51) Int. Cl.

| | | |
|---|---|---|
| *B62D 5/04* | (2006.01) | |
| *B62D 6/00* | (2006.01) | |
| *B62D 7/18* | (2006.01) | |
| *B62D 11/00* | (2006.01) | |
| *B62D 11/04* | (2006.01) | |
| *B62J 45/413* | (2020.01) | |
| *B62K 5/007* | (2013.01) | |
| *B62K 5/08* | (2006.01) | |

(52) U.S. Cl.
CPC .............. *B62D 7/18* (2013.01); *B62D 11/003* (2013.01); *B62D 11/04* (2013.01); *B62J 45/413* (2020.02); *B62K 5/007* (2013.01); *B62K 5/08* (2013.01)

(58) Field of Classification Search
CPC ....... B62D 11/003; B62D 11/04; B62D 11/24; B62J 45/413; B62K 5/007; B62K 5/08; B62K 21/00; B60Y 2200/112; B60Y 2200/86; B60K 1/00; B60K 7/0007
USPC ........................................................ 180/6.28
See application file for complete search history.

(56) References Cited

U.S. PATENT DOCUMENTS

| | | | |
|---|---|---|---|
| 4,351,562 A | 9/1982 | Twitchell et al. | |
| 4,790,399 A | 12/1988 | Middlesworth | |
| 4,921,065 A | 5/1990 | Hamada et al. | |
| 5,065,836 A | 11/1991 | Hamada et al. | |
| 5,154,437 A | 10/1992 | Inagaki et al. | |
| 5,311,957 A | 5/1994 | McLaurin et al. | |
| 5,335,746 A | 8/1994 | Betz | |
| 5,435,404 A | 7/1995 | Garin, III | |
| 6,064,930 A | 5/2000 | Shibahata | |
| 6,076,033 A | 6/2000 | Hamada et al. | |
| 6,131,688 A | 10/2000 | Fukada | |
| 6,185,920 B1 * | 2/2001 | Oxley .................... | B62D 51/02 56/14.7 |
| 6,288,649 B1 | 9/2001 | Wolfe | |
| 6,575,261 B2 | 6/2003 | Mori et al. | |
| 6,609,596 B1 | 8/2003 | Lin | |
| 7,073,621 B2 | 7/2006 | Koibuchi et al. | |
| 7,165,644 B2 | 1/2007 | Offerle et al. | |
| 7,258,185 B2 | 8/2007 | Ohno et al. | |
| 7,318,629 B1 | 1/2008 | Sun et al. | |
| 7,319,927 B1 | 1/2008 | Sun et al. | |
| 7,383,910 B2 | 6/2008 | Mori et al. | |
| 7,516,006 B2 | 4/2009 | Mori | |
| 7,575,089 B2 | 8/2009 | Sherwin | |
| 7,597,160 B2 | 10/2009 | Lawson, Jr. | |
| 7,690,685 B2 | 4/2010 | Sasaoka | |
| 7,703,561 B2 | 4/2010 | Miyajima et al. | |
| 7,715,968 B2 | 5/2010 | Mori | |
| 7,797,094 B2 | 9/2010 | Miura | |
| 8,437,914 B2 | 5/2013 | Yu et al. | |
| 8,662,212 B2 | 3/2014 | Lawson, Jr. | |
| 8,694,209 B2 | 4/2014 | Tokimasa et al. | |
| 8,833,504 B2 | 9/2014 | Williams et al. | |
| 8,950,521 B2 | 2/2015 | Piontek | |
| 9,199,639 B2 | 12/2015 | Yamakado et al. | |
| 2005/0151334 A1 | 7/2005 | Flowers et al. | |
| 2009/0095547 A1 | 4/2009 | Swett et al. | |
| 2011/0240390 A1 * | 10/2011 | Kosco .................... | B60N 2/505 248/560 |
| 2012/0235373 A1 | 9/2012 | Hintzen et al. | |
| 2013/0300080 A1 * | 11/2013 | Walther .................. | B62K 5/08 280/87.041 |
| 2014/0138167 A1 | 5/2014 | Bebernes et al. | |
| 2016/0039455 A1 | 2/2016 | Zeller et al. | |

FOREIGN PATENT DOCUMENTS

| | | |
|---|---|---|
| EP | 1118581 A1 | 7/2001 |
| EP | 1426203 | 6/2004 |
| EP | 1875888 A2 | 1/2008 |
| EP | 3173315 A1 | 5/2017 |
| EP | 2824016 B1 | 10/2018 |
| GB | 684380 | 12/1952 |
| GB | 2412100 A | 9/2005 |
| JP | 2006223483 A | 8/2006 |
| JP | 2009106501 A | 11/2010 |
| JP | 2010254129 A | 11/2010 |
| WO | 2023232732 A1 | 12/2023 |

OTHER PUBLICATIONS

Canadian Office Action dated Jan. 6, 2021 for Canadian Patent Application No. 3054160, 4 pages.
Partial Supplementary European Search Report dated Nov. 16, 2020 for European Patent Application No. 18758294.5, 12 pages.
Examination Report No. 2 dated Feb. 9, 2021 for Australian Patent Application No. 2018224858, 3 pages.
Extended European Search Report dated Mar. 11, 2021 for European Patent Application No. 18758294.5, 14 pages.
Examination Report for corresponding Australian Patent Application No. 2021218084 dated Mar. 10, 2023, 8 pages.
Office Action for corresponding Canadian Patent Application No. 3,148,576 dated Mar. 29, 2023, 6 pages.

* cited by examiner

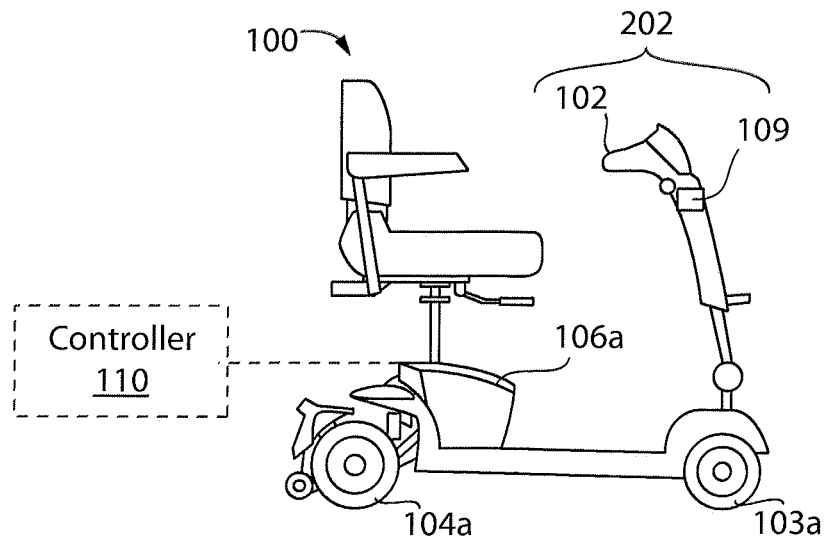
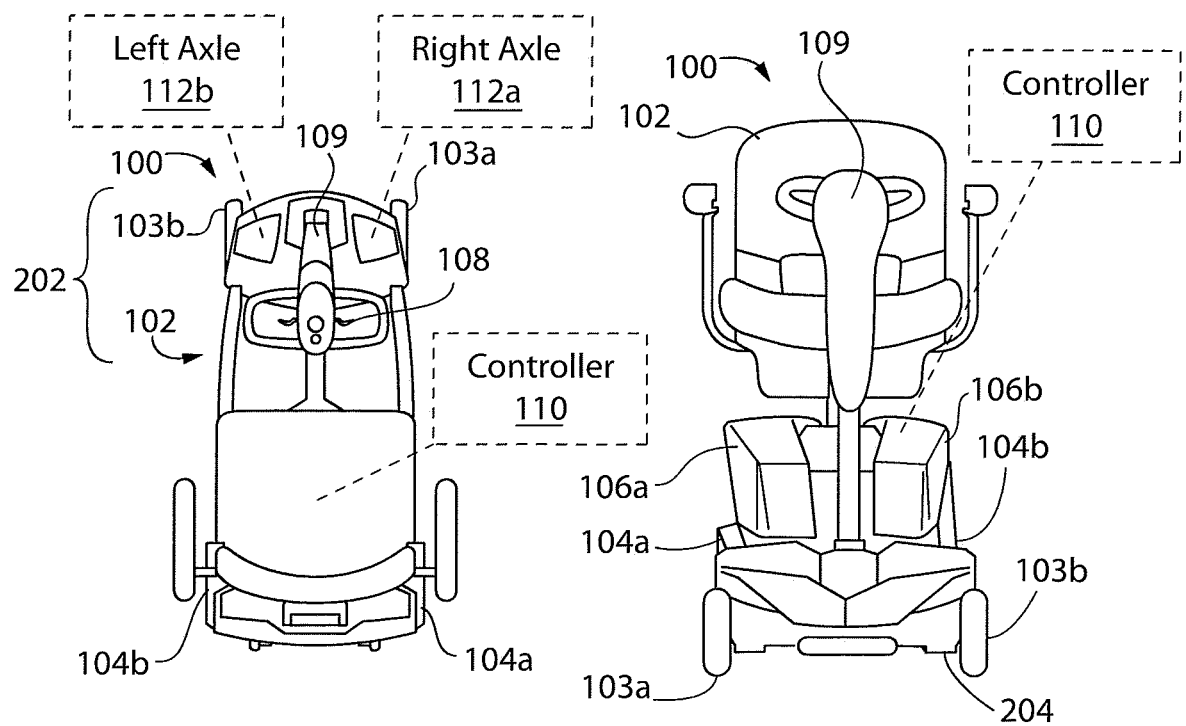
FIG. 1A
FIG. 1B
FIG. 1C

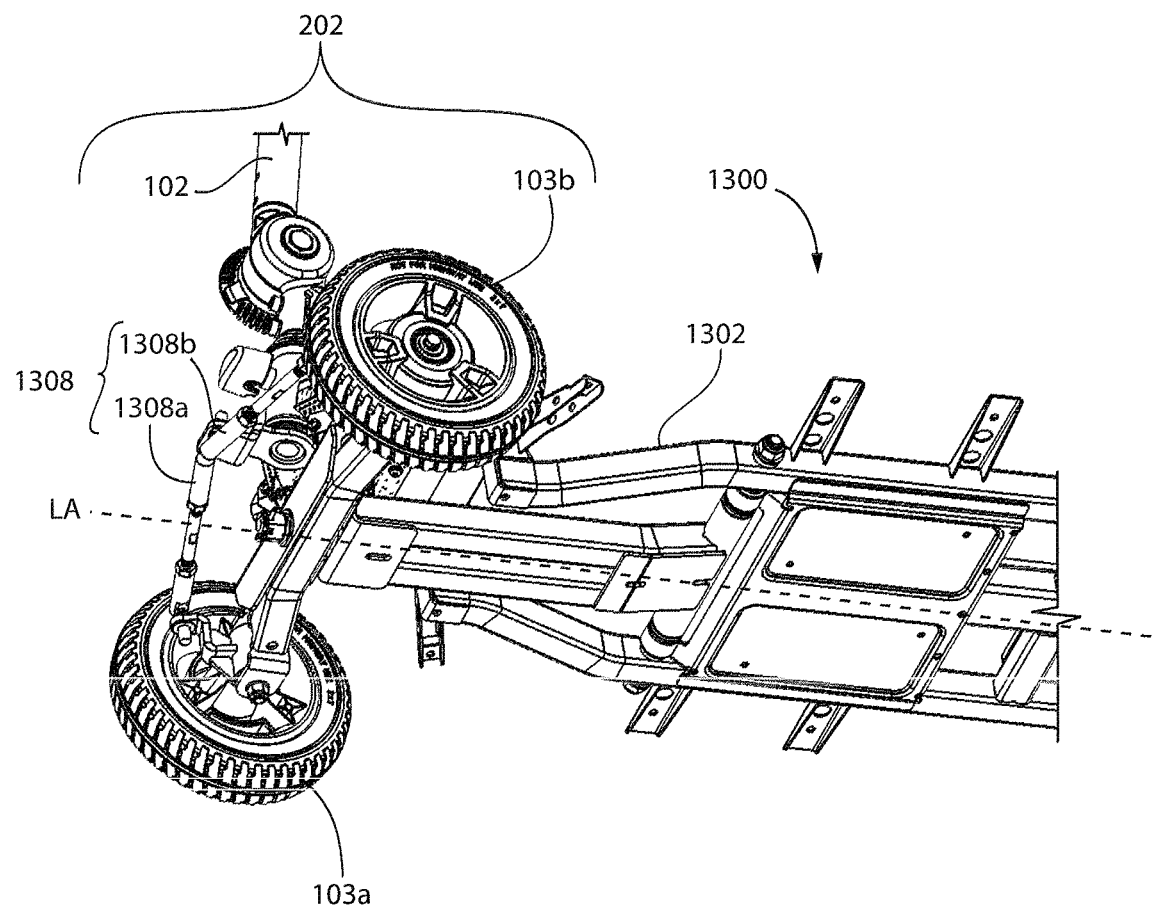
FIG. 13A1

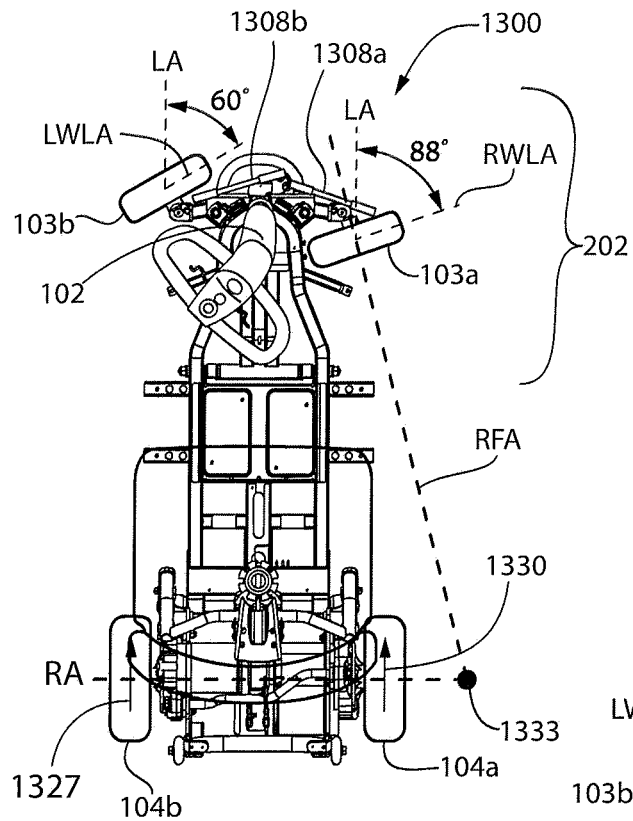
FIG. 13A2
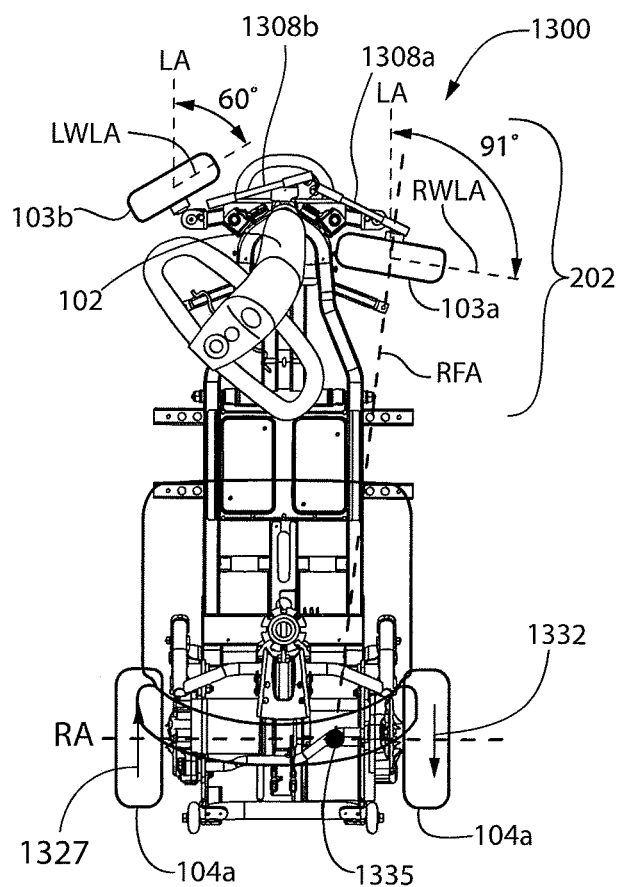
FIG. 13A3

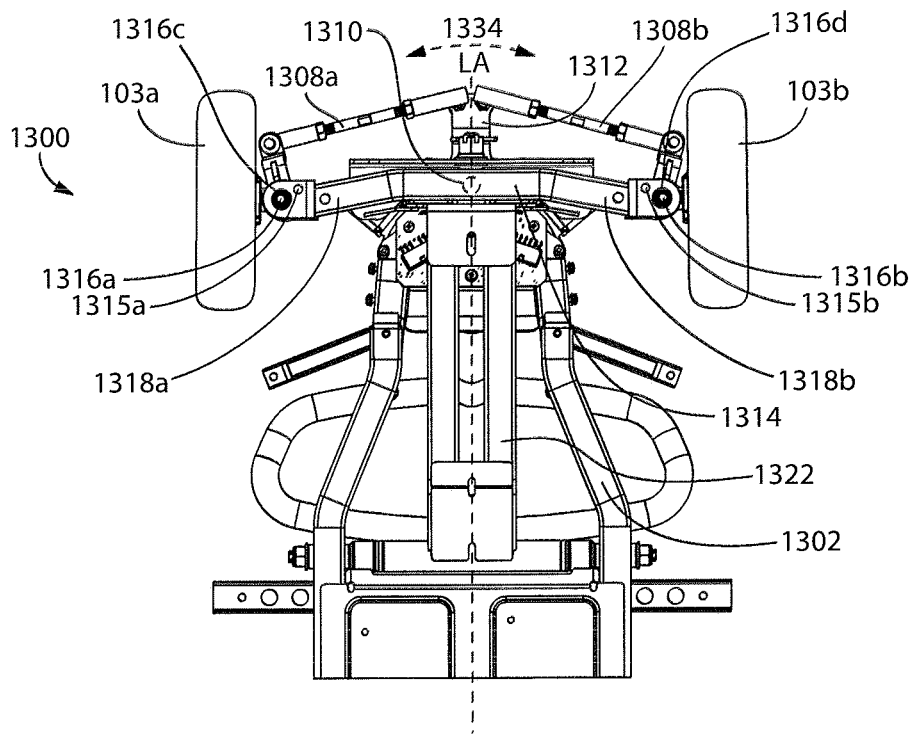
FIG. 13B1
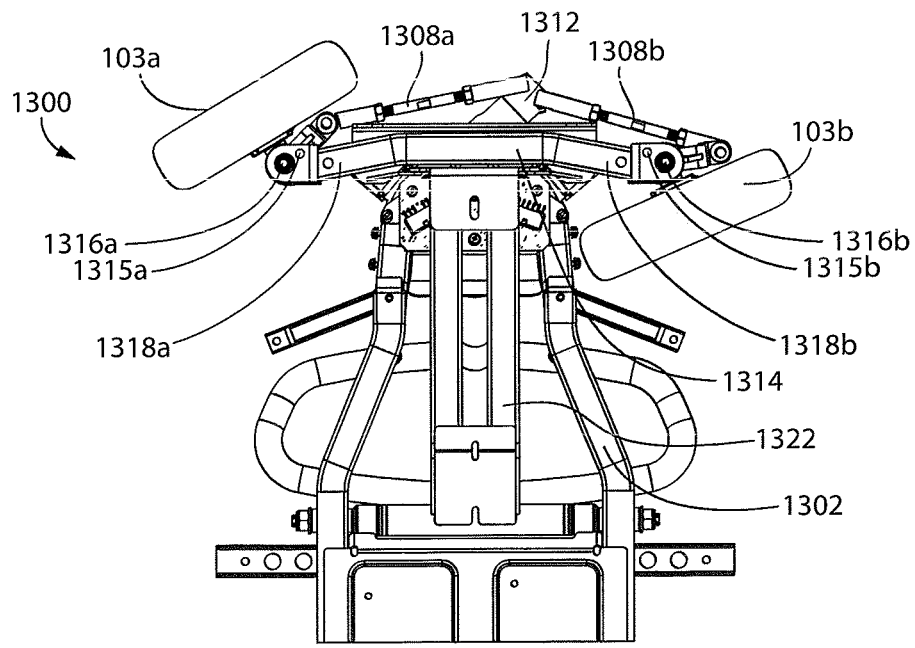
FIG. 13B2

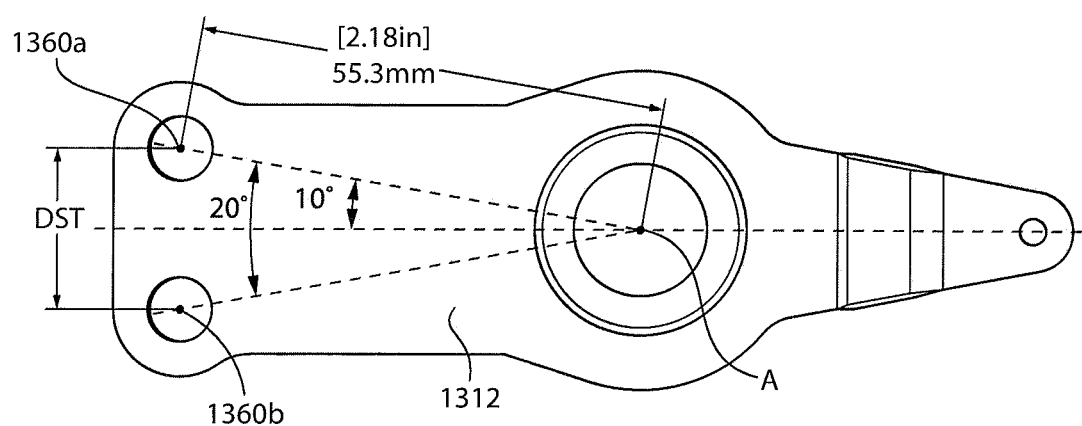
FIG. 13B3

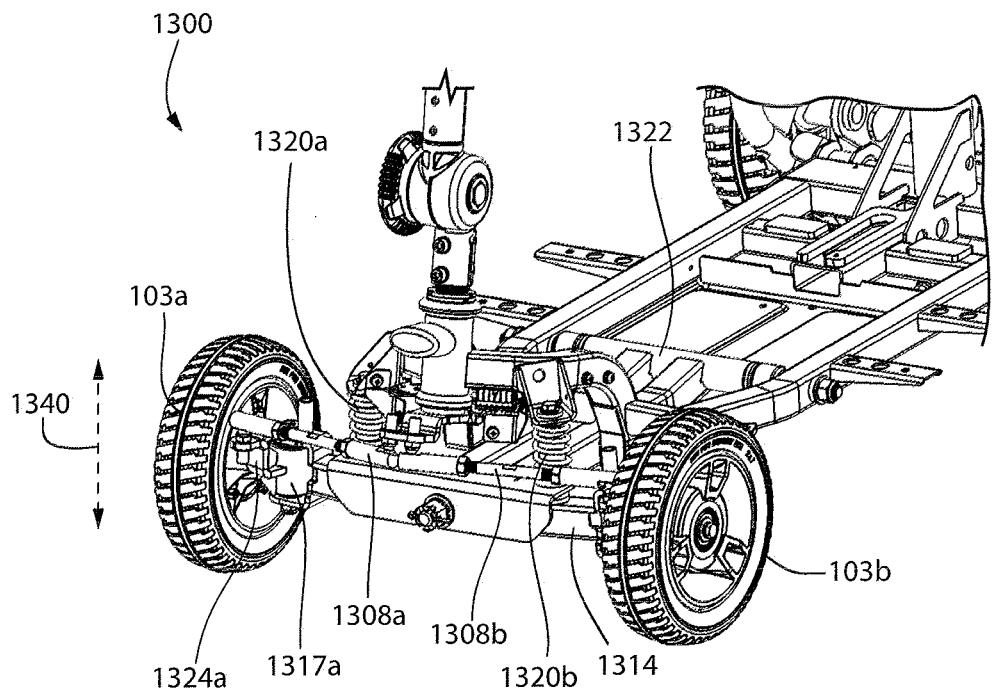
FIG. 13C1
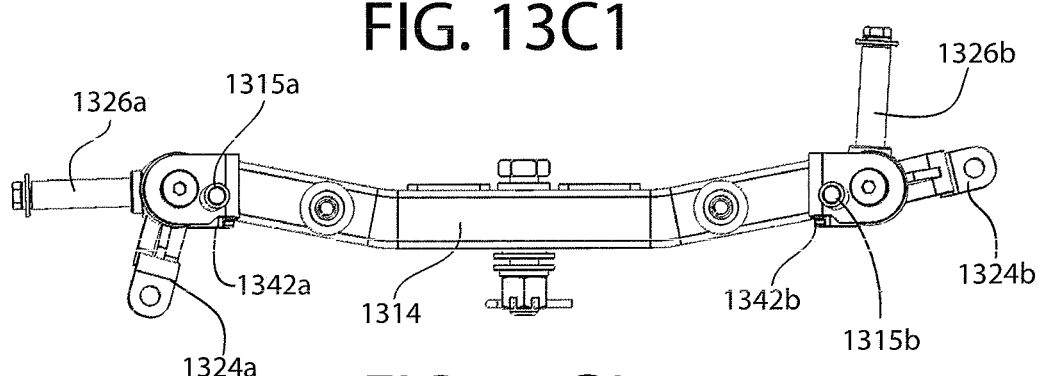
FIG. 13C2
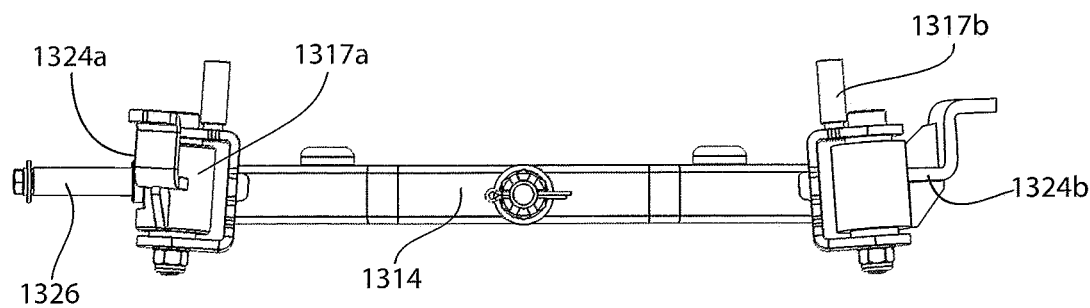
FIG. 13C3

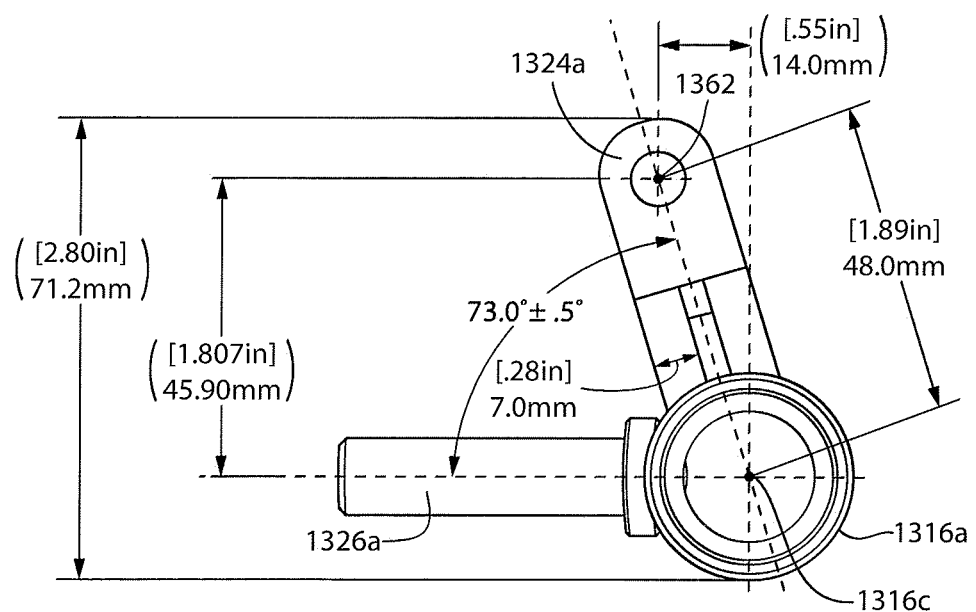
FIG. 13C4

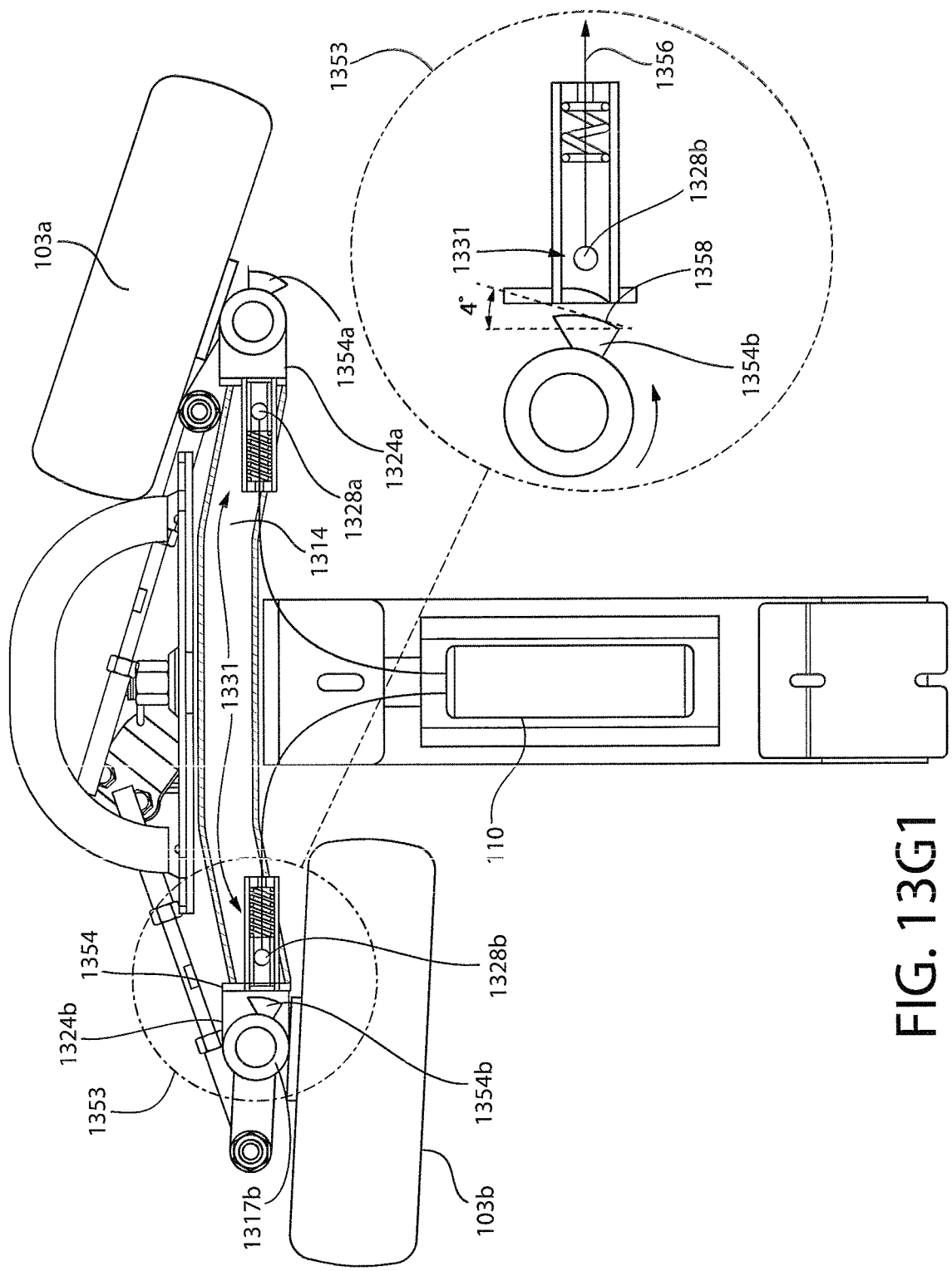
FIG. 13G1

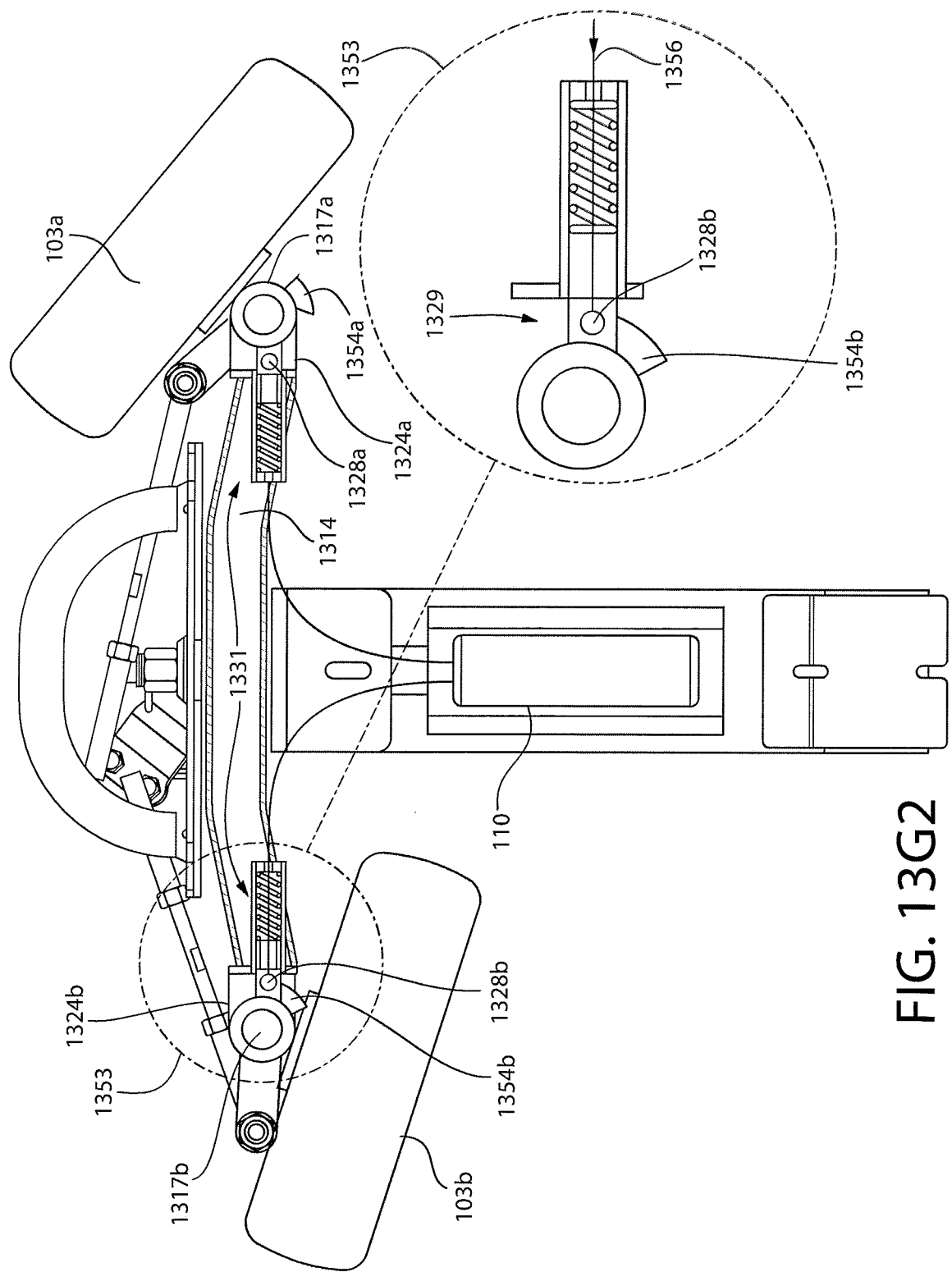
FIG. 13G2

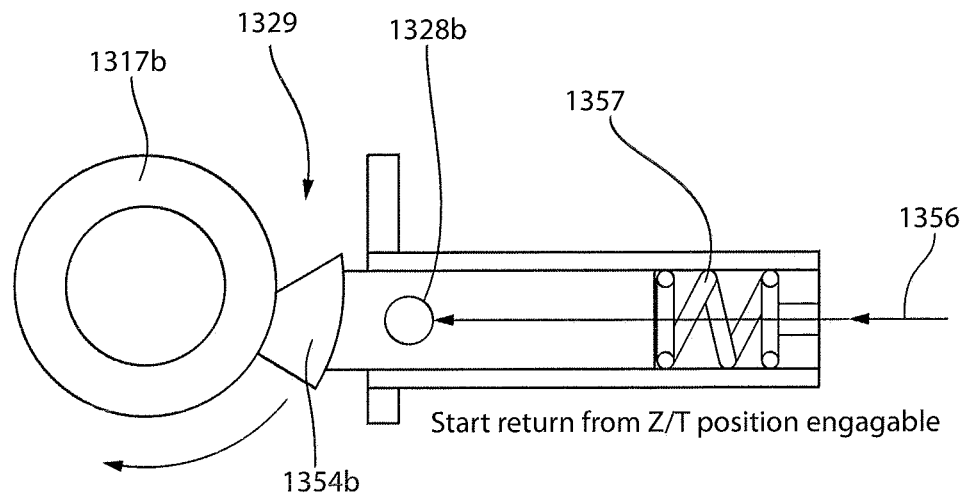
FIG. 13G3
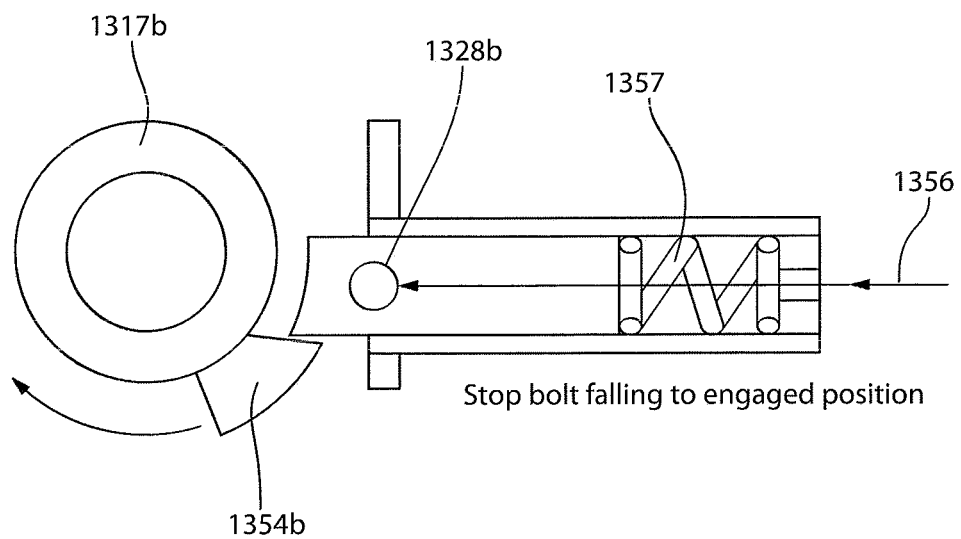
FIG. 13G4

MOBILITY VEHICLE

CROSS REFERENCE TO RELATED APPLICATIONS

This application is a Continuation of U.S. patent application Ser. No. 17/739,909 filed May 9, 2022, U.S. patent application Ser. No. 16/488,527, filed Aug. 23, 2019, now U.S. Pat. No. 11,358,633, and International Patent Application No. PCT/US2018/019569, filed Feb. 23, 2018, which claims the benefit of U.S. Provisional Patent Application No. 62/463,662 filed Feb. 25, 2017 entitled "Mobility Vehicle Control System" and U.S. Provisional Patent Application No. 62/526,489 filed Jun. 29, 2017 entitled "Mobility Vehicle Control System", each of which is incorporated by reference in its entirety.

FIELD OF THE INVENTION

The present application generally relates to a mobility vehicle and, more particularly, to a steering assembly and a control system for a mobility vehicle such as a scooter.

BRIEF SUMMARY OF THE INVENTION

In some embodiments, a vehicle comprises: a frame having longitudinal axis; a steering assembly having a steering input and at least one wheel, the steering assembly coupled to the frame and configured to steer the vehicle based on input from the steering input; a first drive wheel and a second drive wheel; a steering position sensor configured to detect a position of the steering input and at least one of i) a rate of change of the position of the steering input and ii) a steering position time; and at least one controller configured to process a signal from the steering position sensor and, in response to the processed signal, drive the first drive wheel and the second drive wheel, the first drive wheel being driven independently of the second drive wheel.

In some embodiments, the vehicle further comprises a first motor coupled to the at least one controller and the first drive wheel and a second motor coupled to the at least one controller and the second drive wheel, wherein the first drive wheel is driven by the first motor and the second drive wheel driven by the second motor in response to one or more drive signals from the at least one controller.

In some embodiments, the first motor is configured to drive the first drive wheel in a first direction and the second motor is configured to drive the second drive wheel in a second direction opposite the first direction.

In some embodiments, the first motor receives a first drive signal of the one or more drive signals from the at least one controller to drive the first drive wheel and the second motor receives a second drive signal of the one or more drive signals from the at least one controller to drive the second drive wheel.

In some embodiments, the second drive signal has an amount of current that, when received by the second motor, causes the second motor to drive the inner drive wheel at a speed of 0 revolutions per minute.

In some embodiments, while the vehicle is turning in a left or right direction, the first drive wheel is the outer drive wheel and the second drive wheel is the inner drive wheel, the inner drive wheel being closer to a center of a turning path of the vehicle than the outer drive wheel and wherein the first motor is configured to drive the outer drive wheel in a first direction at a speed greater than 0 revolutions per minute and the second motor is configured to drive the inner drive wheel at a speed of 0 revolutions per minute.

In some embodiments, the at least one wheel includes a left front wheel and a right front wheel.

In some embodiments, a distance between the left front wheel and the right front wheel is less than a distance between the first drive wheel and the second drive wheel.

In some embodiments, the at least one controller is configured to: receive one or more signals related to the position of the steering input and at least one of i) the rate of change of position of the steering input, an ii) the steering position time; and command the first motor and the second motor to drive the first wheel and second wheel in opposite directions based upon the one or more drive signals.

In some embodiments, the steering assembly includes a steering linkage configured and dimensioned such that each of the left front wheel and the right front wheel have: a maximum inward turn angle characterized by a limit to which either the left front wheel or right front wheel can turn toward the longitudinal axis, and a maximum outward turn angle characterized by a limit to which either the left front wheel or right front wheel can turn away from the longitudinal axis, wherein when one of the left front wheel or the right front wheel is an outside wheel turned to a respective left or right maximum inward turn angle, the other of the left front wheel or right front wheel is an inside wheel turned to an intermediate maximum outward turn angle that is less than the maximum outward turn angle unless a biasing force is applied to the inside wheel to urge the inside wheel to the respective maximum outward turn angle.

In some embodiments, the biasing force is a function of a difference between a voltage in a first drive signal provided to a first motor to drive the first drive wheel and a voltage in a second drive signal provided to a second motor to drive the second drive wheel.

In some embodiments, the biasing force is applied to the inside wheel independent of the movement of the steering input.

In some embodiments, the tiller, when operated by a user, is configured to turn the inside wheel up to, without exceeding, the intermediate maximum outward turn angle.

In some embodiments, the biasing force is caused by a force exerted by the ground.

In some embodiments, the intermediate maximum outward turn angle is different from the maximum outward turn angle by approximately 10°.

In some embodiments, the at least one wheel includes a left front wheel and a right front wheel, and wherein a steering linkage is configured to engage a stop when one of the left front wheel or the right front wheel reaches a respective maximum outward turn angle to prevent said left or right front wheel from turning beyond the respective maximum outward turn angle.

In some embodiments, the steering linkage further comprises a linkage member configured to pivot in response to movement of the steering input.

In some embodiments, the linkage member includes a tie rod.

In some embodiments, the at least one wheel includes a left front wheel and a right front wheel, and wherein the steering assembly further comprises: a steering stem, a stem tab coupled to the steering stem, an axle beam pivotably mounted to the frame, the axle beam comprising a left stop and right stop, a left king pin and right king pin coupled to the axle beam, and a left tie rod and a right tie rod, each of the left and right tie rods being pivotably coupled to the stem tab and to the left king pin and right king pin respectively, wherein each of the left and right tie rods is configured to pivot in response to movement of the steering input and to engage the left or right stop respectively when one of the left front wheel or the right front wheel reaches a respective maximum outward turn angle to prevent said left or right front wheel from turning beyond the respective maximum outward turn angle.

In some embodiments, the left king pin is rotatable about a left king pin axis and the right king pin is rotatable about a right king pin axis, and wherein each of the left king pin and the right king pin is pivotably coupled to the respective left and right tie rod that translates relative to the axle beam when the left or right king pin rotates about the respective left and right king pin axis.

In some embodiments, the axle beam is further coupled to the frame by at least one suspension member configured to allow each of the left front wheel and right front wheel to translate relative to the frame.

In some embodiments, each of the left front wheel and the right front wheel is translatable relative to the frame by a value between 0.25 inches and 1 inch.

In some embodiments, the vehicle further comprises a swing arm pivotably coupled to the frame and fixed to the axle beam.

In some embodiments, the vehicle further comprises a left and a right steering arm coupled to the left and right kingpin respectively, each of the left and right steering arm being rotatable about and projecting from the left and right kingpin respectively; and a left and right wheel axle coupled to the left and right kingpin respectively, each of the left and right wheel axle being rotatable about the left and right king pin axis respectively and projecting from the left and right kingpin respectively, the left front wheel and right front wheel being rotatable about the respective left and right wheel axle, wherein each of the left and right steering arm is fixed relative to the left and right wheel axle respectively at an angle of approximately 73°.

In some embodiments, the each of the left and right king pin axes is oriented relative to the frame at a camber angle of approximately 4 degrees.

In some embodiments, the each of the left and right king pin axes is oriented relative to the frame at a caster angle of approximately 2 degrees.

In some embodiments, the maximum outward turn angle is approximately 91 degrees.

In some embodiments, the vehicle further comprises a rear wheel axis about which the first and second drive wheels rotate; a left and right front wheel axis about which the respective left and right front wheels rotate; and a left and right front wheel axis vertical projection extending through the left and right front wheel axis, the left and right front wheel axis vertical projections intersecting at a point that is forward of the rear wheel axis when one of the left or right front wheel is at the maximum outward turn angle.

In some embodiments, the left and right front wheel axis vertical projections intersect at a point that is set off from the longitudinal axis on a left side of the frame when the left front wheel is at the maximum outward turn angle.

In some embodiments, one of the axle beam or the left or the right steering arm comprises an adjustable steering stop that is fixed to the one of the axle beam or the left or the right steering arm and is configured to limit the motion of the left or the right steering arm relative to the axle beam to a first degree when the adjustable steering stop is in a first configuration and to limit the motion of the left or the right steering arm relative to the axle beam to a second degree when the adjustable steering stop is in a second configuration wherein the first degree is less than the second degree.

In some embodiments, the vehicle is further configured and dimensioned to produce the biasing force when the vehicle is operated in a forward direction.

In some embodiments, the vehicle is configured and dimensioned to reduce the biasing force in response to a reduction in a difference between relative torque applied to the first and second drive wheels, respectively.

In some embodiments, the vehicle further comprises a retractable steering stop configured to restrict pivoting movement of one of the left or right steering arms relative to the axle beam when the retractable steering stop is in an engagement ready position.

In some embodiments, the retractable steering stop is further configured to not restrict pivoting movement of one of the left or right steering arms relative to the axle beam when the steering stop is in a retracted position.

In some embodiments, the vehicle further comprises a retraction means configured to cause the retractable steering stop to toggle from the engagement ready position to a retracted position based upon at least one of: a user command, vehicle speed, a position of the steering input, a duration in the position of the steering input and the rate of change of position of steering input.

In some embodiments, the steering position sensor is configured to detect the position of the steering input and the rate of change of the position of the steering input.

In some embodiments, a mobility scooter comprises: a frame having longitudinal axis; a steering assembly, coupled to the frame, having a left front wheel and a right front wheel on either side of the longitudinal axis, each of the left front wheel and the right front wheel coupled to the vehicle via a steering linkage configured to steer the mobility scooter based on input from a user; a first drive wheel driven by a first motor about a drive wheel axis and a second drive wheel driven by a second motor about the drive wheel axis, the drive wheel axis having a center point equally spaced between the first drive wheel and the second drive wheel, an inside drive wheel being one of the first drive wheel and the second drive wheel closest to a center of a turning path of the mobility scooter, wherein an axis of rotation of the mobility scooter during a turn intersects the drive wheel axis between the center point and a centerline of the inside drive wheel.

In some embodiments, the left front wheel, the right front wheel, the first drive wheel, and the second drive wheel are each laterally spaced from the longitudinal axis by an approximately equal distance.

In some embodiments, the steering linkage is configured and dimensioned such that each of the left front wheel and the right front wheel have: a maximum inward turn angle characterized by a limit to which the front of either the left front wheel or the right front wheel can turn toward the longitudinal axis, and a maximum outward turn angle characterized by a limit to which the front of either the left front wheel or right front wheel can turn away from the longitudinal axis, wherein when one of the left front wheel and the right front wheel is an outside wheel turned to a respective left or right maximum inward turn angle, the other of the left front wheel and the right front wheel is an inside wheel turned to an intermediate maximum outward turn angle that is less than the maximum outward angle until a biasing force is applied to the inside wheel to urge the inside wheel to the respective maximum outward turn angle.

In some embodiments, the mobility scooter is configured to turn about the axis of rotation when the inside wheel is turned to the maximum outward turn angle and to turn about a different axis of rotation when the inside wheel is turned to the intermediate maximum outward turn angle.

In some embodiments, the mobility scooter comprises a controller configured to simultaneously drive the first drive wheel and the second drive wheel in opposite directions when the inside drive wheel is in the maximum outward angle.

In some embodiments, the controller powers each of the first drive wheel and the second drive wheel at power levels of approximately the same absolute value and in different directions when the inside drive wheel is in the maximum outward angle.

In some embodiments, the first drive wheel operates at a different angular velocity that the second drive wheel when the power levels are of approximately the same absolute value.

In some embodiments, the steering assembly includes a steering linkage pivotable at each end of the steering linkage.

In some embodiments, the controller powers each of the first drive wheel and the second drive wheel at power levels of approximately the same absolute value and opposite polarities to apply torque in opposite directions to each of the first and second drive wheels, when the inside drive wheel is in the maximum outward angle.

In some embodiments, a vehicle, comprises a frame having longitudinal axis; a steering assembly having a steering input and a single directional control wheel, the steering assembly coupled to the frame and configured to steer the vehicle based on input from a steering input; a first drive wheel and a second drive wheel; a steering position sensor configured to detect steering input including a position of the steering input and at least one of i) a rate of change of position of steering input and ii) steering position time; and at least one controller configured to process a signal from the steering position sensor and, in response to the processed signal, drive the first drive wheel and the second drive wheel, the first drive wheel being driven independent of the second drive wheel.

In some embodiments, a vehicle, comprises a steering assembly configured to steer the vehicle based on an input from a steering input; a first drive wheel driven by a first motor and a second drive wheel driven by a second motor; a throttle configured to receive a speed input from a user; at least one steering sensor configured to detect steering input including at least one of i) input associated with a position of the steering input and ii) input associated with a rate of change of position of the steering input; and at least one controller communicatively coupled to the first motor, the second motor, and the steering sensor, the at least one controller configured to: receive one or more steering indicators associated with the at least one steering sensor; determine whether the steering indicator meets major turn entering criteria based on the position of the steering input and at least one of i) the rate of change of the position of steering input and ii) a steering position time lapse; in response to a determination that the steering indicator meets major turn entering criteria: operate the first motor and the second motor in major turn mode, including the at least one controller being configured to: provide a first drive signal to the first motor, the first drive signal configured to cause the first motor to drive the first drive wheel in a forward direction at a first speed that is less than a commanded speed indicated by the throttle, and provide a second drive signal to the second motor, the second drive signal configured to cause the second motor to drive the second drive wheel in a reverse direction at a second speed that is less than a commanded speed indicated by the throttle.

In some embodiments, the at least one controller being configured to determine whether the steering indicator meets the major turn entering criteria includes the at least one controller being configured to determine that the position of the steering input is in a major turn position and determine that the rate of change of the position of the steering input exceeds a predetermined steering rate of change threshold.

In some embodiments, the at least one controller being configured to determine whether the steering indicator meets the major turn entering criteria includes, the at least one controller being configured to: determine that the position of the steering input is in a major turn position, and determine that steering position of the steering input has transitioned from an intermediate turn position to the major turn position in an amount of time that is less than a predetermined steering rotation timing threshold.

In some embodiments, the at least one controller being configured to determine that the steering indicator meets the major turn entering criteria includes, the at least one controller being configured to: determine that the position of the steering input is in a major turn position, after a determination that the position of the steering input is in the major turn position, determine that the rate of change of the position of the steering input is less than a predetermined steering rate of change threshold, and after a determination that the rate of change of the position of the steering input is less than a predetermined steering rate of change threshold, confirm that the position of the steering input is in the major turn position.

In some embodiments, the at least one controller being configured to determine that the steering indicator meets the major turn entering criteria includes, the at least one controller being configured to: determine that the position of the steering input is in a major turn position, after a determination that the position of the steering input is in the major turn position, determine that steering position of the steering input has transitioned from an intermediate turn position to the major turn position in an amount of time that is greater than a predetermined steering rotation timing threshold, and after determining that steering position of the steering input has transitioned from an intermediate turn position to the major turn position in an amount of time that is greater than a predetermined steering rotation timing threshold, confirm that the position of the steering input is in the major turn position.

In some embodiments, the predetermined steering rotation timing threshold is approximately 250 ms.

In some embodiments, the at least one steering sensor includes: an intermediate turn position sensor to detect that the steering input is in an intermediate turn position, and a major turn position sensor to detect that the steering input is in a major turn position, wherein the rate of change of the position of the steering input is based on a time to transition from an intermediate turn position, as detected by the intermediate turn position sensor, to a major turn position, as detected by the major turn position sensor.

In some embodiments, the at least one steering sensor includes an accelerometer to detect movement of the steering input for determining the rate of change of the position of the steering input.

In some embodiments, the steering sensor includes a force sensor to detect a force applied to the steering input for determining when a steering input has transitioned to, or transitioned from, a major turn position.

In some embodiments, the at least one controller being configured to determine that the steering indicator meets the major turn entering criteria includes the at least one controller being configured to determine that the steering input is in a major turn position and the steering position time lapse is greater than a predetermined major turn position timing threshold.

In some embodiments, the predetermined major turn position timing threshold is approximately 250 ms.

In some embodiments, the vehicle comprises a vehicle turn rate sensor that detects a turn rate of the vehicle, and wherein the at least one controller is further configured to: while the first motor and the second motor are operating in major turn mode, determine whether the turn rate of the vehicle, as detected by the vehicle turn rate sensor, is less than a predetermined turn rate threshold, determine whether a turn rate commanded by the throttle is greater than a commanded turn rate threshold, and in response to a determination that the turn rate of the vehicle is less than a predetermined turn rate threshold and that the turn rate indicated by the throttle is greater than the commanded turn rate threshold: provide a third drive signal to the first motor, the third drive signal configured to cause the first motor to drive the first drive wheel in a forward direction at a third speed that is greater than the first speed, and provide a fourth drive signal to the second motor, the second drive signal configured to cause the second motor to drive the second drive wheel in a reverse direction at a fourth speed that is greater than the second speed.

In some embodiments, the at least one controller is further configured to: while the first motor and the second motor are operating in major turn mode, determine whether the turn rate of the vehicle, as detected by the vehicle turn rate sensor, is greater than a predetermined turn rate threshold, in response to a determination that the turn rate of the vehicle is greater than a predetermined turn rate threshold: provide a fifth drive signal to the first motor, the fifth drive signal configured to cause the first motor to drive the first drive wheel in a forward direction at a fifth speed that is less than the first speed, and provide a sixth drive signal to the second motor, the sixth drive signal configured to cause the second motor to drive the second drive wheel in a reverse direction at a sixth speed that is less than the second speed.

In some embodiments, the vehicle turn rate sensor is an inertial measurement sensor.

In some embodiments, the vehicle turn rate sensor is an accelerometer.

In some embodiments, the at least one controller is further configured to: while the motors are operating in major turn mode and in response to a determination that the steering input has transitioned from a major turn position to an intermediate turn position: provide a seventh drive signal to the second motor, the seventh drive signal configured to cause the second motor to rotate the second drive wheel in the forward direction.

In some embodiments, the at least one controller is further configured to: while the first motor and the second motor are operating in major turn mode and in response to a determination that the steering input has transitioned from a major turn position to a minor turn position: provide an eighth drive signal to the second motor, the eighth drive signal configured to cause the second motor to rotate the second drive wheel in the forward direction at a commanded speed indicated by the throttle and continue providing the first drive signal to the first motor during a first time period, and after the first time period, provide a ninth motor drive signal to the first motor, the ninth motor drive signal configured to cause the first motor to rotate the first drive wheel in the forward direction at a commanded speed indicated by the throttle.

In some embodiments, the first time period is between 20 ms and 1000 ms.

In some embodiments, the at least one controller is further configured to: in response to a determination that the steering indicator does not meet major turn entering criteria: operate the first motor and the second motor in standard driving mode, including: providing a tenth drive signal to the first motor, the tenth drive signal configured to cause the first motor to drive the first drive wheel in the forward direction at a commanded speed indicated by the throttle and providing an eleventh drive signal to the second motor, the eleventh drive signal configured to cause the second motor to drive the second drive wheel in the forward direction at a commanded speed indicated by the throttle.

In some embodiments, the vehicle comprises a tilt sensor configured to detect tilt angle of the vehicle, and wherein the at least one controller being configured to determine whether the steering indicator meets the major turn entering criteria includes the at least one controller being configured to determine whether the tilt angle of the vehicle, as detected by the tilt sensor, along the lateral axis or longitudinal axis, is less than a predetermined tilt angle threshold.

In some embodiments, the throttle is configured to receive a reverse speed input to direct the vehicle to move in a reverse direction, wherein the at least one controller is configured to: in response to a determination that the steering position meets a major turn entering criteria, and in response to a determination that the throttle receives a reverse input: provide a twelfth drive signal to the first motor, the twelfth drive signal configured to cause the first motor to drive the first drive wheel in a direction opposite a direction indicated by the first drive signal, at a twelfth speed that is less than the first speed, and provide a thirteenth drive signal to the second motor, the thirteenth drive signal configured to cause the second motor to drive the second drive wheel in a direction opposite a direction indicated by the second drive signal, at a thirteenth speed that is less than the second speed.

In some embodiments, the twelfth drive signal is configured to cause the first motor to drive the first drive wheel at approximately 50 percent of a power of the first motor as caused by the first drive signal, wherein the thirteenth drive signal is configured to cause the second motor to drive the second drive wheel at approximately 50 percent of a power of the second motor as caused by the second drive signal.

In some embodiments, the throttle is configured to receive a reverse speed input to direct the vehicle to move in a reverse direction, wherein the at least one controller is configured to: in response to the throttle receiving a reverse input, determine that the steering indicator does not meet major turn entering criteria.

In some embodiments, the first speed and the second speed are approximately 30 percent of a commanded speed indicated by the throttle while the at least one controller is operating in an indoor mode and wherein the first speed and the second speed are approximately 60 percent of a commanded speed indicated by the throttle while the at least one controller is operating in an outdoor mode.

In some embodiments, the vehicle comprises an environmental mode selection input selectable by a user and configured to cause the at least one controller to operate in the indoor mode or in the outdoor mode.

In some embodiments, the environmental mode selection input is on the steering input.

In some embodiments, the environmental mode selection input is a switch on the steering input.

In some embodiments, the vehicle comprises an operator weight sensor that detects a weight of an operator of the vehicle and wherein the at least one controller is further configured to: while the first motor and the second motor are operating in major turn mode, determine that the weight of the operator, detected by the operator weight sensor, exceeds a predetermined operator weight threshold, and in response to a determination that the weight of the operator exceeds a predetermined operator weight threshold: provide a fourteenth drive signal to the first motor, the fourteenth drive signal configured to cause the first motor to drive the first drive wheel in the forward direction at a fourteenth speed that is greater than the first speed and provide a fifteenth drive signal to the second motor, the fifteenth drive signal configured to cause the second motor to drive the second drive wheel in the reverse direction at a fifteenth speed that is greater than the second speed.

In some embodiments, the predetermined operator weight threshold is 250 lbs.

In some embodiments, the fourteenth drive signal and fifteenth drive signal cause the first motor and the second motor to drive the first drive wheel and the second drive wheel, respectively, using approximately twice the power as compared to the first drive signal and the second drive signal, respectively.

In some embodiments, the first drive signal is configured to cause the first motor to drive the first drive wheel at approximately 30 percent of a maximum power of the first motor, wherein the second drive signal is configured to cause the second motor to drive the second drive wheel at approximately 15 percent of a maximum power of the second motor.

In some embodiments, the fourteenth drive signal is configured to cause the first motor to drive the first drive wheel at approximately 60 percent of a maximum power of the first motor, wherein the fifteenth drive signal is configured to cause the second motor to drive the second drive wheel at approximately 30 percent of a maximum power of the second motor.

In some embodiments, the major turn exiting criteria includes a criterion that is met when a time period that the vehicle operates in a major turn mode exceeds a major turn mode time limit threshold.

In some embodiments, the major turn mode time limit threshold is a function of a weight of an operator of the vehicle.

In some embodiments, the major turn mode time limit threshold when the weight of the operator of the vehicle is less than an operator weight threshold is approximately half an amount of time as the major turn mode time limit threshold when the weight of the operator of the vehicle is greater than an operator weight threshold.

In some embodiments, the operator weight threshold is 250 lbs.

In some embodiments, the major turn mode time limit threshold is between 7 and 10 seconds.

In some embodiments, the vehicle comprises a steering assembly configured to steer the vehicle based on a steering input from a user; a left drive wheel and a right drive wheel; a left motor coupled to the left drive wheel and configured to drive the left drive wheel; a right motor coupled to the right drive wheel and configured to drive the right drive wheel; a throttle configured to receive a speed input from the user; at least one full left turn position sensor configured to detect the steering assembly transitioning into and out of a full left turn; at least one full right turn position sensor configured to detect the steering assembly transitioning into and out of a full right turn; a controller communicatively coupled to the first motor, the second motor, the throttle, the at least one left turn position sensor, and the at least one right turn position sensor, the controller configured to: receive a full left turn signal from the left turn position sensor, in response to receiving the full left turn signal from the left turn position sensor: provide a first drive signal to the right motor, the first drive signal configured to cause the right motor to drive the right drive wheel in a forward direction at a first speed that is less than a commanded speed indicated by the throttle, and provide a second drive signal to the left motor, the second drive signal configured to cause the left motor to drive the left drive wheel in a reverse direction at a second speed that is less than a commanded speed indicated by the throttle; receive a full right turn signal from the right turn position sensor, in response to receiving the full right turn signal from the right turn position sensor: provide a third drive signal to the left motor, the third drive signal configured to cause the left motor to drive the left drive wheel in a forward direction at a third speed that is less than a commanded speed indicated by the throttle, and provide a fourth drive signal to the right motor, the fourth drive signal configured to cause the right motor to drive the right drive wheel in a reverse direction at a fourth speed that is less than a commanded speed indicated by a throttle.

In some embodiments, the vehicle comprises at least one intermediate left turn position sensor configured to detect the steering assembly transitioning into and out of an intermediate left turn; at least one intermediate right turn position sensor configured to detect the steering assembly transitioning into and out of an intermediate right turn; wherein the controller is configured to: receive at least one of: an intermediate left turn signal from the intermediate left turn position sensor and an intermediate right turn signal from the intermediate right turn position sensor, in response to receiving at least one of: an intermediate left turn signal and the intermediate right turn signal: provide a fifth drive signal to the left motor, the fifth drive signal configured to cause the left motor to drive the left drive wheel in a forward direction at a commanded speed indicated by the throttle, and provide a sixth drive signal to the right motor, the sixth drive signal configured to cause the right motor to drive the right drive wheel in a forward direction at a fourth speed that is less than a commanded speed indicated by the throttle.

In some embodiments, a vehicle comprises a steering assembly configured to steer the vehicle; a first drive wheel and a second drive wheel configured to drive the vehicle; a first motor coupled to the first drive wheel and configured to drive the first wheel; a second motor coupled to the second drive wheel and configured to drive the second wheel; a throttle configured to control the first motor and the second motor; a steering position sensor configured to detect a steering position of the steering assembly; a throttle input sensor configured to detect a throttle input of the throttle; one or more controllers communicatively coupled to the first motor, the second motor, the throttle input sensor and the steering position sensor, the one or more controllers being configured to: determine that the steering position and the throttle input meets a major turn criteria and as a result, cause the first motor to rotate in a reverse direction at a first speed and cause the second motor to rotate in a forward direction at a second speed, wherein the first speed and the second speed fall below a speed threshold; determine that the steering position and the throttle input meets a major turn exiting criteria and as a result, cause the first motor to rotate in the forward direction and cause the second motor to rotate in the forward direction at one or more speeds based on the steering position, the steering rotation speed and the throttle input.

In some embodiments, the major turn exiting criteria includes a slow transition intermediate turn criterion, and wherein the one or more controllers are further configured to: determine that the steering position and the throttle input meets slow transition intermediate turn criterion and as a result, cause the first motor to rotate in the forward direction at a third speed and cause the second motor to rotate in the first direction at a fourth speed, wherein the third speed and the fourth speed fall below a speed threshold.

In some embodiments, the slow transition intermediate turn criterion is met when the steering position of the steering assembly transitions from a major turn position to an intermediate turn position in an amount of time that exceeds a steering rotation timing threshold and the throttle input exceeds a throttle input threshold.

In some embodiments, the steering rotation timing threshold is approximately 250 ms.

In some embodiments, the major turn exiting criteria includes a fast transition intermediate turn criterion and wherein the one or more controllers are further configured to: determine that the steering position and the throttle input meets that the fast transition intermediate turn criterion and as a result: cause the first motor to rotate in the forward direction at a third speed and cause the second motor to rotate in the forward direction at a fourth speed during a first time period, and cause the first motor to rotate in the forward direction at a fifth speed and cause the second motor to rotate in the forward direction at a sixth speed during a second time period, wherein the third speed, the fifth speed, and the sixth speed exceed the speed threshold, wherein the fourth speed falls below the speed threshold, and wherein the first time period occurs before the second time period.

In some embodiments, the fast transition intermediate turn criterion is met when the steering position of the steering assembly transitions from a major turn position to an intermediate turn position in an amount of time that falls below a steering rotation timing threshold and the throttle input exceeds a throttle input threshold.

In some embodiments, the major turn exiting criteria includes a fast transition minor turn criterion, and wherein the one or more controllers are further configured to: determine that the steering position and the throttle input meets the fast transition minor turn criterion and as a result, cause the first motor to rotate in the forward direction at a third speed and cause the second motor to rotate in the forward direction at a fourth speed, wherein the third speed and the fourth speed exceed the speed threshold.

In some embodiments, the fast transition minor turn criterion is met when the steering position of the steering assembly transitions from a major turn position, through an intermediate turn position, to a minor steering position in an amount of time that falls below a steering rotation timing threshold and the throttle input exceeds a throttle input threshold.

In some embodiments, the one or more controllers are further configured to: before the determination that the vehicle meets the major turn criteria, determine that the steering position of the steering assembly transitions from an intermediate turn position to a major turn position in an amount of time that exceeds a steering rotation timing threshold and the throttle input exceeds a throttle input threshold and as a result: cause the first motor to rotate in the reverse direction at a third speed and cause the second motor to rotate in the forward direction at a fourth speed, wherein the third speed and the fourth speed fall below the speed threshold.

In some embodiments, the one or more controllers are further configured to: before the determination that the vehicle meets the major turn criteria, determine that the steering position of the steering assembly transitions from an intermediate turn position to a major turn position in an amount of time that falls below a steering rotation timing threshold and the throttle input exceeds a throttle input threshold and as a result: cause the first motor to rotate in the reverse direction at a third speed and cause the second motor to rotate in the forward direction at a fourth speed during a first time period, wherein the third speed and the fourth speed exceed the speed threshold and cause the first motor to rotate in the reverse direction at a fifth speed and cause the second motor to rotate in the forward direction at a sixth speed during a second time period, wherein the fifth speed and the sixth speed fall below the speed threshold, and wherein the second time period occurs after the first time period.

In some embodiments, the one or more controllers are further configured to: determine that the steering position meets standard drive criteria and as a result: cause the first motor to rotate in the forward direction at a third speed and cause the second motor to rotate in the forward direction at a fourth speed, the third speed and the fourth speed being based on the throttle input.

In some embodiments, the vehicle comprises a tilt sensor that detects rotational tilt angle of the vehicle, wherein the major turn criteria includes a rotational tilt criterion that is met when the rotational tilt angle of the vehicle falls below a rotational tilt angle threshold.

In some embodiments, the vehicle comprises a first directional control wheel coupled to the steering assembly via a first axle; and a second directional control wheel coupled to the steering assembly via a second axle, the first directional control wheel and the second directional control wheel being configured to reorient in response to movement of the steering assembly, wherein the first axle is independent of the second axle.

In some embodiments, the first axle pivots about a different axis than the second axle.

In some embodiments, only one directional control wheel is coupled to the steering assembly, the directional control wheel being configured to reorient in response to movement of the steering assembly.

BRIEF DESCRIPTION OF THE SEVERAL VIEWS OF THE DRAWINGS

The foregoing summary, as well as the following detailed description of embodiments of the invention, will be better understood when read in conjunction with the appended drawings of an exemplary embodiment. It should be understood, however, that the invention is not limited to the precise arrangements and instrumentalities shown.

In the drawings:

FIGS. 1A-1C are a side elevational view, top plan view, and front elevational view, respectively, of a vehicle in accordance with at least one embodiment of the invention;

FIG. 13A1 illustrates a bottom front perspective view of a portion of a vehicle according to at least one embodiment of the invention including, for example, one or more of the embodiments reflected in the foregoing figures;

FIGS. 13A2-13A3 illustrate top views of a portion of a vehicle according to at least one embodiment of the invention including, for example, one or more of the embodiments reflected in the foregoing figures;

FIGS. 13B1-13B2 illustrate bottom views of a portion of a vehicle according to at least one embodiment of the invention including, for example, one or more of the embodiments reflected in the foregoing figures;

FIG. 13B3 is a stem tab of a vehicle 100 according to at least one embodiment of the invention including, for example, one or more of the embodiments reflected in the foregoing figures.

FIG. 13C1 illustrates a top front perspective view of a portion of a vehicle according to at least one embodiment of the invention including, for example, one or more of the embodiments reflected in the foregoing figures;

FIG. 13C2 illustrates a top view of a steering assembly of a vehicle, according to at least one embodiment of the invention including, for example, one or more of the embodiments reflected in the foregoing figures;

FIG. 13C3 illustrates a front view of a steering assembly of a vehicle, according to at least one embodiment of the invention including, for example, one or more of the embodiments reflected in the foregoing figures;

FIG. 13C4 is a steering arm and a wheel axle of a vehicle 100 according to at least one embodiment of the invention;

FIGS. 13G1-13G4 are a top front view of a steering assembly including steering stops, according to at least one embodiment of the invention including, for example, one or more of the embodiments reflected in the foregoing figures;

DETAILED DESCRIPTION OF THE INVENTION

Figure 2:
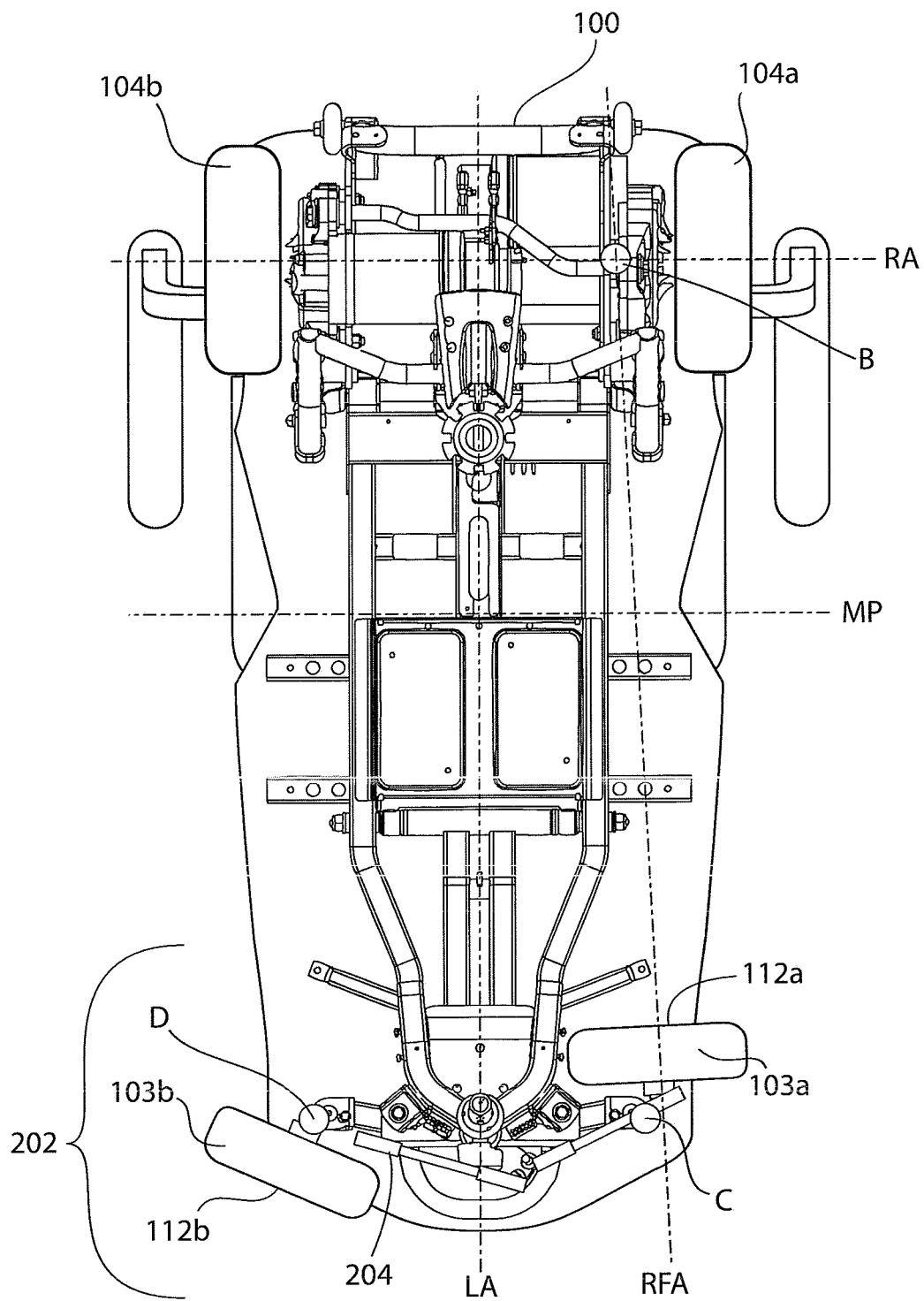
FIG. 2 is a bottom plan view of a vehicle in accordance with at least one embodiment of the invention such as the embodiment reflected in the foregoing figures.

There has been a dramatic increase in popularity of personal mobility vehicles over the last several decades. This increase is due to many factors including the advent of new structural techniques and materials, as well as an aging population. There is also an increased use of the mobility vehicles indoors and in crowded environments. With such use, there is an increased need for personal mobility vehicles with an improved turning radius to navigate tight areas in homes, stores, and other areas.

In addition to decreasing the radius of turn, there is also a need for vehicles with better handling entering or exiting a tight turn. For example, if a driver attempts to enter a tight turn with a personal mobility vehicle at too high of a speed, the vehicle may become unstable. The vehicle may also skid in the direction of its forward momentum and the driver will lose control of the vehicle. This is referred to as understeering, or plowing. Another problem exists when a driver attempts to exit a tight turn. Specifically, if a driver attempts to exit a tight turn too quickly and at too high of a speed, the vehicle may oversteer, or tend to continue in the direction of the turn.

Three wheeled vehicles, vehicles with a single steering wheel and two rear drive wheels, may be configured to have a tight turning radius but may be considered unstable without mitigating configurations controls or designs. Vehicles with two closely spaced directional control wheels that share a common axis while turning may also have similar stability concerns as three wheeled vehicles.

As disclosed in some embodiments herein, adding an additional steerable front wheel may result in a more stable vehicle. In some embodiments, by configuring the vehicle as described herein, the four wheeled vehicle may have tight radius turning capabilities that are at least as effective as a three wheeled vehicle, with an increase in stability over a three wheeled vehicle.

There is thus disclosed herein exemplary vehicles with a steering configuration and a control system configured to improve turning radius and/or steering functionality while maintain a desired level of stability.

Referring to the drawings in detail, wherein like reference numerals indicate like elements throughout, there is shown in FIGS. 1A-20 a vehicle 100 in accordance with an exemplary embodiment of the present invention.

Referring to FIGS. 1A-1C and 2, in some embodiments, the vehicle 100 includes a steering assembly 202 configured to steer the at least one front directional control wheel (e.g., right and left front wheels 103a-103b) of the vehicle 100 based on an input from the user. While FIGS. 1A-1C and 2 show two directional control wheels (that are steerable), in some embodiments, the vehicle 100 may include one directional control wheel, one directional control wheel with a caster wheel, or three directional control wheels. The steering assembly 202 may include a steering input 102, and a linkage to couple the right and left directional control wheels 103a-103b to one another and to the steering input 102. In response to detecting movement (e.g., rotation) of steering input 102, the steering assembly 202 causes the right and left directional control wheels 103a, 103b to reorient in different configurations. As a result, a user can control the right and left directional control wheels 103a-103b via rotation of the steering input 102.

In the example shown in FIGS. 1A-1C, the steering input 102 (e.g., a tiller) that a user grasps and steers or turns, along a generally vertical axis. In some embodiments, the steering input 102 includes a steering wheel, foot pedals, cable pulls, hand paddles, levers, switches and/or buttons to control the steering direction of the vehicle 100. The steering input 102 may be coupled to a right directional control wheel 103a and a left directional control wheel 103b as described, for example, in further detail below. Movement (e.g., rotation) of the steering input 102, as performed by a user, causes the right and left directional control wheels 103a and 103b to reorient (e.g., rotate) in a similar direction, thereby allowing a user to steer the vehicle 100. In one embodiment, by including two directional control wheels 103a, 103b, four total wheels, the vehicle 100 has increased stability as compared to a vehicle having one directional control wheel for a total of three wheels (or five wheels where the vehicle includes two caster front wheels for stability).

As shown in FIG. 1B and FIG. 2, the steering input 102 may be pivotably coupled to the right directional control wheel 103a via one or more linkages 204 and the steering input 102 may be coupled to the left directional control wheel 103b via one or more linkages 204 as described in further detail below. The right directional control wheel 103a pivots about right wheel axle 112a and the left directional control wheel 103b pivots about left wheel axle 112b. In some embodiments, the right wheel axle 112a is moveable independent of the left wheel axle 112b, such that the right wheel axle 112a pivots about a different axis than the left wheel axle 112b as the vehicle turns. In one embodiment, the right wheel axle 112a is collinear with left wheel axle 112b when the vehicle is going straight and then the right axel 112a is non-collinear with left wheel axle 112b when the vehicle is turning left or right.

In some embodiments, the right and left front wheels 103a-103b are each laterally spaced from the longitudinal axis LA by an approximately equal distance.

In some embodiments, by orienting the right and left control wheels 103a, 103b and independently driving the right and left drive wheels 104a, 104b the turning radius of the vehicle 100 is decreased. The maximum turn, or minimum turning radius, of the vehicle may be referred to as a major turn. The maximum turn of the tiller, or maximum turn input of the steering assembly, may be referred to as the major turn position. When controlling the drive wheels of the vehicle while the tiller in the major turn position and the vehicle is in a major turn may be referred to as the major turn mode. In some embodiments, there may be delay in entering major turn mode after the tiller is in the major turn position (e.g., while the inside steering wheel advances from an intermediate maximum outside turning angle to a maximum outside turning angle) as discussed in further detail below. In FIG. 2, the steering input 102 of the vehicle 100 is in an exemplary major turn position, such as where the steering input 102 is fully rotated in a clock-wise or counter-clockwise direction. As a result of the steering input 102 of the vehicle 100 being in a major turn position, the steering assembly 202 causes the right and left directional control wheels 103a, 103b to reorient in a direction parallel to the lateral axis MP of the vehicle 100. In some embodiments, the lateral axis MP extends from side to side of the vehicle 100 and is perpendicular to the longitudinal axis LA. This orientation, where the right and left directional control wheels 103a, 103b are reoriented in a direction substantially parallel to the lateral axis MP may allow the vehicle 100 to perform a major turn. In one embodiment, the vehicle 100, while in a major turn, rotates about a first vertical axis B. In some embodiments, the first vertical axis B may intersect the rear wheel drive axis RA and an inside directional control wheel rotational axis (e.g., right front axis RFA of right directional control wheel 103a), between the midpoint of the vehicle 100 and the inside drive wheel 104a, as discussed in further detail below.

The steering assembly 202 may be coupled to the right directional control wheel 103a via a right wheel axle 112a and may be coupled to the left directional control wheel 103b via a left wheel axle 112b. In some embodiments, the right wheel axle 112a pivots about a second vertical axis C, and the left wheel axle 112b pivots about a third vertical axis D, separate and distinct from the second vertical axis C. In one embodiment, the right directional control wheel 103a and the left directional control wheel 103b share a common axle and axis. In one embodiment, only a single front wheel is provided.

In some embodiments, the vehicle 100 includes a right drive wheel 104a and a left drive wheel 104b. The right drive wheel 104a and left drive wheel 104b may be configured to drive the vehicle 100 while in operation. In some embodiments, the right and left drive wheels 104a-104b are each laterally spaced from the longitudinal axis LA by an approximately equal distance.

In some embodiments, the vehicle 100 includes a right motor 106a coupled to right drive wheel 104a. The right motor 106a may be configured to drive the right drive wheel 104a while in operation. In some embodiments, the vehicle 100 includes a left motor 106b coupled to the left drive wheel 104b. The left motor 106b may be configured to drive the left drive wheel 104b while in operation. The right motor 106a and the left motor 106b may be configured to drive the right drive wheel 104a and the left drive wheel 104b in the forward or rearward direction and independent of one another as discussed in further detail below.

In some embodiments, the vehicle 100 includes a user speed input device or throttle 108 controllable by a user and configured to receive a speed input from a user to control the speed of the vehicle 100. In some embodiments, the user speed input device 108 is a lever, such as shown, configured to be squeezed by the user. In one embodiment, the throttle 108 is coupled to the steering input 102. The throttle may include a lever, button, paddle, switch, and/or grip that the user actuates with his or her hand. In some embodiments, the user speed input device 108 includes a button, a pedal, and/or a switch that the user actuates with his or her foot or other means. In response to a user input, the throttle 108 generates a throttle input (e.g., a throttle command) that is used to control right motor 106a and left motor 106b and thereby a speed of the vehicle 100. The throttle 108 may be configured to cause the right motor 106a and/or the left motor 106b to drive the vehicle 100 based on the throttle input. In one embodiment, a single throttle 108 is provided for controlling both the right and left motors 106a, 106b.

In some embodiments, the vehicle 100 includes at least one steering sensor 109 configured to monitor user control (e.g., steering and/or throttle), and/or detect steering input 102 of the vehicle 100. In some embodiments, the at least one steering sensor 109 includes at least one of: a steering position sensor configured to detect a steering position of the steering input 102, a steering rotation sensor configured to detect a steering rotation speed of the steering input 102 and a throttle input sensor configured to detect an amount of throttle 108 activated by a user. In some embodiments, the at least one steering sensor 109 includes accelerometers, gyroscopes or any inertial measurement devices to detect a rate of change or position of the steering input 102. In some embodiments, at least one steering sensor includes contact sensors (e.g., sliding electrical contacts, spring loaded contacts, resistive potentiometer, electromechanical brushed coupling, mechanical switch cam coupling) or contact-less sensors (e.g., magnetic, inductive, ultrasonic, infrared (IR), laser, optical or capacitive sensors). In some embodiments, the at least one steering sensor 109 includes a force sensor (e.g., strain gauge sensor) configured to detect a rotational force exerted on the steering input 102 by a user to detect a rate of change or position of the steering input 102. In some embodiments, the steering position sensor and the steering rotation sensor are a single integrated sensor (e.g., accelerometer). A further example of steering position and steering rotation sensors are described in more detail below in reference to FIGS. 3-4.

In some embodiments, the vehicle 100 includes at least one controller 110. In some embodiments, the at least one controller 110 may include one or more computers having at least one processor and memory. In some embodiments, the memory may store programs a processor executes to control and run the various systems and methods disclosed herein. In some embodiments, the at least one controller 110 may include at least one electrical circuit configured to execute the various systems and methods disclosed herein. The controller 110 may be coupled to the at least one steering sensor 109 to monitor user control (e.g., steering and/or throttle) of the vehicle 100. The controller 110 may be configured to receive one or more steering indicators (e.g., steering indicator signals) from the at least one steering sensor. In response to receiving one or more steering indicators (e.g., data such as steering position, steering rotation and/or throttle input), the controller 110 may be configured to process the one or more steering indicators and determine whether the steering indicator meets certain driving or turning criteria (described in more detail below). In response to a determination that the vehicle characteristics meet certain driving or turning criteria, the controller 110 may be coupled to the right motor 106a and the left motor 106b and may be configured to cause the right motor 106a and/or the left motor 106b to rotate in forward or reverse directions (or opposite directions) at one or more speeds to minimize plowing or oversteering.

In some embodiments, the controller 110 includes a plurality of communicatively coupled controllers. In some embodiments, each of a plurality of controllers is coupled to one of the motors to individually cause each of the motors to rotate in a certain direction at a certain speed based on certain criteria. For example, in one embodiment, a first controller is coupled to the right motor 106a and a second controller is coupled to left motor 106b. Such functionality can result in improved vehicle stability and control with less understeering. It is contemplated that, in some embodiments, any of the controls performed by the controller 110, described herein, may be incorporated into any of the structural embodiments, described herein.

Exemplary Sensor Configuration

Figure 3:
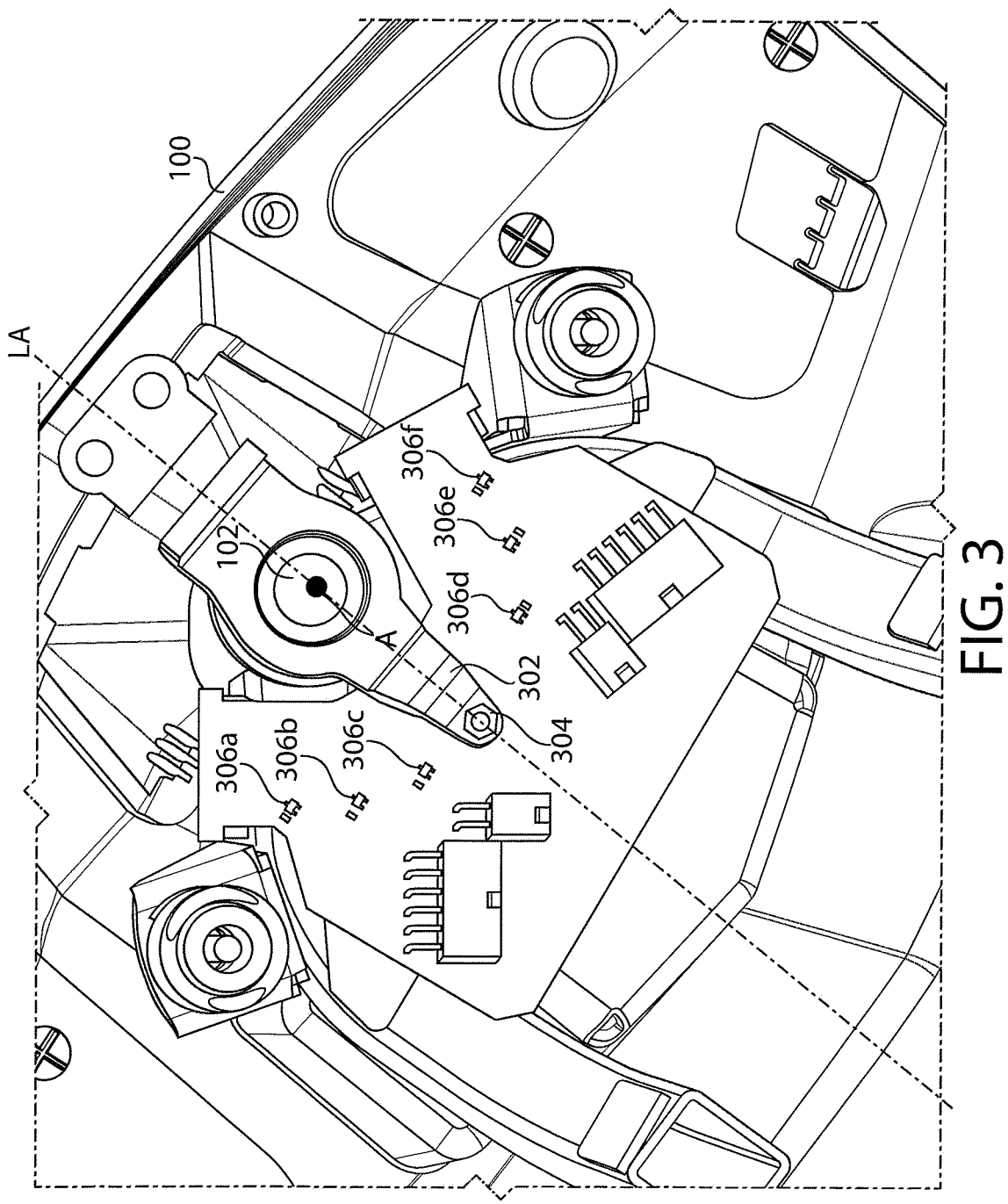
FIG. 3 is a bottom perspective view of a front portion of the vehicle with portions of the steering assembly removed to show an exemplary steering position sensor system in accordance with at least one embodiment of the invention including, for example, one or more of the embodiments reflected in the foregoing figures.

FIG. 3 illustrates an exemplary bottom view of a front portion of the vehicle 100 without some of the components of steering assembly 202 and the first and second directional control wheels 103a-103b. FIG. 3 illustrates an exemplary steering position sensor system in accordance with at least one embodiment of the invention.

As illustrated in this example, a control system of the vehicle 100 is configured to track steering position of the steering input 102 using a contactless sensor configuration. As shown, an extension arm 302 radially extends, relative to longitudinal axis A, from a bottom of the steering input 102. In one embodiment, the extension arm includes a target or magnet 304 attached proximate to an end of the extension arm 302. A plurality of sensors 306a-f, such as Hall Effect sensors, may be attached to a frame of the vehicle 100 and coupled to the controller 110 (not shown in FIG. 3 but previously shown in FIGS. 1A-1C). In some embodiments, the plurality of sensors 306a-f are radially spaced relative to a longitudinal axis A of the steering input 102 (where longitudinal axis A is approximately orthogonal to the page) with each of the plurality of sensors 306a-f indicating different steering positions of the steering input 102. As a user rotates the steering input 102, the steering input 102 causes the extension arm 302, and as a result, the magnet 304 to revolve around the longitudinal axis A of the steering input 102. As the magnet 304 revolves, the magnet 304 moves relative to the sensors 306a-f. When the magnet 304 is proximate to one of the sensors 306a-f, the one of the sensors 306a-f detects a magnetic field produced by the magnet 304, generates an output signal indicative of the detected magnetic field and transmits the output signal to the controller 110. The controller 110 then determines the position of the steering input 102 and, optionally, an amount of time needed for the steering input 102 to transition from one steering position to another steering position based on which of the one or more sensors 306a-f generated an output signal.

In some embodiments, each of the sensors 306a-f corresponds to a steering position of the steering input 102. For example, in FIG. 3, sensor 306a corresponds to a major left turn steering position; sensor 306b corresponds to an intermediate left turn steering position; sensor 306c corresponds to a minor left turn steering position; sensor 306d corresponds to a minor right turn steering position; sensor 306e corresponds to an intermediate right turn steering position; sensor 306f corresponds to a major right turn steering position.

In some embodiments, sensors 306a, 306f which correspond to the major left turn position and major right turn position, respectively, are positioned from 40 to 64 degrees; from 45 to 59 degrees; from 50 to 54 degrees; or approximately 52 degrees off the longitudinal axis LA of the vehicle 100 based on the vertical axis of the steering input 102. In some embodiments, sensors 306b, 306e which correspond to the intermediate left turn position and intermediate right turn position, respectively, are positioned from 25 to 51 degrees; from 30 to 45 degrees; from 35 to 40 degrees; or approximately 39 degrees off the longitudinal axis LA of the vehicle 100 based on the vertical axis of the steering input 102. In some embodiments, sensors 306c, 306d which correspond to the minor left turn position and minor right turn position, respectively, are positioned from 0 to 38 degrees; from 10 to 35 degrees; from 15 to 30 degrees; from 20 to 28 degrees; or approximately 24 degrees off the midline of the vehicle 100 based on the vertical axis of the steering input 102. In some embodiments, the position of the magnet 304 and the sensors 306a-f are reversed such that one or more sensors is on the extension arm 302 and one or more targets are on the frame of the vehicle 100.

Figure 4:
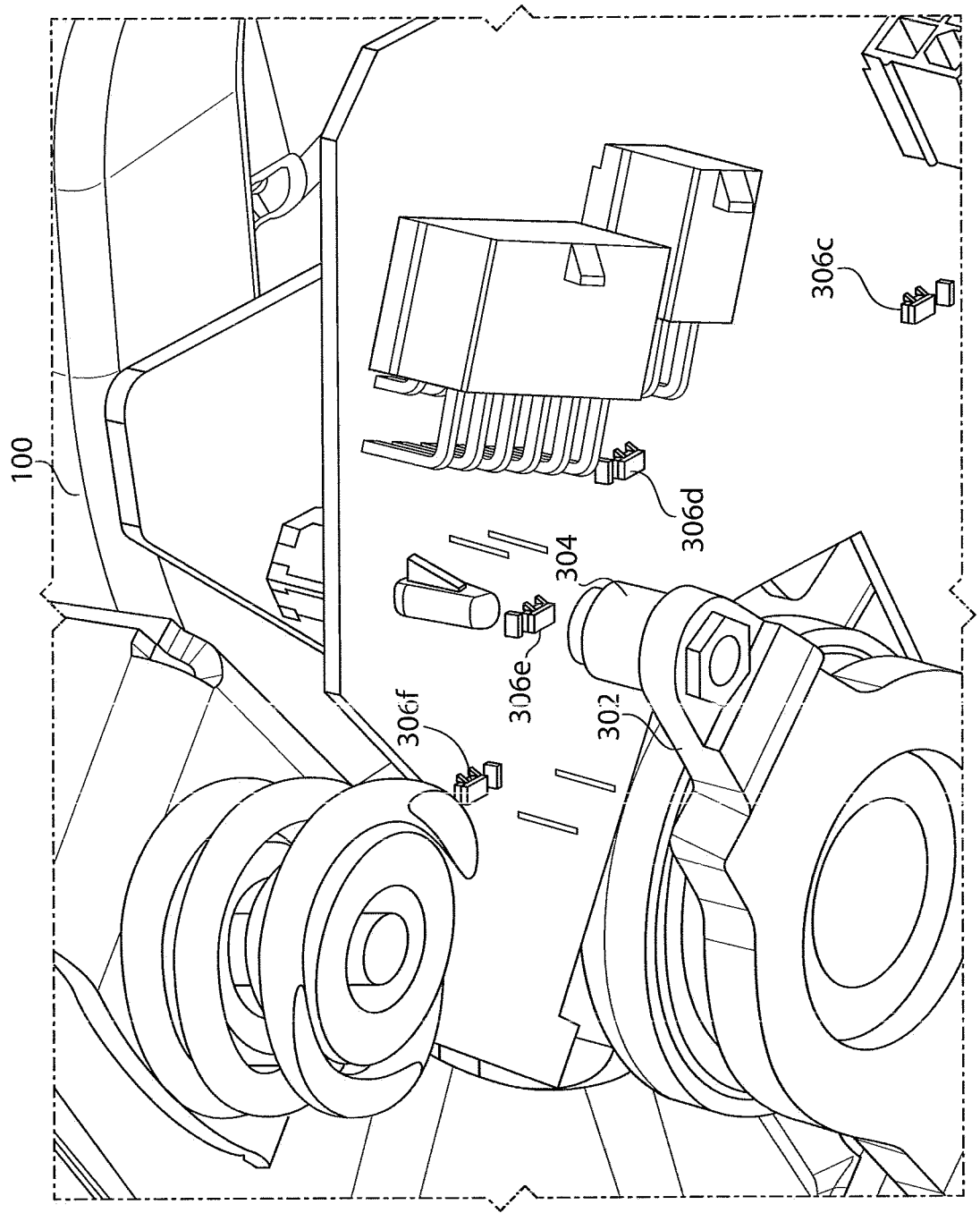
FIG. 4 is a bottom perspective view of a front portion of the vehicle of FIG. 3 showing the exemplary steering position sensor system from another angle in accordance with at least one embodiment of the invention including, for example, one or more of the embodiments reflected in the foregoing figures.

FIG. 4 is a bottom perspective view of a front portion of the vehicle 100 showing the exemplary steering position sensor system in FIG. 3. In FIG. 4, the magnet 304 is positioned over sensor 306e as a result of the steering input 102 being rotated by the user.

Figure 5A:
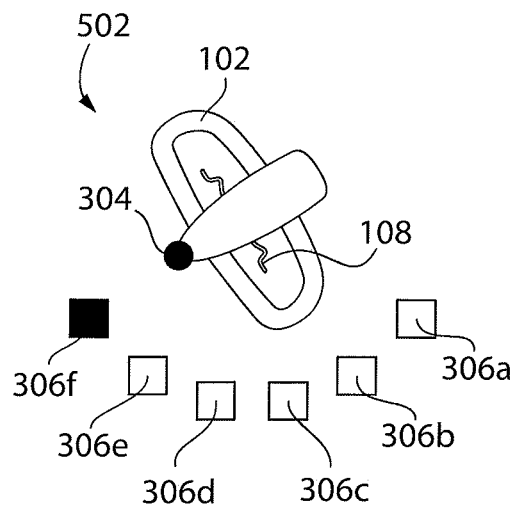
FIG. 5A is a schematic top view of an exemplary steering position sensor configuration detecting when the steering input is in a major turn position in accordance with at least one embodiment of the invention including, for example, one or more of the embodiments reflected in the foregoing figures.
Figure 5B:
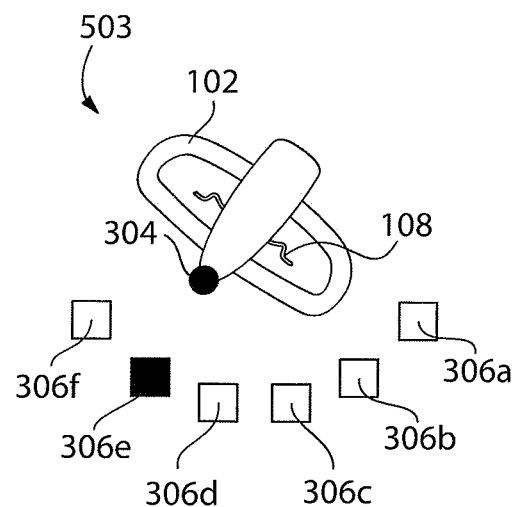
FIG. 5B is a schematic top view of the exemplary steering position sensor configuration of FIG. 5A detecting when the steering input is in an intermediate turn position in accordance with at least one embodiment of the invention including, for example, one or more of the embodiments reflected in the foregoing figures.
Figure 5C:
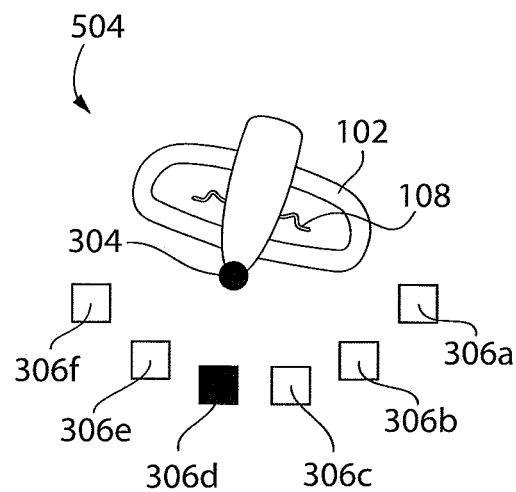
FIG. 5C is a schematic top view of the exemplary steering position sensor configuration of FIG. 5A detecting when the steering input is in a minor turn position in accordance with at least one embodiment of the invention including, for example, one or more of the embodiments reflected in the foregoing figures.

FIG. 5A-5C illustrate schematic representations 502-504 of the exemplary steering position sensor system shown in FIGS. 3-4 but shown from a top view rather than a bottom view.

In FIGS. 5A-5C, the steering position sensor system includes the steering input 102. Throttle 108 is coupled to the steering input 102, as well as the magnet 304. Sensors 306a-f are shown circumferentially around the magnet 304. In this example, the sensors 306a-f are Hall Effect sensors, but other sensors may be used, including capacitive and inductive sensors. The one of the sensors 306a-f positioned closest to the magnet 304 is represented as a solid square, while the other of the sensors 306a-f are represented as outlined squares. As discussed above, each of the sensors 306a-f represent a different steering position of the steering input 102 as positioned by a user. In FIG. 5A, schematic representation 502 illustrates a steering input 102 in a right major-turn steering position because the magnet 304 is positioned closest to sensor 306f, which is representative of a right major-turn steering position, as discussed above. Sensor 306f is represented as a solid square while the other of the sensors 306a-306e are represented as outlined squares. In FIG. 5B, schematic representation 503 illustrates a steering input 102 in a right intermediate-turn steering position because the magnet 304 is positioned closest to sensor 306e, which is representative of a right intermediate-turn steering position, as discussed above. Sensor 306e is represented as a solid square while the other of the sensors 306a-306d and 306f are represented as outlined squares. In FIG. 5C, schematic representation 504 illustrates a steering input 102 in a right minor-turn steering position because the magnet 304 is positioned closest to sensor 306d, which is representative of a right minor-turn steering position, as discussed above. Sensor 306d is represented as a solid square while the other of the sensors 306a-306c and 306e-306f are represented as outlined squares. Also, while not shown, the steering input 102 may be positioned at sensors 306a-c to represent the steering input 102 in corresponding left turn positions.

Steering Operating Modes

In some embodiments, improved mobility can be achieved by driving the right and left drive wheels 104a-b at different speeds and/or in different directions during different steering operating modes. Exemplary steering operating modes are described as follows.

Major Turn Mode

As an example of a steering operating mode, the user may direct the vehicle 100 to perform a major turn where the vehicle 100 rotates about a pivot point. In one embodiment, the pivot point is proximate the inside drive wheel (see for example vertical axis B in FIG. 6). In some embodiments, the pivot point is between the two drive wheels. In some embodiments, the pivot point is at a center point between two drive wheels. In some embodiments, the pivot point is on or near or proximate to the drive wheel axis. In one embodiment, the mobility vehicle turns at its tightest turning radius where the pivot point of the turn is outside the rear wheel track width. Although schematically illustrated as pivoting about a single point, in some embodiments, the pivot point is not precisely circular. In one embodiment, the axis of rotation B is aligned with the inside drive wheel during a major turn. Some configurations allow the vehicle 100 to navigate tight hallways or corridors. While some of the embodiments disclosed herein have a fixed pivot point, the present invention is not limited to a vehicle having a fixed axis of rotation in major turn mode.

Figure 6:
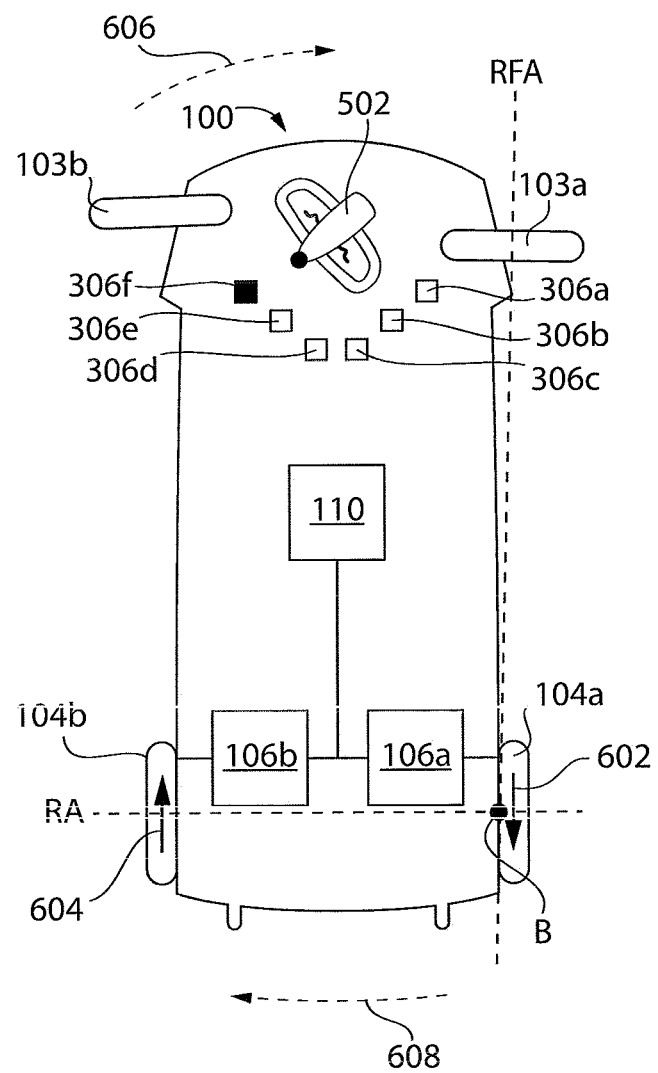
FIG. 6 is a schematic top view of a vehicle illustrating exemplary major turn functionality according to some embodiments of the invention in accordance with at least one embodiment of the invention including, for example, one or more of the embodiments reflected in the foregoing figures.

FIG. 6 is a schematic representation of vehicle 100 illustrating exemplary operation of major turn functionality according to some embodiments of the invention. For example, in FIG. 6, the steering input 102 is in a right major-turn position, as illustrated by schematic representation 502 (and as explained in detail in FIG. 5A). In some embodiments, an inside wheel is the wheel closest to a point that the vehicle turns about during the turn and the outside wheel is the wheel farthest from the point that the vehicle turns about during the turn. For example, in FIG. 6, the right directional control wheel 103a is the inside wheel and the left directional control wheel 103b is the outside wheel. In some embodiment, in accordance with a determination by the controller 110 that the steering position is in a right major-turn position, controller 110 determines that major turn entering criteria is met.

In response to determining that major turn entering criteria is met, in some embodiments, the controller 110 causes the vehicle 100 to operate in major turn mode by providing a first drive signal to the left motor 106b to cause the left motor 106b to drive the left drive wheel 104b in a forward direction at a first speed and by providing a second drive signal to the right motor 106a to cause the right motor 106a to drive the right drive wheel 104a in a forward direction at a second speed. In some embodiments, the first drive signal provided to the left motor 106b causes the left motor 106b to apply torque to the left drive wheel 104b in a forward direction (represented by the arrow 604) and the second drive signal provided to the right motor 106a causes the right motor 106a to apply torque to the right drive wheel 104a in a rearward direction (represented by the arrow 602). In some embodiments, while the vehicle 100 is operating in major turn mode, the first drive signal has an approximately similar power (e.g., voltage, current) level as the second drive signal. In some embodiments, while the vehicle 100 is operating in major turn mode, the first drive signal has a polarity opposite the second drive signal. In some embodiments, while the vehicle 100 is operating in major turn mode, the first drive signal provided to the inside drive motor (e.g., right drive motor 106a) causes the inside drive wheel (e.g., right drive wheel 104a) to be stationary. In some embodiments, the first drive signal causes a clutch to disconnect the inside drive wheel from the inside drive motor. This allows the vehicle 100 to make a tighter turn or even rotate about an axis B, in a clockwise direction as illustrated by arrows 606, 608.

In some embodiments, the second speed is the same as the first speed. In some embodiments, the second speed is different than the first speed. In some embodiments, the first speed of a first motor is 0 mph (i.e., stationary) or approximately 0 mph. In addition, controller 110 causes the right drive wheel 104a and the left drive wheel 104b to drive at reduced speeds (e.g., a speed that falls below a predetermined speed value (e.g., 25% of full speed of the vehicle 100). This allows the vehicle 100 to avoid understeering or plowing. As discussed herein, the term "speed" may refer to actual wheel speed while no load is applied to the right and left drive wheels 104a-104b. The term "speed" may also refer to an intended wheel speed commanded by the controller 110 via the one or more drive signals. In some embodiments, the commanded wheel speed may differ from the actual wheel speed of either the right or left drive wheels 104a-104b due to external forces being exerted on each drive wheel 104a-104b. For example, in some embodiments, while the absolute values of the drive signals to each drive motor 106a-106b may be similar, the reaction of each drive wheel 104a-104b may be different because the vehicle 100 uses steered right and left front wheels 103a-103b, rather than caster wheels.

Arrow representations may be used to illustrate the speed and direction of the wheels. To illustrate a reverse direction for a wheel, an arrow points towards the rear of the vehicle 100, as illustrated by arrow 602 at right drive wheel 104a in FIG. 6. To illustrate a forward direction for a wheel, an arrow points towards the front of the vehicle 100, as illustrated by arrow 604 at left drive wheel 104b in FIG. 6. The length of the tail of the arrow corresponds to the speed of the corresponding wheel. By rotating the motors and wheels at certain speeds and in certain direction (e.g., as shown in FIG. 6 and described above and below), the vehicle 100 has a reduced turning radius, thereby allowing the vehicle 100 to navigate tight hallways and corridors. This results in improved functionality and usability for the vehicle 100 because the vehicle 100 is now usable in more environments and situations than a vehicle with a larger turning radius.

Entering Major Turn Mode
Entering Major Turn Mode—Transition to Major Turn

Figure 7A:
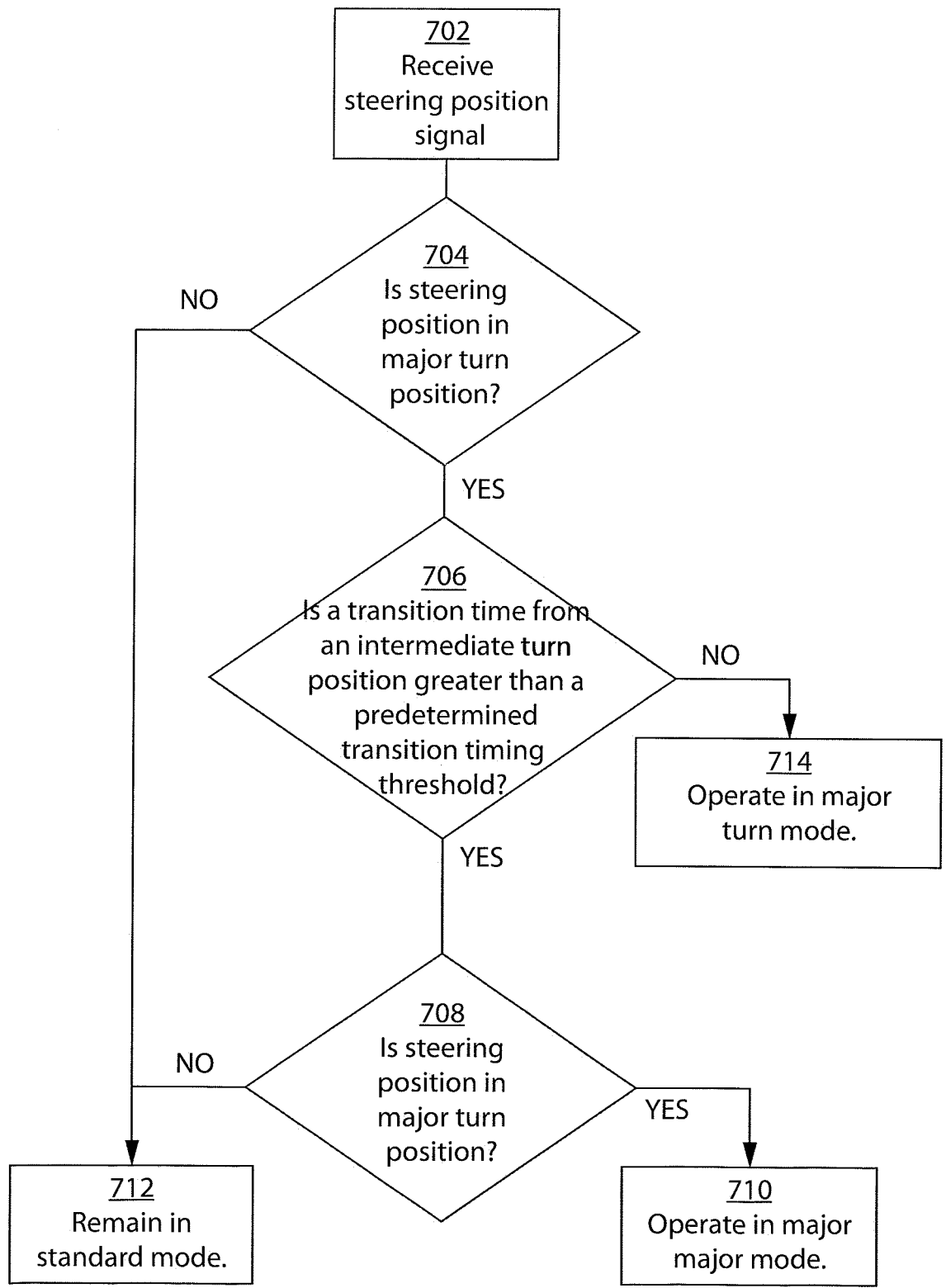
FIG. 7A is a flow chart illustrating functionality for determining whether a vehicle meets major turn entering criteria, according to some embodiments of the invention including, for example, one or more of the embodiments reflected in the foregoing figures.
Figure 7B:
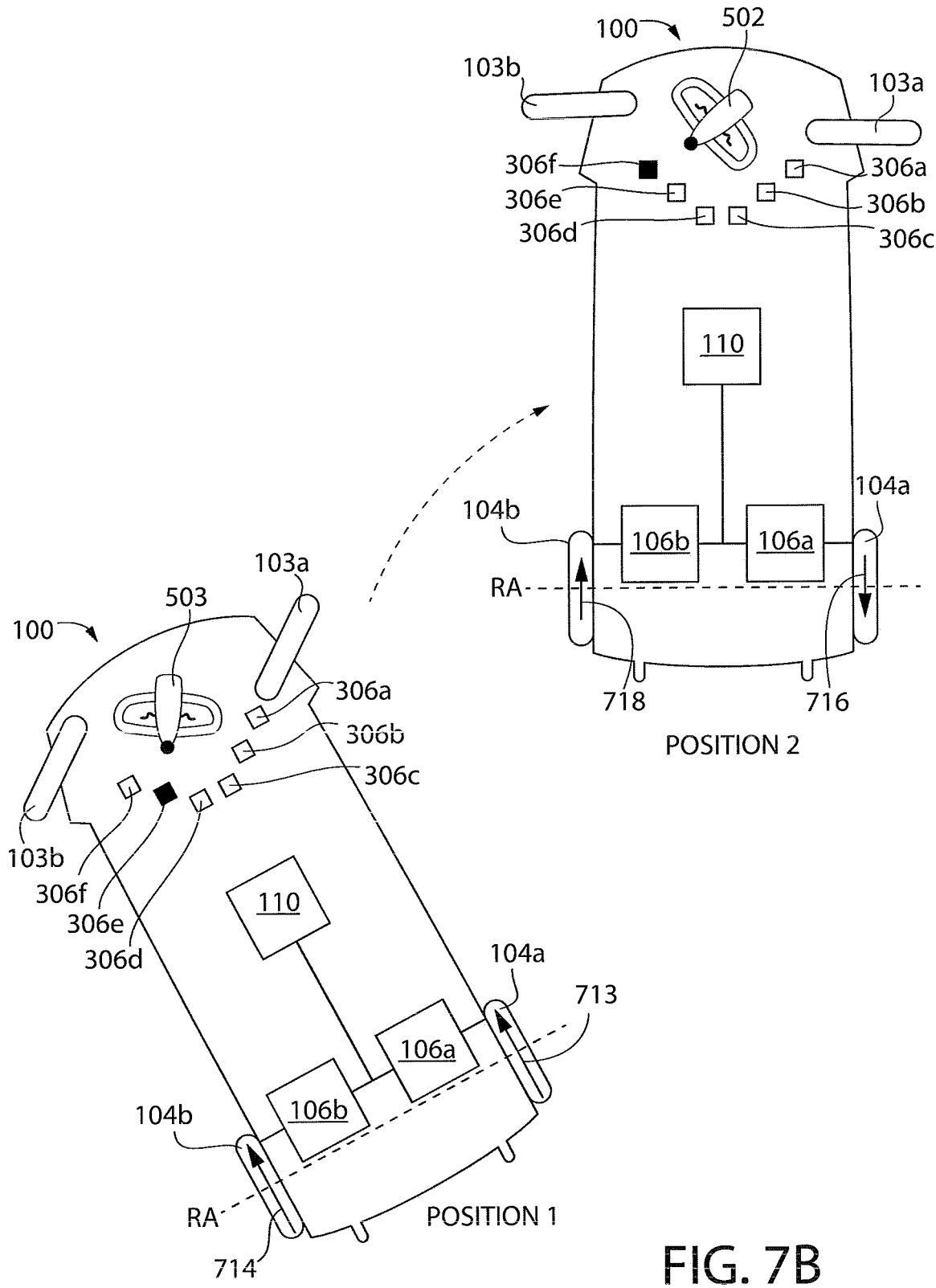
FIG. 7B is a schematic representation of vehicle illustrating exemplary major turn entering functionality of FIG. 7A, according to some embodiments of the invention including, for example, one or more of the embodiments reflected in the foregoing figures.

FIG. 7A is a flow chart illustrating functionality for determining whether a vehicle 100 meets major turn entering criteria, according to some embodiments of the invention. In one embodiment, the functionality is intended to determine whether a user of the vehicle indicates an intent for the vehicle to enter major turn mode. In some embodiments, the system is configured to prevent the vehicle from entering major turn mode when conditions indicate that major turn mode is not desired by the user in spite of the steering input 102 being in a position indicative of major turn mode. For example, a user may inadvertently position a tiller at a turning limit or the tiller may be confronted with an untended force that causes the tiller to inadvertently position at a turning limit. In some embodiments, therefore, tiller position alone should not indicate an intention to enter major turn mode. FIG. 7B is a schematic representation of vehicle 100 illustrating exemplary major turn entering functionality of FIG. 7A, according to some embodiments of the invention.

In FIG. 7A, at step 702, the controller 110 receives a steering indicator (e.g., steering position signal) from a steering position sensor.

At step 704, the controller 110 determines whether the steering position of the steering input 102 is in a major turn position. For example, in FIG. 7B, at position 1, the steering position of the steering input 102 is in an intermediate-turn position (illustrated by the engaged sensor in an intermediate turn position) and is thus not in the major turn position, so the controller 110 proceeds to step 712. At position 2, the steering position of the steering input 102 has transitioned from the intermediate-turn position to the major turn position, so the controller 110 proceeds to step 706.

At step 706, the controller 110 determines whether the steering input 102 has transitioned from an intermediate turn position to the major turn position in an amount of time that is greater than a predetermined steering rotation timing threshold (e.g., 100 ms). In some embodiments, the predetermined steering rotation timing threshold is a value less than 250 ms, less than 200 ms, less than 150 ms, or less than 100 ms. In some embodiments, the predetermined steering rotation timing threshold is a value of approximately 250 ms, approximately 200 ms, approximately 150 ms, or approximately 100 ms. If the controller 110 determines that the steering input 102 has transitioned from an intermediate turn position to a major turn position in an amount of time (e.g., 300 ms) that is greater than a predetermined steering rotation timing threshold (e.g., 100 ms), the controller 110 proceeds to step 708. If the controller 110 determines that the steering input 102 has transitioned from an intermediate turn position to a major turn position in an amount of time (e.g., 50 ms) that is less than a predetermined steering rotation timing threshold (e.g., 100 ms), the controller 110 proceeds to step 714.

At step 708, the controller 110 confirms whether the steering position of the steering input 102 remained in a major turn position. If the controller 110 determines the steering position of the steering input 102 remains in the major turn position, the controller 110 proceeds to step 710. If the controller 110 determines the steering position of the steering input 102 has transitioned to another turn position (e.g., an intermediate turn position) the controller 110 proceeds to step 712 and remains in standard driving mode. To allow the right motor 106a and the left motor 106b to remain in standard driving mode, the controller 110 provides a drive signal to the right motor 106a to drive the right drive wheel 104a in a forward direction at a commanded speed indicated by the throttle 108, and provides a drive signal to the left motor 106b to drive the left drive wheel 104b in a forward direction at a commanded speed indicated by the throttle 108. In FIG. 7B, arrows 713 and 714 illustrate the speed and direction of the right and left drive wheels 104a-104b at position 1. By confirming whether the steering position is still in a major turn position, the controller 110 can verify that the user desires to enter major turn mode, and hasn't accidentally transitioned to a major turn position, while only intending to remain in an intermediate turn position. This will delay activation of major turn mode to prevent the vehicle 100 from inadvertently entering major turn mode when it is not intended by the user.

At step 710, if the controller 110 confirms that the steering position of the steering input 102 has remained in a major turn position, the controller 110 causes the right motor 106a and left motor 106b to operate in major turn mode (as described in FIG. 6).

At step 712, if the controller 110 does not confirm that the steering position of the steering input 102 remains in a major turn position, the controller 110 causes the right motor 106a and left motor 106b to remain in standard driving mode.

At step 714, if the controller 110 determines that the steering input 102 has transitioned from an intermediate turn position to the major turn position in an amount of time that is less than a predetermined steering rotation timing threshold, the controller 110 causes the right motor 106a and left motor 106b to operate in major turn mode. In FIG. 7B, arrows 716 and 718 illustrate the speed and direction of the right and left drive wheels 104a-104b at position 2.

Major Turn Entering—Rate of Change

In some embodiments, at step 706, instead of the controller 110 determining an amount of time a steering input 102 took to transition from an intermediate turn position to the major turn position that is less than or greater than a predetermined steering rotation timing threshold, the controller 110 may determine whether a rate of change of the steering input 102 is less than a predetermined steering rate of change threshold. If the controller 110 determines that the rate of change of the steering input 102 is less than a predetermined steering rate of change threshold, the controller 110 proceeds to step 708. If the controller 110 determines that the rate of change of the steering input 102 is greater than a predetermined steering rate of change threshold, the controller 110 proceeds to step 714.

In some embodiments, the predetermined steering rate of change threshold is approximately 30°/0.5 s; approximately 25°/0.5 s; approximately 20°/0.5 s; approximately 15°/0.5 s; or approximately 10°/0.5 s. In some embodiments, the predetermined steering rate of change threshold is less than 30°/0.5 s; less than 25°/0.5 s; or less than 20°/0.5 s. In some embodiments, the predetermined steering rate of change threshold is greater than 10°/0.5 s; or greater than 15°/0.5 s.

Major Turn Entering—Maintain Major Turn Position Embodiment

In some embodiments, at step 706, instead of the controller 110 determining that the amount of time a steering input 102 took to transition from an intermediate turn position to the major turn position is less than or greater than a predetermined steering rotation timing threshold, the controller 110 calculates a steering position time lapse in order to determine whether to operate the vehicle 100 in major turn mode. The steering position time lapse may represent an amount of time that a steering position is maintained in a major turn position. If the controller 110 determines a steering position time lapse is greater than a predetermined major turn position timing threshold (e.g., 250 ms), the controller 110 operates the right motor 106a and left motor 106b to operate in major turn mode. If the controller 110 determines a steering position time lapse is less than a predetermined major turn position timing threshold (e.g., 250 ms), the controller 110 operates the right motor 106a and left motor 106b in standard driving mode.

Major Turn Entering—Throttle Input Embodiment

In some embodiments, the controller 110 determines whether steering input 102 has transitioned from an intermediate turn position to the major turn position and whether the throttle input exceeds a throttle input threshold to determine whether to cause the vehicle 100 to operate in major turn mode or in standard driving mode. If the controller 110 determines that the steering input 102 has transitioned from an intermediate turn position to the major turn position, and that the throttle input exceeds a throttle input threshold, the controller 110 causes the right motor 106a and left motor 106b to operate in major turn mode. If the controller 110 determines that the steering input 102 has transitioned from an intermediate turn position to the major turn position, and the throttle input does not exceed a throttle input threshold, the controller 110 causes the right motor 106a and left motor 106b to operate in standard driving mode.

In some embodiments, the throttle input threshold is greater than 10%; greater than 20%; greater than 30%; greater than 40%; greater than 50%; greater than 60%; greater than 70%; greater than 80%; or greater than 90% of full throttle. In some embodiments, the throttle input threshold is from 5% to 50%; from 10% to 40%; from 15% to 35%; from 20% to 30%; or approximately 25% of full throttle.

Major Turn Entering—Throttle Input and Turn Rate Embodiment

In certain situations, entering major turn mode can present undesirable conditions for the user of vehicle 100. While in a normal driving mode (e.g., a vehicle 100 driving in a forward direction), if the controller 110 simply causes the vehicle 100 to perform a major turn in response to a quick turn of the steering input 102 by the user, the vehicle 100 may understeer or plow. To avoid these problem, the controller 110 is configured to cause the right and left drive wheels 104a-104b to rotate at certain speeds in certain directions based on the steering position of the steering input 102, the steering rotation speed of the steering input 102 and the throttle input of the throttle 108 that allow the vehicle 100 to safely enter a major turn while being more responsive to the user's control inputs of the vehicle 100.

Figure 7C:
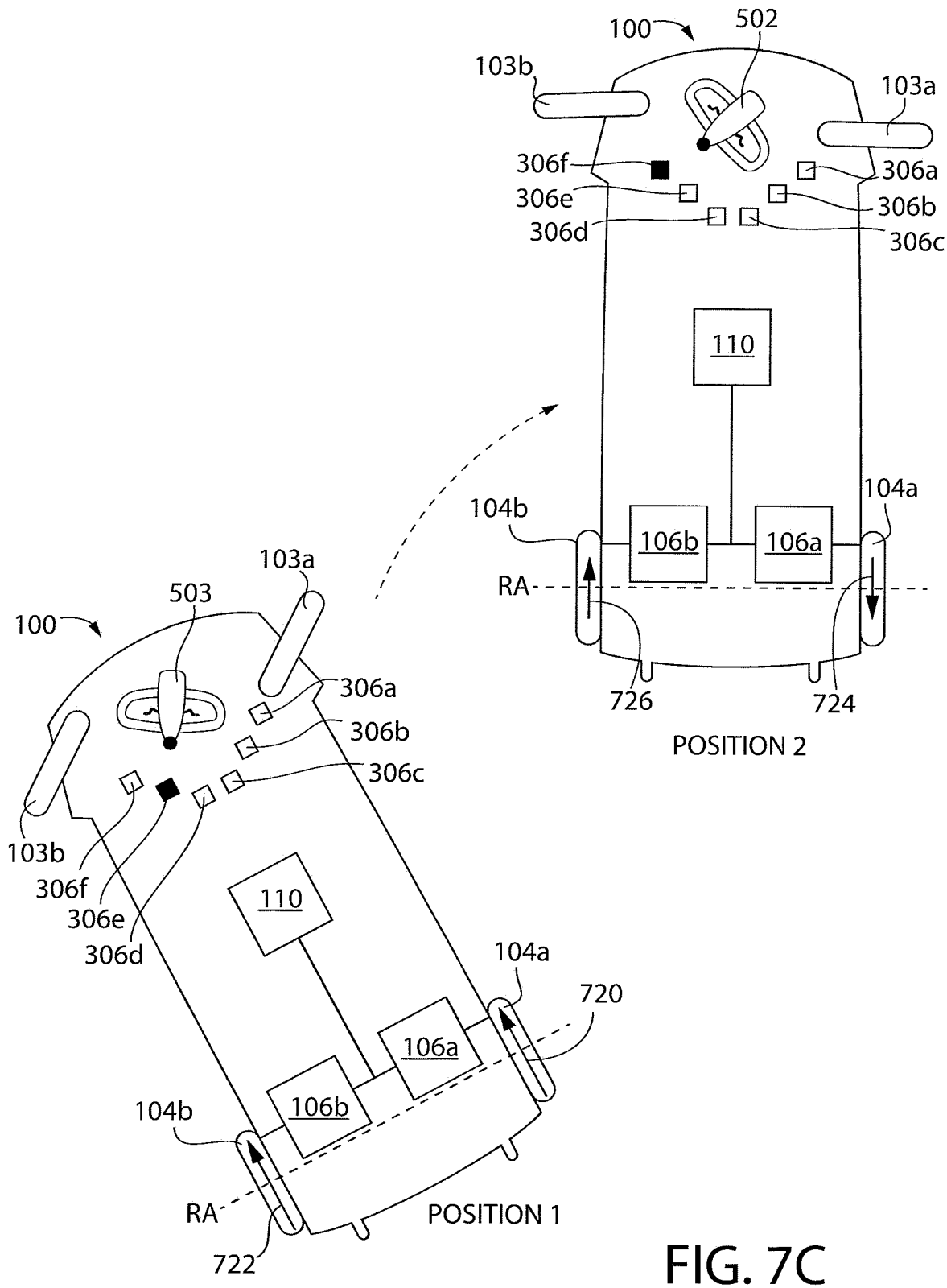
FIG. 7C is a schematic representation of a vehicle illustrating exemplary major turn entering functionality where the steering input has a slow transition to a major turn position to enter into the major turn mode of FIG. 6, according to some embodiments of the invention including, for example, one or more of the embodiments reflected in the foregoing figures.

FIG. 7C is a schematic representation of vehicle 100 illustrating exemplary major turn entering functionality where the steering input 102 has a slow transition to a major turn position to enter into the major turn mode of FIG. 6, when certain criteria are met. In these embodiments, the controller 110 may operate the vehicle 100 in a major turn mode when the controller 110 determines that certain major turn mode entering criteria, and specifically, slow transition major turn criterion is met. In some embodiments, slow transition major turn criterion is met when the steering position of the steering input 102 has transitioned from a minor or intermediate turn position to a major turn position in an amount of time that exceeds a steering rotation timing threshold (e.g., 300 ms) (or, in some embodiments, a steering rotation speeds that falls below a steering rotation speed threshold) and the throttle input exceeds a throttle input threshold.

In FIG. 7C, the vehicle 100 is shown in two positions: position 1 and position 2, with position 2 occurring after position 1. In position 1, the steering input 102 is in a right intermediate-turn position, as illustrated by schematic representation 503. The controller 110 determines that the steering position of the steering input 102 meets standard drive mode criteria because the steering position of the steering input 102 is in an intermediate-turn position. In response to determining that the steering position of the steering input 102 meets standard drive mode criteria, the controller 110 causes the right motor 106a and the right drive wheel 104a to rotate in a forward direction at a speed based on the throttle input, and the left motor 106b and the left drive wheel 104b are rotating in a forward direction at a speed that is also based on the throttle input. Arrows 720 and 722 illustrate the speed and direction of the right and left drive wheels 104a-104b at position 1. As shown in the transition from position 1 to position 2, the steering input 102 transitions from the right intermediate-turn position to a right major-turn position in, for example, 300 ms. In some embodiments, the controller 110 determines that slow transition major turn criterion is met because the steering position of the steering input 102 has transitioned from an intermediate turn position 503 to a major turn position 502 in an amount of time (i.e., 300 ms) that exceeds a steering rotation timing threshold (e.g., 250 ms), and the throttle input exceeds a throttle input threshold. In response to the controller determining that slow transition major turn criterion is met, as shown in position 2, the controller 110 causes the vehicle 100 to operate in a major turn mode as shown in FIG. 6. Specifically, the controller 110 provides a drive signal that commands (or in some embodiments, causes) a first motor (i.e., right motor 106a) to drive a first wheel (i.e., right drive wheel 104a) in a reverse direction at a speed that falls below a predetermined speed value (e.g., 50% of full speed of the vehicle 100) and causes a second motor (i.e., left motor 106b) to drive a second wheel (i.e., the left drive wheel 104b) in a forward direction at a speed that falls below the predetermined speed value, despite the throttle input exceeding the throttle input threshold. In some embodiments, the speeds of the two wheels are approximately the same. In some embodiments, the speeds of the two wheels are different. Arrows 724 and 726 illustrate the speed and direction of the right and left drive wheels 104a-104b at position 2. By incorporating the above major turn entering functionality, the vehicle 100 can safely enter a major turn without understeering or plowing while still being responsive to a slow turn by a user.

Figure 7D:
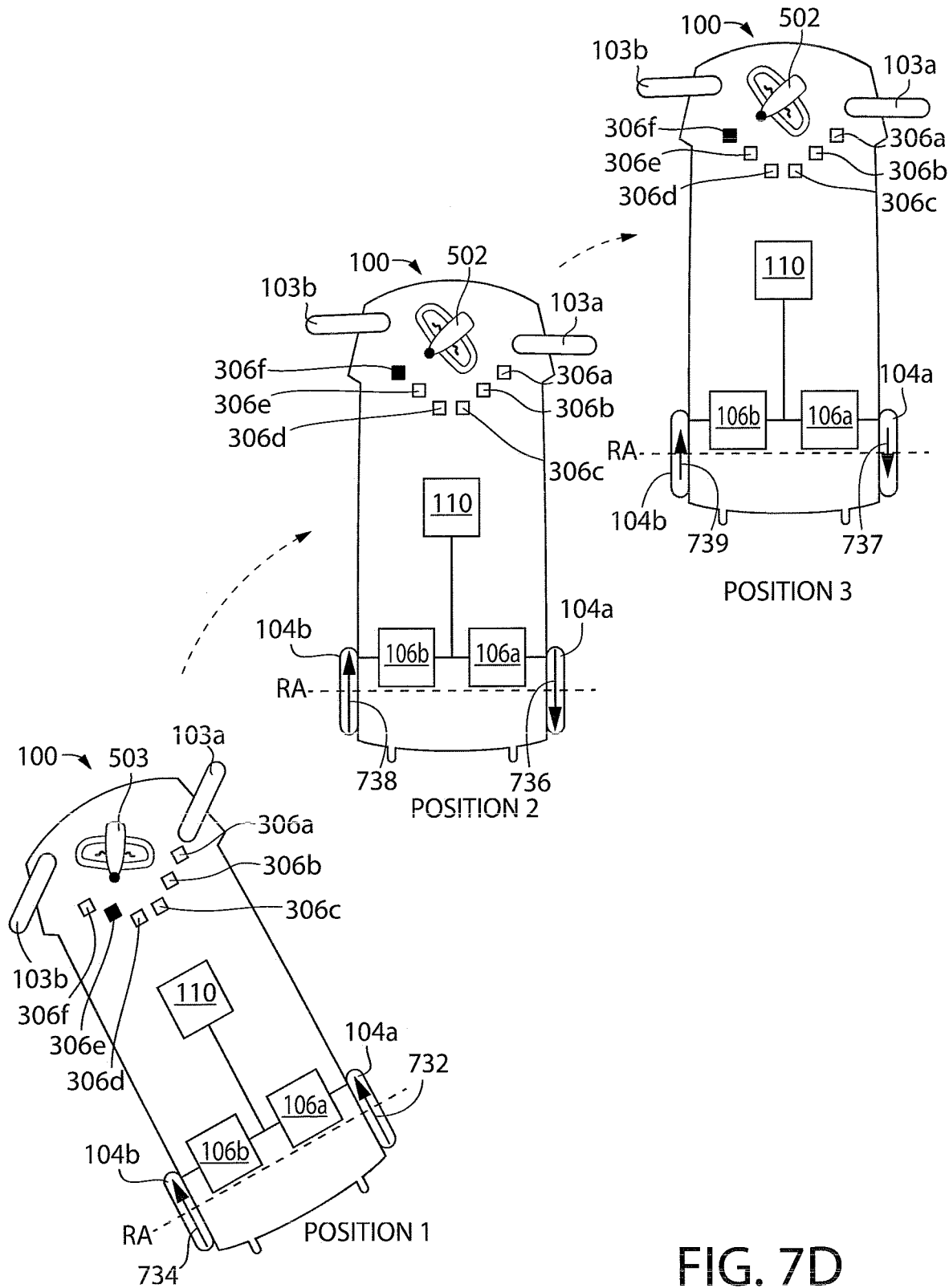
FIG. 7D is a schematic representation of a vehicle illustrating exemplary major turn entering functionality where the steering input has a fast transition to a major turn position to enter into the major turn mode of FIG. 6, according to some embodiments of the invention including, for example, one or more of the embodiments reflected in the foregoing figures.

FIG. 7D is a schematic representation of vehicle 100 illustrating exemplary major turn entering functionality where the steering input 102 has a fast transition to a major turn position to enter into the major turn mode of FIG. 6, according to some embodiments of the invention. In these embodiments, the controller 110 may operate the vehicle 100 in a major turn mode when the controller 110 determines that certain major turn mode entering criteria, and specifically, fast transition major turn criterion is met. In some embodiments, fast transition major turn criterion is met when the steering position of the steering input 102 has transitioned from a minor or intermediate turn position to a major turn position in an amount of time that is less than a steering rotation timing threshold (e.g., 300 ms) (or, in some embodiments, a steering rotation speeds that is less than a steering rotation speed threshold) and the throttle input exceeds a throttle input threshold.

In FIG. 7D, the vehicle 100 is shown in two positions: position 1 and position 2, with position 2 occurring after position 1. In some embodiments, the vehicle 100 may also be in a third position (e.g., position 3) occurring after position 2. In position 1, the controller 110 determines that the steering input 102 is in a right intermediate-turn position, as illustrated by schematic representation 503. In response to a determination that the steering input 102 is in a right intermediate-turn position, the controller 110 operates the vehicle 100 in standard drive mode (as described in position 1 of FIG. 10). Arrows 732 and 734 illustrate the speed and direction of the right and left drive wheels 104a-104b at position 1. While in position 1, the steering input 102 has transitioned from the right intermediate-turn position to a right major-turn position (as shown in position 2) after, for example, 200 ms. In some embodiments, the controller 110 determines that fast transition major turn criterion is met because the steering position of the steering input 102 has transitioned from an intermediate turn position 503 to a major turn position 502 in an amount of time (i.e., 200 ms) that is less than a steering rotation timing threshold (e.g., 250 ms), and the throttle input exceeds a throttle input threshold. In response to a determination that fast transition major turn criterion is met, as shown in position 2, the controller 110 causes the vehicle 100 to operate in a major turn mode as shown in FIG. 6. Specifically, in this example, the controller 110 provides a drive signal that commands a first motor (i.e., right motor 106a) to drive a first wheel (i.e., first drive wheel 104a) in a reverse direction at a speed that exceeds a predetermined speed value (e.g., 50% of full wheel speed) and provides a drive signal that commands a second motor (i.e., left motor 106b) to drive a second wheel (i.e., the left drive wheel 104b) in a forward direction at a speed that exceeds the speed value during a first time period. In some embodiments, the speeds of the first drive wheel 104a and the second drive wheel 104b at position 2 are approximately the same. In some embodiments, the speeds of the first drive wheel 104a and the second drive wheel 104b at position 2 are approximately different. Arrows 736 and 738 illustrate the speed and direction of the right and left drive wheels 104a-104b at position 2. In some embodiments, after the first time period, at position 3, the controller 110 provides a drive signal that commands the first motor (i.e., right motor 106a) to drive the first wheel (i.e., first drive wheel 104a) in the forward direction at a speed that falls below the predetermined speed value and provides a drive signal that commands the second motor (i.e., left motor 106b) to drive the second wheel (i.e., the left drive wheel 104b) in the forward direction at a speed that falls below the predetermined speed value during a second time period, despite the throttle input exceeding the throttle input threshold. In some embodiments, the speeds of the first drive wheel 104a and the second drive wheel 104b at position 3 are approximately the same. In some embodiments, the speeds of the first drive wheel 104a and the second drive wheel 104b at position 3 are approximately different. Arrows 737 and 739 illustrate the speed and direction of the right and left drive wheels 104a-104b at position 2. At position 3, the controller 110 is operating the vehicle 100 in major turn mode as shown in FIG. 6. By incorporating the above major turn entering functionality, in some embodiments, the vehicle 100 can safely enter a major turn without understeering or plowing despite a throttle input from a user that represents a user intent to drive the vehicle 100 at a fast speed that usually causes understeering.

Adapting Major Turn Mode Based on Measured Turn Rate

Figure 8A:
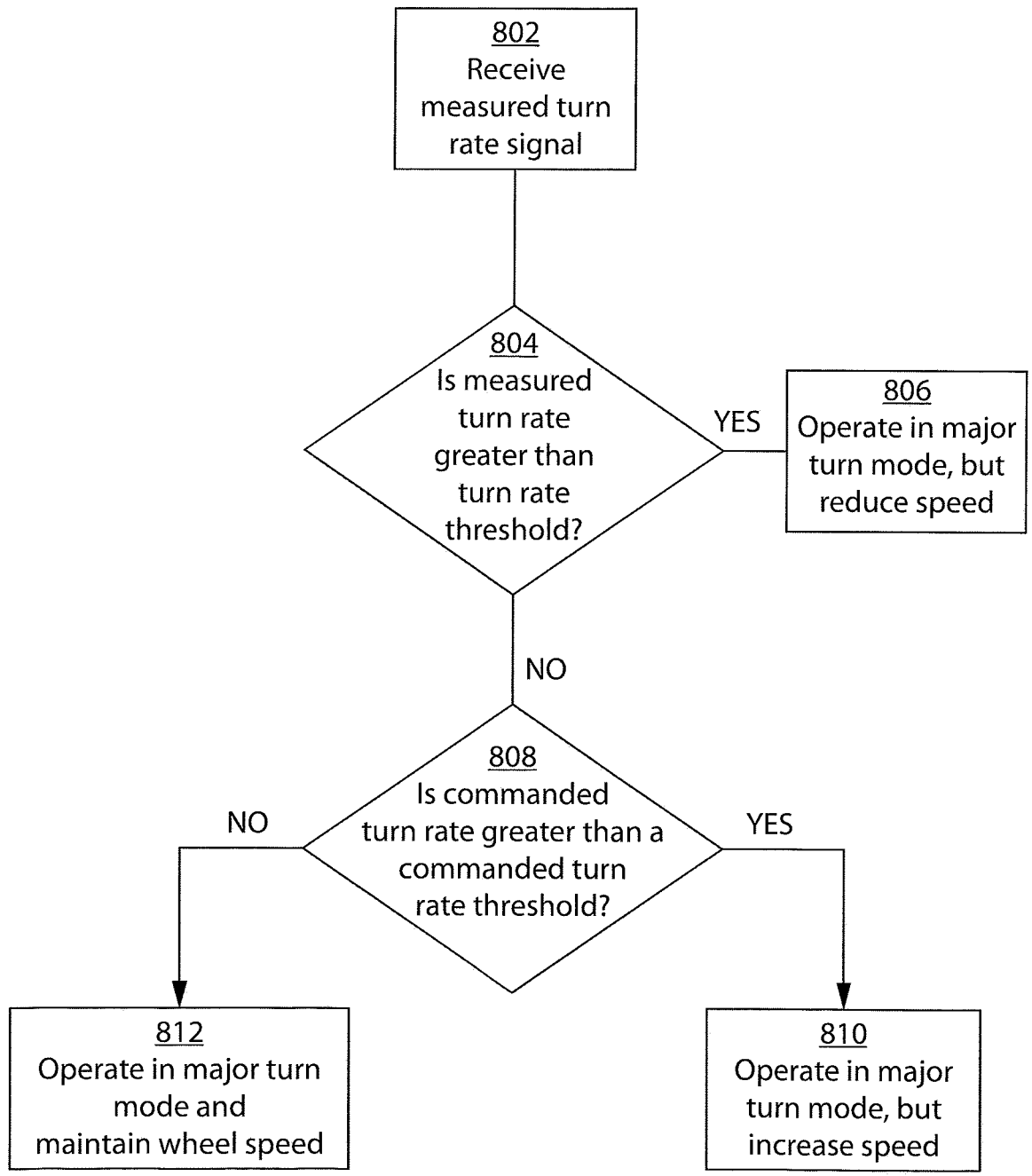
FIG. 8A is a flow chart illustrating functionality for selectively increasing, decreasing, or maintaining wheel speeds based on measured turn rate, while in major turn mode, according to some embodiments of the invention including, for example, one or more of the embodiments reflected in the foregoing figures.
Figure 8B:
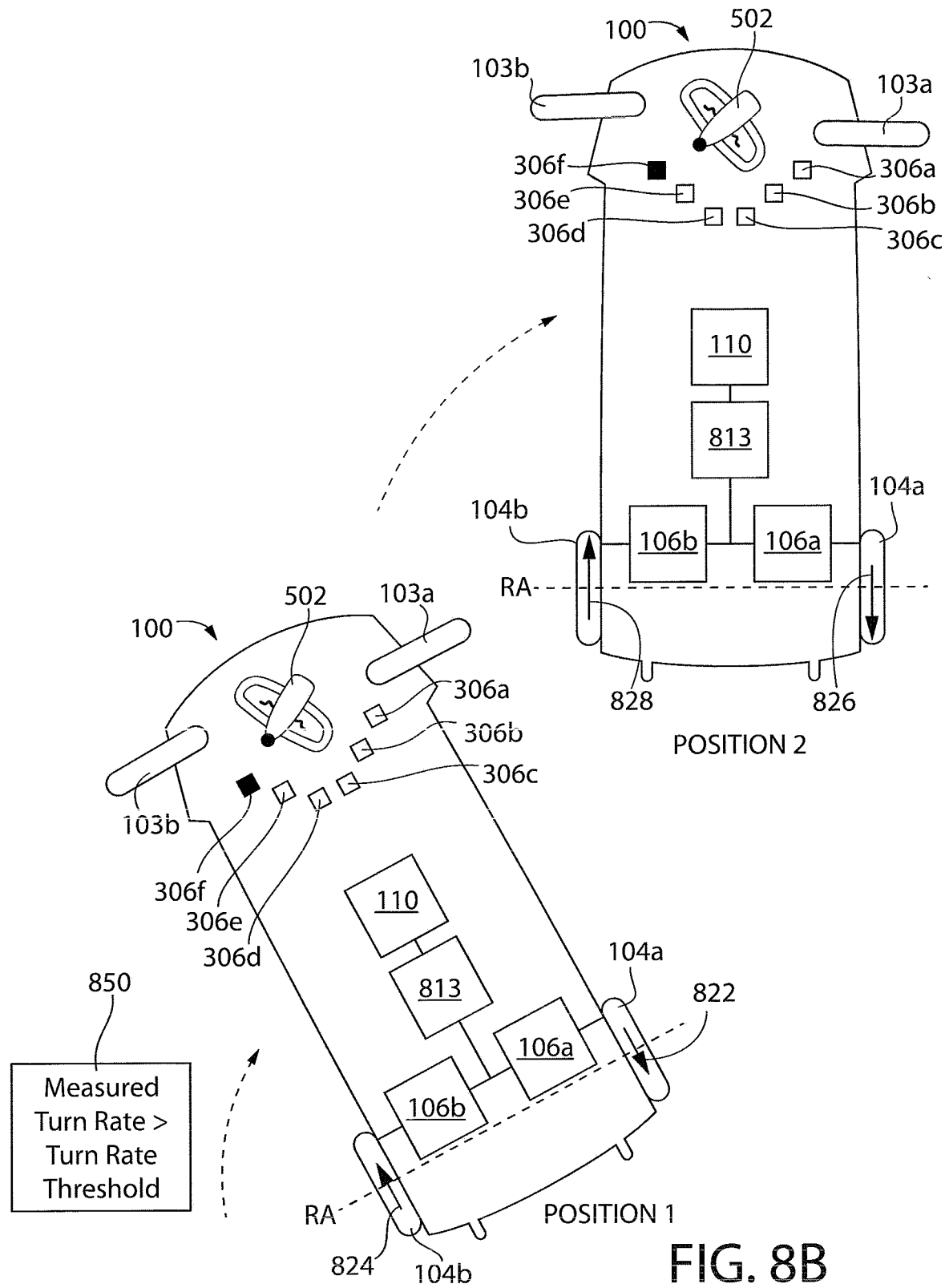
FIGS. 8B-8C are schematic representations of a vehicle illustrating functionality for selectively increasing or decreasing wheel speeds based on measured turn rate, while in major turn mode of FIG. 8A, according to some embodiments of the invention including, for example, one or more of the embodiments reflected in the foregoing figures.
Figure 8C:
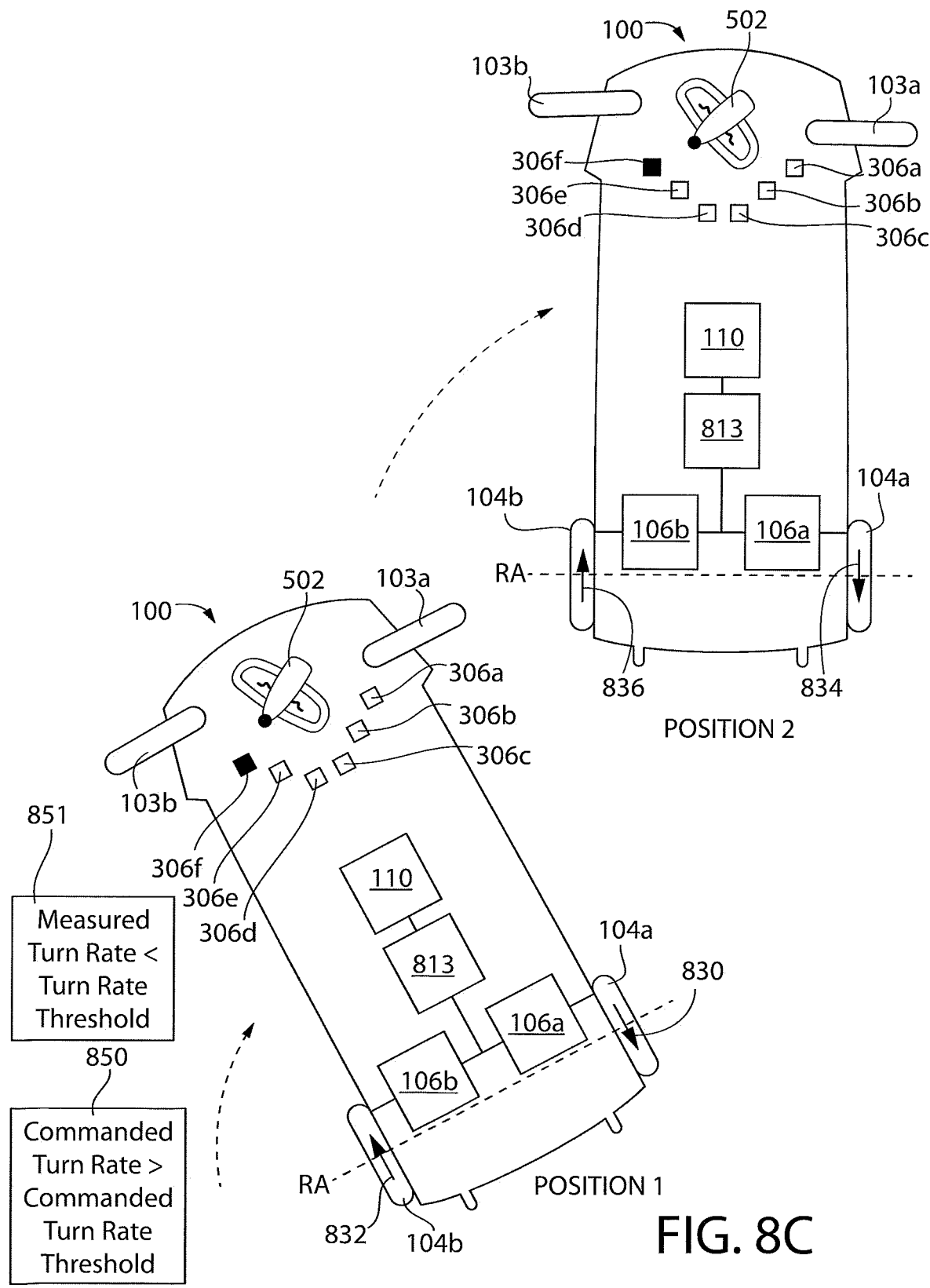

FIG. 8A is a flow chart illustrating functionality for selectively increasing, decreasing, or maintaining wheel speeds based on measured turn rate, while in major turn mode, according to some embodiments of the invention. FIGS. 8B-8C are schematic representations of vehicle 100 illustrating functionality for selectively increasing or decreasing wheel speeds based on measured turn rate, while in major turn mode of FIG. 8A, according to some embodiments of the invention. In FIGS. 8B-8C, the vehicle 100 is similar to the vehicle 100 shown in FIG. 7B. The vehicle 100 may also include an inertial measurement device 813 configured to detect a turn rate of the vehicle 100. Examples of an inertial measurement device 813 include accelerometers, gyroscopes, or inclinometers, or MEMS sensors configured to measure turn rate of the vehicle 100.

In FIG. 8A, while the vehicle is operating in major turn mode, at step 802, the controller 110 receives a measured turn rate signal from a turn rate sensor. The measured turn rate signal may be representative of the turn rate of a vehicle 100. In some embodiments, the turn rate sensor may include one or more of: accelerometers, gyroscopes or any inertial measurement devices. The turn rate sensor may be attached to the vehicle 100.

At step 804, the controller 110 determines whether the measured turn rate of the vehicle 100 is greater than a turn rate threshold. If the controller 110 determines that the measured turn rate of the vehicle 100 is greater than a predetermined turn rate threshold, the controller 110 proceeds to step 806. If the controller 110 determines that the measured turn rate of the vehicle 100 is less than the predetermined turn rate threshold, the controller 110 proceeds to step 808.

At step 806, the controller 110 continues to provide one or more drive signals that commands the first and second motor to operate in major turn mode by providing a third drive signal to the first motor, the third drive signal configured to command the first motor to drive the first drive wheel in a forward direction at a third speed that is less than the first speed. The controller 110 may provide a fourth drive signal to the second motor, the fourth drive signal configured to command the second motor to drive the second drive wheel in a reverse direction at a fourth speed that is less than the second speed. FIG. 8B illustrates functionality for selectively decreasing wheel speeds based on measured turn rate. In FIG. 8B, at position 1, the vehicle 100 is operating in major turn mode. Arrows 822 and 824 illustrate the speed and direction of the right and left drive wheels 104a-104b at position 1. At position 1, the controller 110 determines that the vehicle 100 has a measured turn rate of 2.0 Gs that is greater than a turn rate threshold (1.5 Gs), as indicated by turn rate representation 850. In response to a determination that the measure turn rate of 2.0 Gs is greater than the predetermined turn rate threshold, as shown in position 2, the controller 110 provides a third drive signal to the left motor 106b to cause the left drive wheel 104b at the third speed, less than the first speed. The controller 110 also provides a fourth drive signal to the right motor 106a to cause the right drive wheel 104a at the fourth speed, less than the second speed. Arrows 826 and 828 illustrate the speed and direction of the right and left drive wheels 104a-104b at position 2.

At step 808 (illustrated in FIG. 8A), the controller 110 determines whether a commanded turn rate is greater than a commanded turn rate threshold. The commanded turn rate may be representative of a throttle input provided by a user to command the vehicle 100 to turn at a certain turn rate. If the controller 110 determines that the commanded turn rate is greater than a commanded turn rate threshold, the controller 110 proceeds to step 810. If the controller 110 determines that the commanded turn rate is less than a commanded turn rate threshold, the controller 110 proceeds to step 812.

At step 810, the controller 110 continues to cause the first and second motors to operate in major turn mode by providing a fifth drive signal to the first motor, the fifth drive signal configured to cause the first motor to drive the first drive wheel in a forward direction at a fifth speed that is greater than the first speed. The controller 110 may provide a sixth drive signal to the second motor, the sixth drive signal configured to cause the second motor to drive the second drive wheel in a reverse direction at a sixth speed that is greater than the second speed. FIG. 8C illustrates functionality for selectively increasing wheel speeds based on commanded turn rate. In FIG. 8C, at position 1, the vehicle 100 is operating in major turn mode. Arrows 830 and 832 illustrate the speed and direction of the right and left drive wheels 104a-104b at position 1. At position 1, the controller 110 determines that the vehicle 100 has a measured turn rate of 1.0 Gs that is less than a measured turn rate threshold of 1.5 Gs, as indicated by turn rate representation 851. In response to a determination that the measured turn rate is less than a measured turn rate threshold, the controller 110 then determines that its commanded turn rate of 2.0 Gs is greater than a commanded turn rate threshold (1.5 Gs), as indicated by turn rate representation 852. In response to a determination that the commanded turn rate of 2.0 Gs is greater than the turn rate threshold, as shown in position 2, the controller 110 provides a third drive signal to the left motor 106b to cause the left drive wheel 104b at the fifth speed, greater than the first speed. The controller 110 also provides a sixth drive signal to the right motor 106a to cause the right drive wheel 104a at the sixth speed, greater than the second speed. Arrows 834 and 836 illustrate the speed and direction of the right and left drive wheels 104a-104b at position 2.

At step 812, if the controller 110 determines that the commanded turn rate is less than a commanded turn rate threshold, the controller 110 continues to cause the right motor 106a and left motor 106b to operate in major turn mode at maintained wheel speeds.

In some embodiments, by adjusting the wheel speed based on measured turn rate, the vehicle 100 can provide better performance and control in different environments. For example, if the vehicle 100 is traveling through tall grass, thereby decreasing the speed of the vehicle 100, or traveling over a slippery surface, thereby increasing the speed of the vehicle 100, the controller 110 can increase or decrease the wheel speeds accordingly to compensate for the driving surface and drive the vehicle 100 at a speed that is acceptable to a user.

Exiting Major Turn Mode

Unless mitigated, exiting major turn mode can present poses challenges to some users of the vehicle 100. For example, due to positioning of the directional control wheels while in major turn mode, as described herein, it may be difficult for the user to exert enough force on the tiller to rotate the directional control wheels 103a-103b from a major turn position to a standard driving position. Also, if the controller 110 causes the right and left drive wheels 104a-104b to rotate in a forward direction too quickly after detecting a quick change in steering position, the vehicle 100 may understeer or plow in the direction of the major turn. To avoid these problem, the controller 110 is configured to cause the first and second motor 106a-106b to drive the first and second drive wheels 104a-104b at certain speeds in certain directions at certain times based on the steering position of the steering input 102 to allow the vehicle 100 to safely exit a major turn while being more responsive to the user's control inputs of the vehicle 100.

Figure 9A:
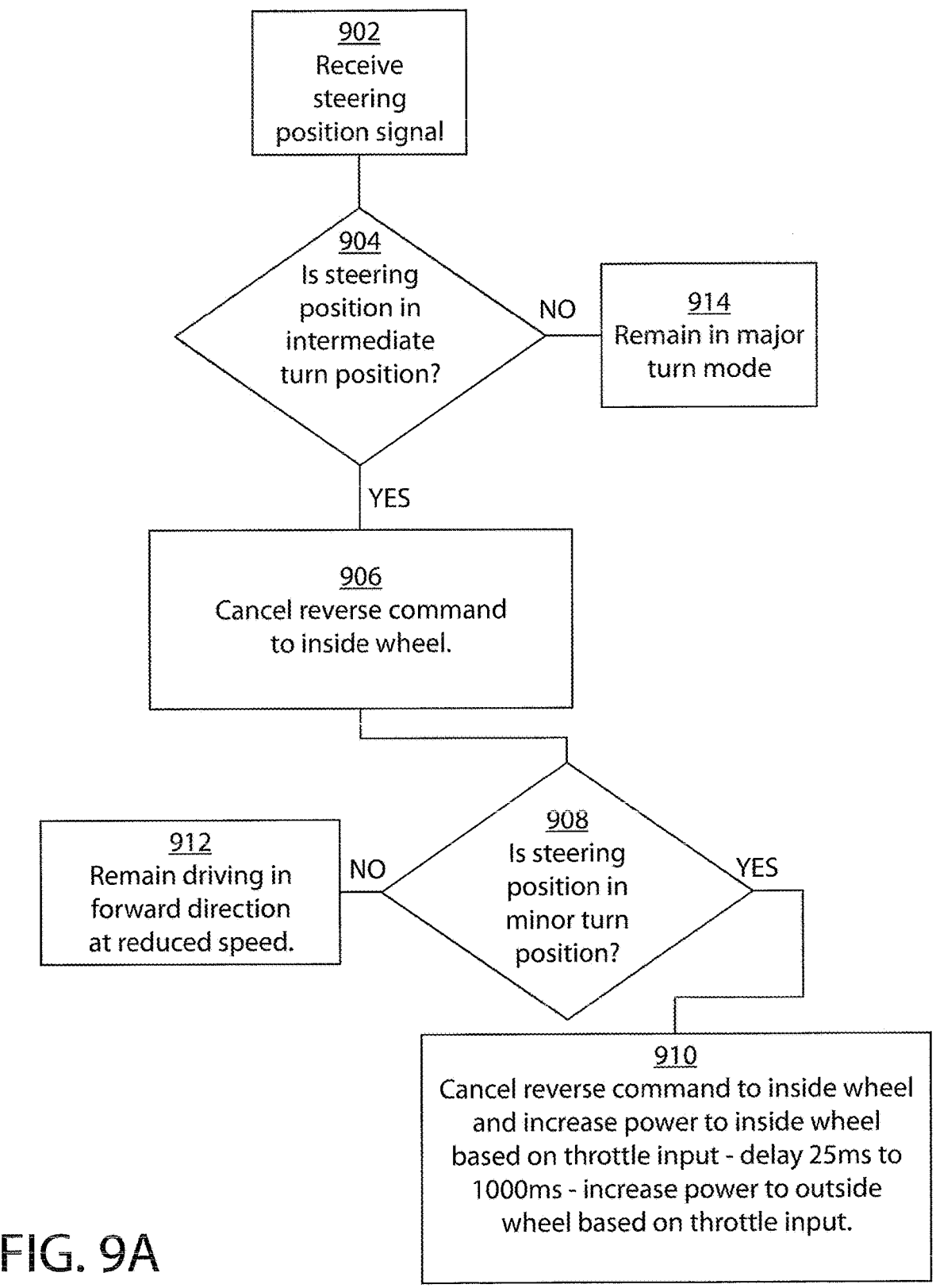
FIG. 9A is a flow chart illustrating functionality for determining whether a vehicle meets major turn exiting criteria, according to some embodiments of the invention including, for example, one or more of the embodiments reflected in the foregoing figures.
Figure 9B:
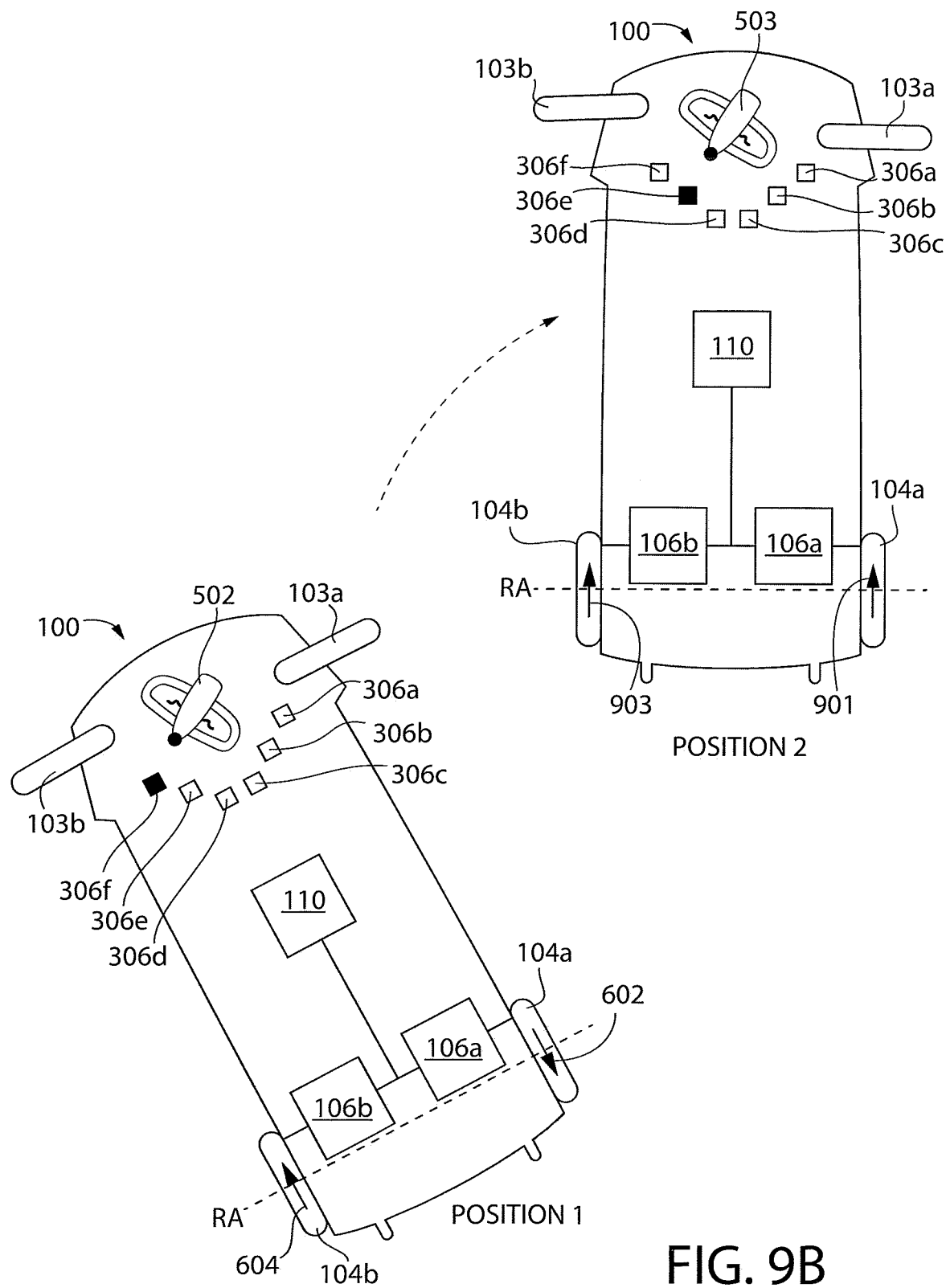
FIGS. 9B-9C are schematic representations of a vehicle illustrating exemplary major turn exiting functionality of FIG. 9A, according to some embodiments of the invention including, for example, one or more of the embodiments reflected in the foregoing figures.
Figure 9C:
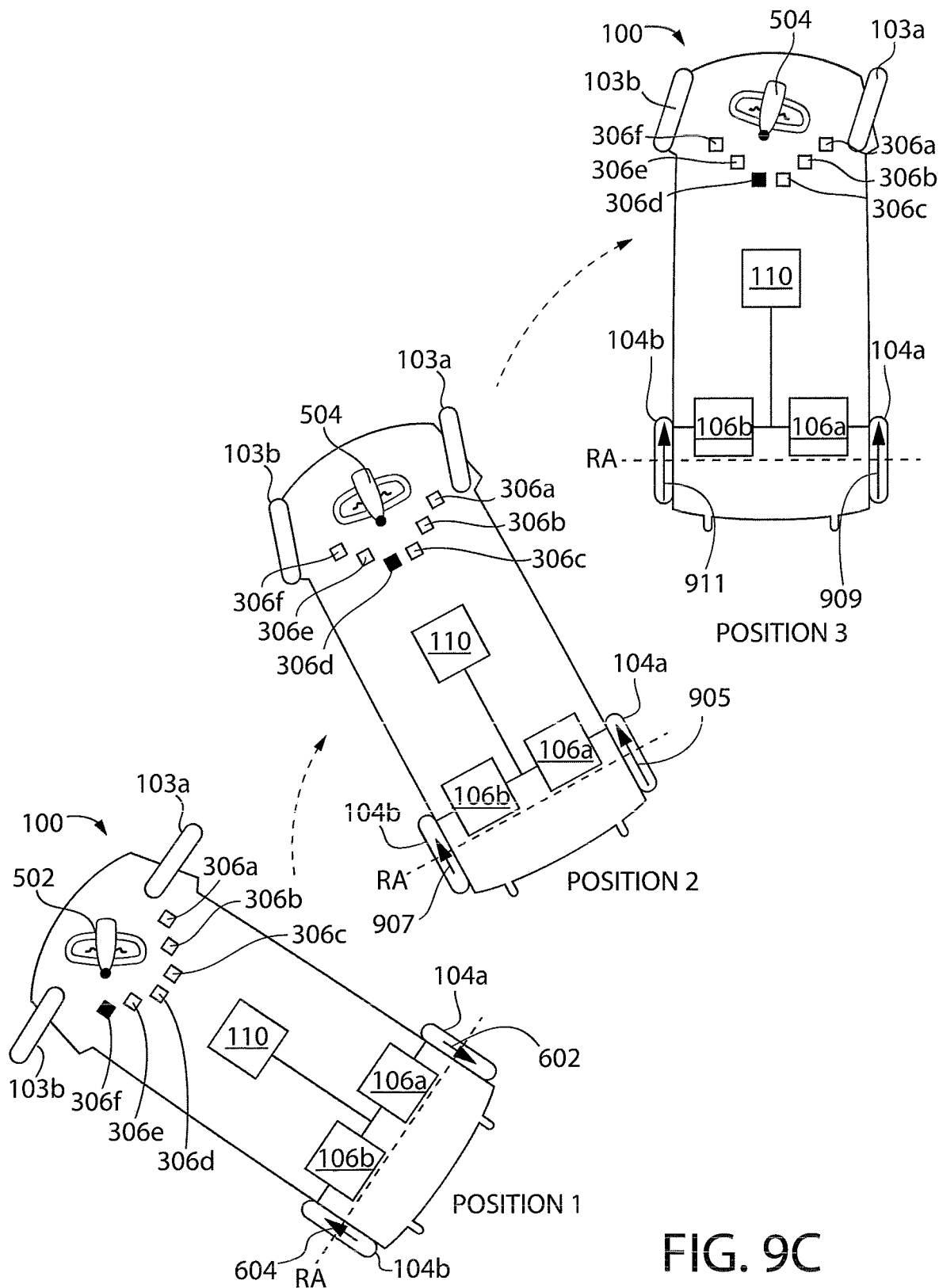

FIG. 9A is a flow chart illustrating functionality for determining whether a vehicle 100 meets major turn exiting criteria, according to some embodiments of the invention. FIGS. 9B-9C are schematic representations of vehicle 100 illustrating exemplary major turn exiting functionality of FIG. 9A, according to some embodiments of the invention.

In FIG. 9A, at step 902, while operating the vehicle 100 in major turn mode, the controller 110 receives a steering indicator (e.g., steering position signal) from a steering position sensor.

At step 904, the controller 110 determines whether the steering position of the steering input 102 is in an intermediate turn position. If the controller 110 determines that the steering position of the steering input 102 is in an intermediate turn position, the controller 110 proceeds to step 906. If the controller 110 determines that the steering position of the steering input 102 remains in a major turn position, the controller 110 proceeds to step 914.

At step 906, the controller 110 provide a seventh drive signal to the second motor, the seventh drive signal configured to cause the second motor to drive the second drive wheel in the forward direction. In some embodiments, the seventh drive signal is configured to cause the second motor to rotate the second drive wheel in the forward direction at a speed that is less than a commanded speed indicated by the throttle 108. For example, in FIG. 9B, the controller 110 determines that the steering input 102 transitioned from a major turn position, as shown in position 1, to an intermediate turn position, as shown in position 2. In response to a determination that the steering input 102 has transitioned from a major turn position to an intermediate turn position, the controller 110 causes the right motor 106a to drive the right drive wheel 104a in a forward direction at a reduced speed less than a commanded speed indicated by the throttle 108. Arrows 901 and 903 illustrate the speed and direction of the right and left drive wheels 104a-104b.

At step 908, the controller 110 determines whether the steering position of the steering input 102 is in a minor turn position. If the controller 110 determines that the steering position of the steering input 102 is in a minor turn position, the controller 110 proceeds to step 910. If the controller 110 determines that the steering position of the steering input 102 remains in an intermediate turn position, the controller 110 proceeds to step 912.

At step 910, the controller 110 provides an eighth drive signal to the second motor, the eighth drive signal configured to cause the second motor to rotate the second drive wheel in the forward direction at a commanded speed indicated by the user speed input device and continue providing the first drive signal to the first motor during a first time period. After the first time period, the controller 110 provide a ninth motor drive signal to the first motor, the ninth motor drive signal configured to cause the first motor to rotate the first drive wheel in the forward direction at a commanded speed indicated by the throttle 108. For example, in FIG. 9C, the controller 110 determines the steering input 102 transitioning from a major turn position, as shown in position 1, to a minor turn position, as shown in position 2. In response to a determination that the steering input 102 has transitioned from a major turn position to a minor turn position, the controller 110 causes the right motor 106a to drive the right drive wheel 104a in a forward direction at a commanded speed indicated by the throttle 108 (shown as a full throttle) for, for example, 500 ms, as shown at position 2. Arrows 905 and 907 illustrate the speed and direction of the right and left drive wheels 104a-104b. After the time expires, the controller 110 causes the left motor 106b to drive the left drive wheel 104b in a forward direction at a commanded speed indicated by the throttle 108 (shown as a full throttle), as shown in position 3. Arrows 909 and 911 illustrate the speed and direction of the right and left drive wheels 104a-104b.

In some embodiments, the first time period is from 20 to 1000 ms; from 50 to 900 ms; from 150 to 800 ms; from 300 to 700 ms; from 500 to 600 ms; or approximately 550 ms. In some embodiments; the first time period is less than 1000 ms; less than 900 ms; less than 800 ms; less than 700 ms; less than 600 ms; less than 500 ms; less than 400 ms; less than 300 ms; less than 200 ms; or less than 100 ms.

At step 912, the controller 110 continues to provide the seventh drive signal to the second motor 106b, the seventh drive signal configured to cause the second motor to rotate the second drive wheel in the forward direction.

At step 914, the controller 110 continues to operate the right motor 106a and left motor 106b in major turn mode.

Exiting Major Turn Mode—Transition Time and Throttle Input Embodiments

In some embodiments, if unabated, exiting major turn mode can present some challenges for a user of the vehicle 100. For example, if the controller 110 causes the right and left drive wheels 104a-104b to rotate in a forward direction at a fast speed after detecting a quick change in steering position, the vehicle 100 may understeer or plow in the direction of the major turn. However, merely having the controller 110 cause the right and left drive wheels 104a-104b to operate at slow speeds for some predetermined time period after detecting a quick change in steering position despite a high throttle input, the vehicle 100 will not be properly responsive to a user's control. To avoid these problems, in one embodiment, the controller 110 is configured to cause the right and left drive wheels 104a-104b at certain speeds in certain directions based on the steering position of the steering input 102, the steering rotation speed of the steering input 102 and the throttle input of the throttle 108 that allow the vehicle 100 to safely exit a major turn while being more responsive to the user's control inputs of the vehicle 100.

Figure 9D:
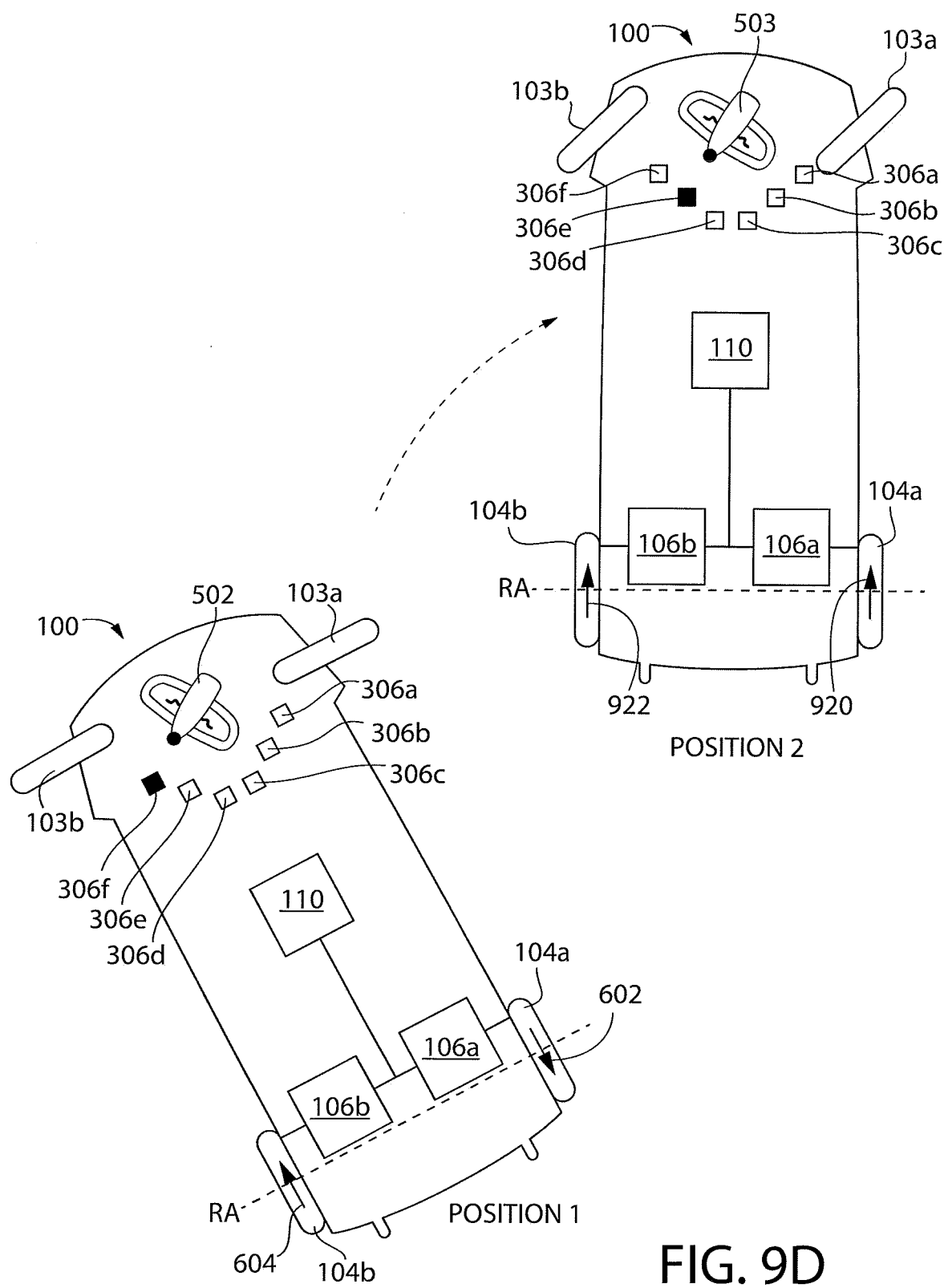
FIG. 9D is a schematic representation of a vehicle illustrating exemplary major turn exiting functionality where the steering input slowly transitions to an intermediate turn position to exit into the major turn mode of FIG. 6, according to some embodiments of the invention including, for example, one or more of the embodiments reflected in the foregoing figures.

FIG. 9D is a schematic representation of vehicle 100 illustrating exemplary major turn exiting functionality where the steering input 102 slowly transitions to an intermediate turn position to exit into the major turn mode of FIG. 6, according to some embodiments of the invention. In these embodiments, the vehicle 100 may exit a major turn mode when the controller 110 determines that certain major turn mode exiting criteria, and specifically, slow transition intermediate turn criterion is met. In some embodiments, slow transition intermediate turn criterion is met when the steering position of the steering input 102 has transitioned from a major turn position to an intermediate turn position in an amount of time that is greater than a steering rotation timing threshold (e.g., 250 ms) or, in some embodiments, a steering rotation speeds that is less than a steering rotation speed threshold) and the throttle input exceeds a throttle input threshold.

In FIG. 9D, the vehicle 100 is shown in two positions, with position 2 occurring after position 1. In position 1, the controller 110 determines that the steering input 102 is in a right major-turn position, as illustrated by schematic representation 502. In response to a determination that the steering input 102 is in a right major-turn position, the controller 110 has caused the vehicle 100 to operate in a major turn mode, where, in some embodiments, the vehicle 100 rotates about a vertical axis B. In position 2, the steering input 102 has transitioned to a right intermediate-turn position, as illustrated by schematic representation 503 (and as explained in detail in FIG. 5B), after 300 ms. In some embodiments, the controller 110 determines that slow transition intermediate turn criterion is met because the steering position of the steering input 102 has transitioned from a major turn position 502 to an intermediate turn position 503 in an amount of time (i.e., 300 ms) that exceeds a steering rotation timing threshold (e.g., 250 ms) and the throttle input exceeds a throttle input threshold. In response to a determination that slow transition intermediate turn criterion is met, the controller 110 causes a first motor (i.e., right motor 106a) to drive a first wheel (i.e., first drive wheel 104a) in a forward direction at a speed that is less than a predetermined speed value (e.g., 50% of full speed) and causes a second motor (i.e., left motor 106b) to drive a second wheel (i.e., the left drive wheel 104b) in a forward direction at a speed that is less that the predetermined speed value. In some embodiments, the speed of the first drive wheel 104a and the second drive wheel 104b are the same. In some embodiments, the speed of the first drive wheel 104a and the second drive wheel 104b are different. In some embodiments, controller 110 causes the right drive wheel 104a and the left drive wheel 104b to rotate at slow speeds (e.g., a speed that are less than the predetermined speed value), despite the throttle input that exceeds the throttle input threshold. Arrows 920 and 922 illustrate the speed and direction of the right and left drive wheels 104a-104b. By incorporating the above major turn exiting functionality, the vehicle 100 can safely exit a major turn without understeering or plowing despite a throttle input from a user that represents a user's intent to quickly accelerate the vehicle 100.

Figure 9E:
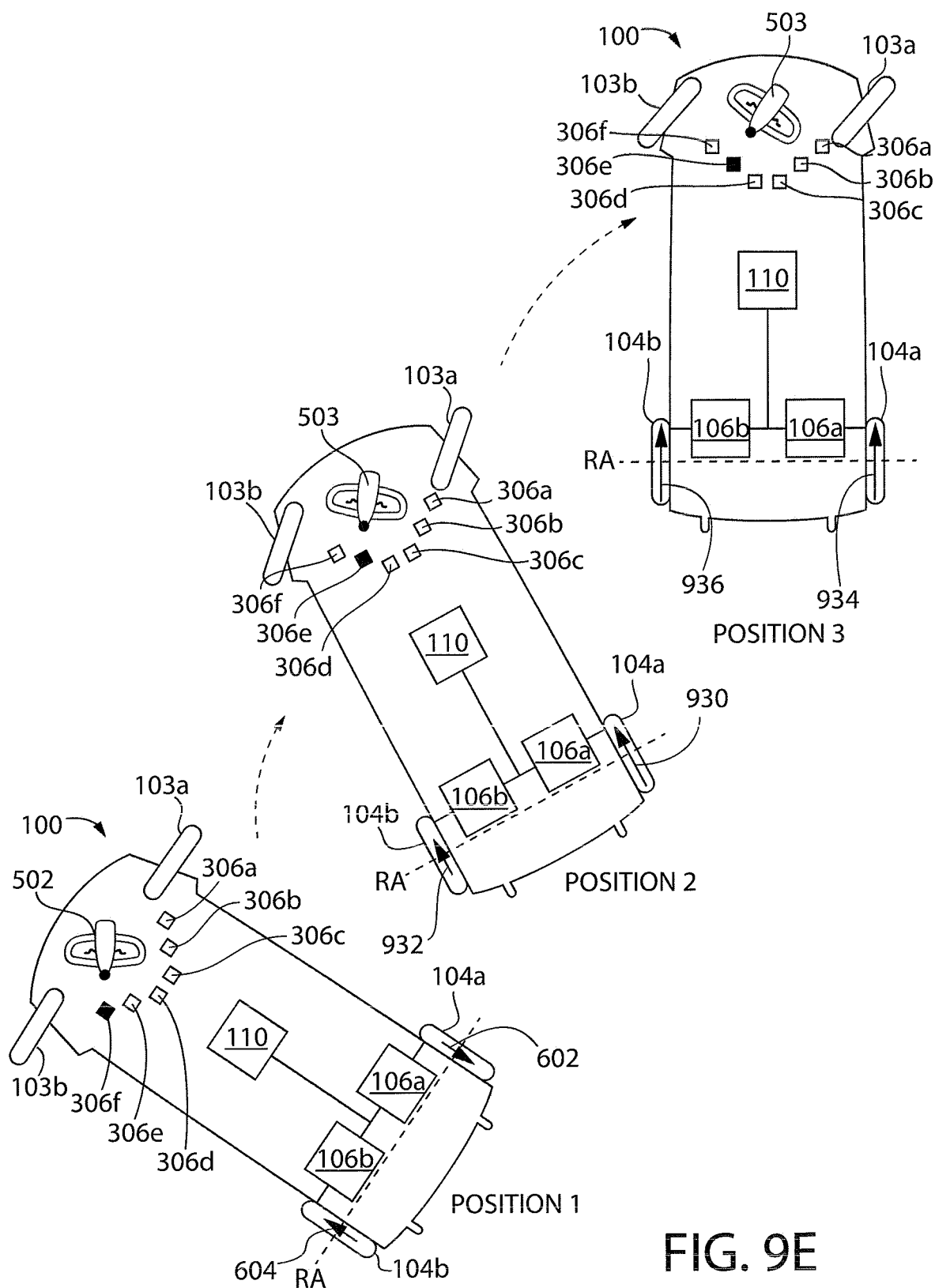
FIG. 9E is a schematic representation of a vehicle illustrating exemplary major turn exiting functionality where the steering input has a fast transition to an intermediate turn position to exit into the major turn mode of FIG. 6, according to some embodiments of the invention including, for example, one or more of the embodiments reflected in the foregoing figures.

FIG. 9E is a schematic representation of vehicle 100 illustrating exemplary major turn exiting functionality where the steering input 102 has a fast transition to an intermediate turn position to exit into the major turn mode of FIG. 6, according to some embodiments of the invention. In these embodiments, the vehicle 100 may exit a major turn mode when the controller 110 determines that certain major turn mode exiting criteria, and specifically, fast transition intermediate turn criterion is met. In some embodiments, fast transition intermediate turn criterion is met when the steering position of the steering input 102 has transitioned from a major turn position to an intermediate turn position in an amount of time that is less than a steering rotation timing threshold (e.g., 250 ms) (or, in some embodiments, a steering rotation speeds that exceeds a steering rotation speed threshold) and the throttle input exceeds a throttle input threshold.

In FIG. 9E, the vehicle 100 is shown in three positions: position 1, position 2, and position 3, with position 2 occurring after position 1 and position 3 occurring after position 2. In position 1, the vehicle 100 is operating in a major turn mode, as shown in FIG. 6. In position 2, the steering input 102 has transitioned to a right intermediate-turn position, as illustrated by schematic representation 503, after, for example, 200 ms. In some embodiments, the controller 110 determines that fast transition intermediate turn criterion is met because the steering position of the steering input 102 has transitioned from a major turn position 502 to an intermediate turn position 503 in an amount of time (i.e., 200 ms) that is less than a steering rotation timing threshold (e.g., 250 ms) and the throttle input exceeds a throttle input threshold. In response to a determination that the fast transition intermediate turn criterion is met, the controller 110 causes a first motor (i.e., right motor 106a) to drive a first wheel (i.e., right drive wheel 104a) in a forward direction at a speed that exceeds a predetermined speed value (e.g., 50% of full speed) and causes a second motor (i.e., left motor 106b) to drive a second wheel (i.e., the left drive wheel 104b) in a forward direction at a speed that is less than the speed value during a first time period (e.g., from 100 to 1000 ms), despite the throttle input exceeding the throttle input threshold. Arrows 930 and 932 illustrate the speed and direction of the right and left drive wheels 104a-104b at position 2. After the first time period occurs, in position 3, the controller 110 causes the first motor (i.e., right motor 106a) to drive the first wheel (i.e., first drive wheel 104a) in the forward direction at a speed that exceeds the predetermined speed value and cause the second motor (i.e., left motor 106b) to drive the second wheel (i.e., the left drive wheel 104b) in the forward direction at a speed that exceeds the predetermined speed value during a second time period, in response to the throttle input that exceeds the throttle input threshold. In some embodiments, the speeds of the first wheel and the second wheel are the same. In some embodiments, the speeds of the first wheel and the second wheel are different. Arrows 934 and 936 illustrate the speed and direction of the right and left drive wheels 104a-104b at position 3. By incorporating the above major turn exiting functionality, the vehicle 100 can safely exit a major turn without understeering or plowing despite a throttle input from a user that represents a user's intent to quickly accelerate the vehicle 100.

In some embodiments, the first time period is from 100 to 1000 ms; from 200 to 900 ms; from 300 to 800 ms; from 400 to 700 ms; from 500 to 600 ms; or approximately 550 ms. In some embodiments; the first time period is less than 1000 ms; less than 900 ms; less than 800 ms; less than 700 ms; less than 600 ms; less than 500 ms; less than 400 ms; less than 300 ms; less than 200 ms; or less than 100 ms.

Figure 9F:
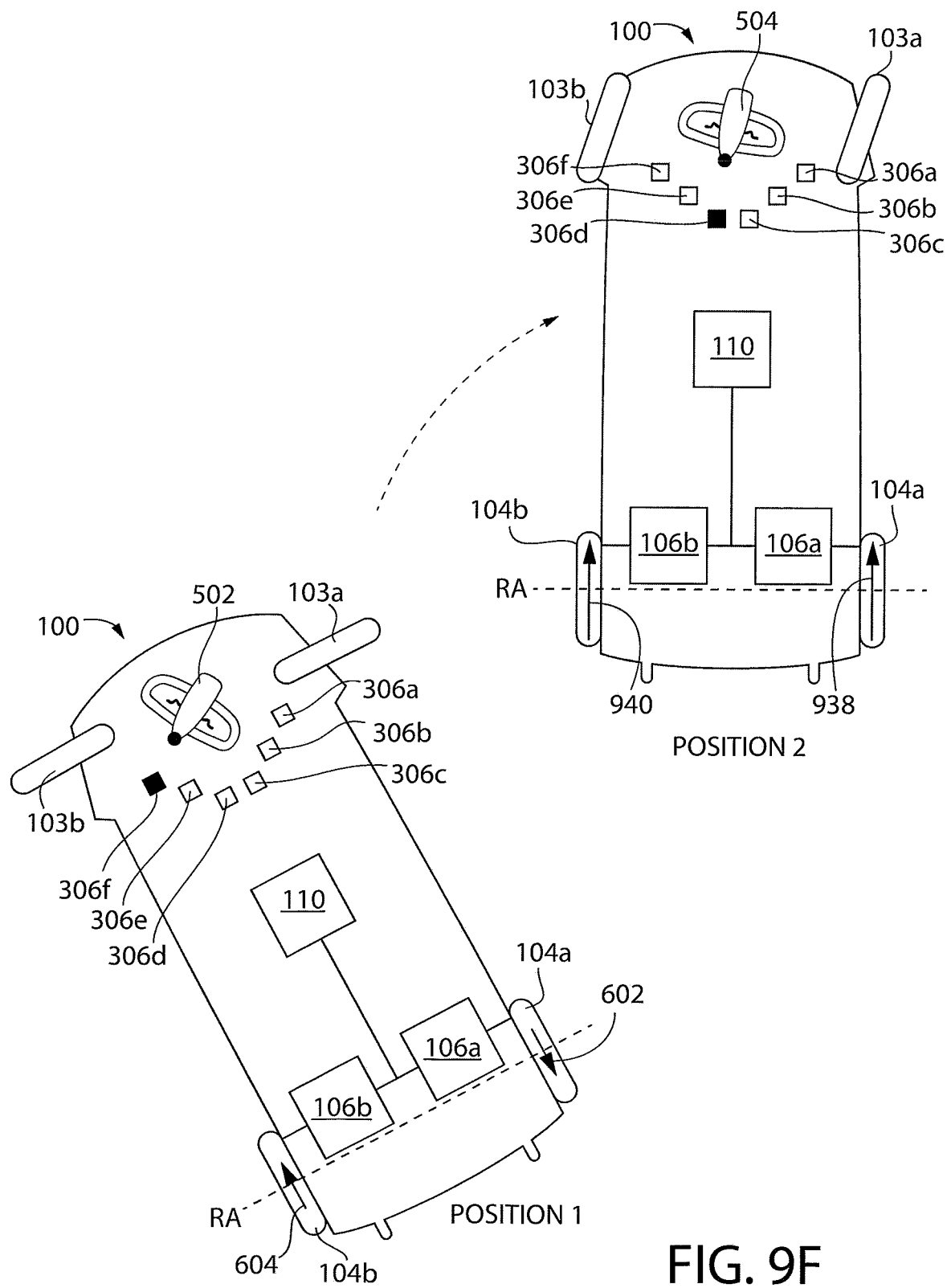
FIG. 9F is a schematic representation of vehicle illustrating exemplary major turn exiting functionality where the steering input quickly transitions to a minor turn position to exit into the major turn mode of FIG. 6, according to some embodiments of the invention including, for example, one or more of the embodiments reflected in the foregoing figures.

FIG. 9F is a schematic representation of vehicle 100 illustrating exemplary major turn exiting functionality where the steering input 102 quickly transitions to a minor turn position to exit into the major turn mode of FIG. 6, according to some embodiments of the invention. In these embodiments, the vehicle 100 may exit a major turn mode when the controller 110 determines that certain major turn mode exiting criteria, and specifically, fast transition minor turn criterion is met. In some embodiments, fast transition minor turn criterion is met when the steering position of the steering input 102 has transitioned from a major turn position, through an intermediate turn position, to a minor turn position in an amount of time (e.g., 200 ms) that falls below a steering rotation timing threshold (e.g., 250 ms) (or, in some embodiments, a steering rotation speeds that falls below a steering rotation speed threshold) and the throttle input exceeds a throttle input threshold.

In FIG. 9F, the vehicle 100 is shown in two positions, position 1 and position 2, with position 2 occurring after position 1. In position 1, the controller 110 determines that steering input 102 is in a right major-turn position, as illustrated by schematic representation 502 (and as explained in detail in FIG. 6). In response to a determination that the steering input 102 is in a right major-turn position, the controller 110 causes the vehicle 100 to operate in a major turn mode. In position 2, the steering input 102 has been transitioned to a right minor-turn position, as illustrated by schematic representation 504 (and as explained in detail in FIG. 5C), after, for example, 200 ms. In some embodiments, the controller 110 determines that fast transition minor turn criterion is met because the steering position of the steering input 102 has transitioned from a major turn position 502 through an intermediate turn position to a minor turn position 504 in an amount of time (i.e., 200 ms) that is less than a steering rotation timing threshold (e.g., 250 ms) while the throttle input exceeds a throttle input threshold. In response to a determination that the fast transition major turn criterion is met, the controller 110 causes a first motor (i.e., right motor 106a) to drive a first wheel (i.e., right drive wheel 104a) in a forward direction at a speed that exceeds a predetermined speed value (e.g., 50% of full speed) and causes a second motor (i.e., left motor 106b) to drive a second wheel (i.e., the left drive wheel 104b) in a forward direction at a speed that exceeds the predetermined speed value, in response to the throttle input that exceeds the throttle input threshold. In some embodiments, the fourth speed is the same as the third speed. In some embodiments, the fourth speed is different than the third speed. Arrows 938 and 940 illustrate the speed and direction of the right and left drive wheels 104a-104b. By incorporating the above major turn exiting functionality, the vehicle 100 can exit a major turn in a manner that is more responsive to a throttle input from a user.

Entering/Exiting Major Turn Mode Based on Steering Position

In some embodiments, the controller 110 determines whether to operate the vehicle 100 in major turn mode if the steering input 102 is in a major turn position and operate the vehicle 100 in standard drive mode if the steering input 102 is in an intermediate turn position. For example, If the controller 110 receives a sensor position signal indicating that the steering input 102 is in a full left turn position or full right turn position (e.g., major turn position), then the controller 110 causes the right motor 106a and the left motor 106b to operate in major turn mode. If the controller 110 receives a sensor position signal indicating that the steering input 102 is in an intermediate left turn position or intermediate right turn position (e.g., intermediate turn position), then the controller 110 causes the right motor 106a and the left motor 106b to operate in standard drive mode. In some embodiments, a first set of one or more sensors (e.g., 306a, 306f of FIG. 5C) may be configured to detect when the steering input 102 is in a major turn position and a second set of one or more sensors may be configured to detect when the steering input 102 is in an intermediate turn position (e.g., 306b, 306e of FIG. 5C).

Disabling Major Turn Mode—Excessive Angular Vehicle Tilt

In some embodiments, major turn mode functionality may be disabled despite the steering indicators indicating that the vehicle 100 should operate in a major turn mode (e.g., as shown in FIG. 6). For example, if the vehicle 100 is subject to an excessive angular tilt (e.g., greater than 10° from horizontal), such as while traveling up or down steep includes or declines, operating in major turn mode may make the vehicle 100 less stable or reduce the available drive power to the wheels for climbing. In these scenarios, the vehicle 100 is operated in a standard drive mode for safety.

Figure 10A:
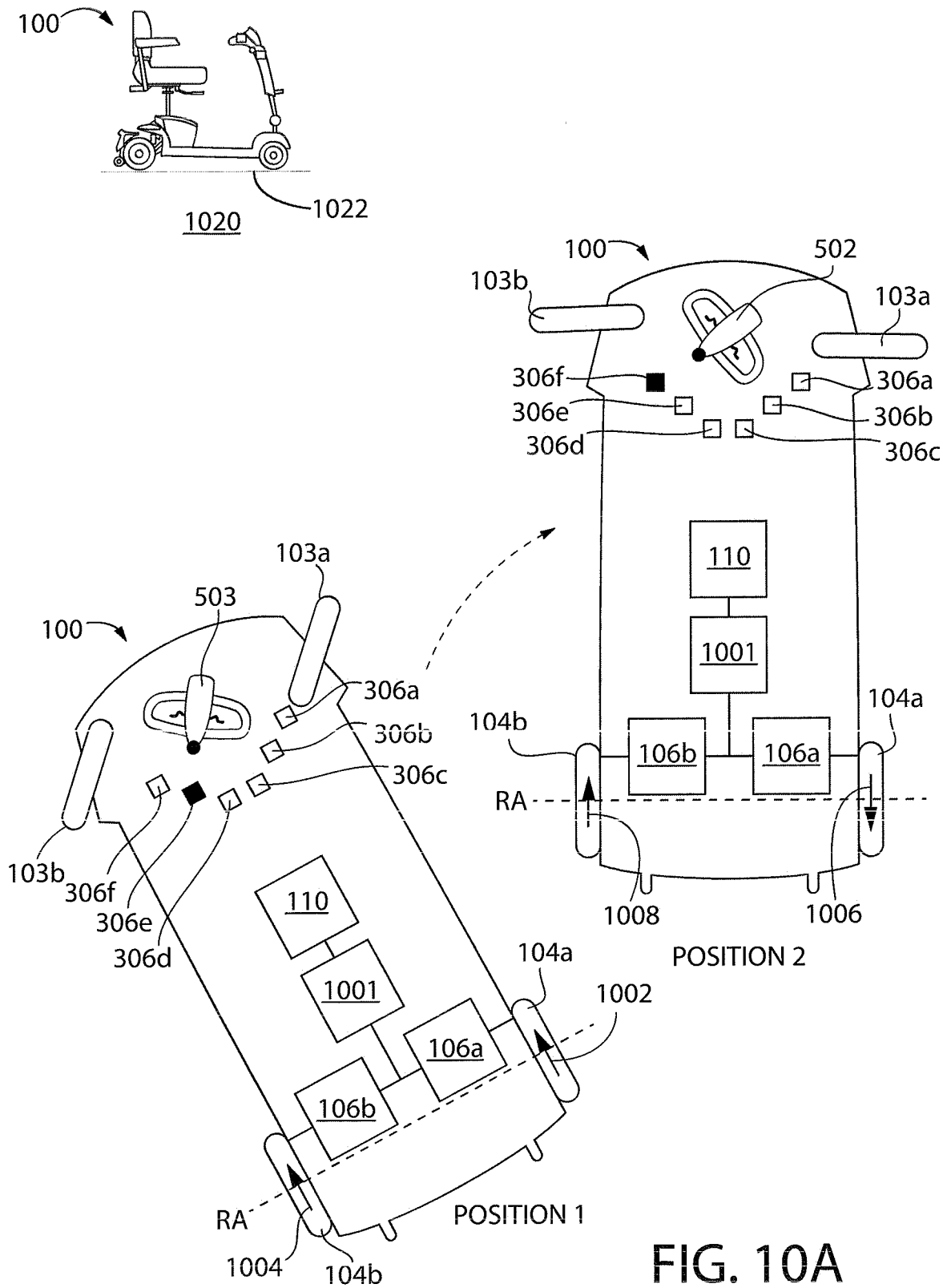
FIGS. 10A-10B are schematic representations of a vehicle illustrating exemplary major turn entering functionality based on tilt angle, according to some embodiments of the invention including, for example, one or more of the embodiments reflected in the foregoing figures.
Figure 10B:
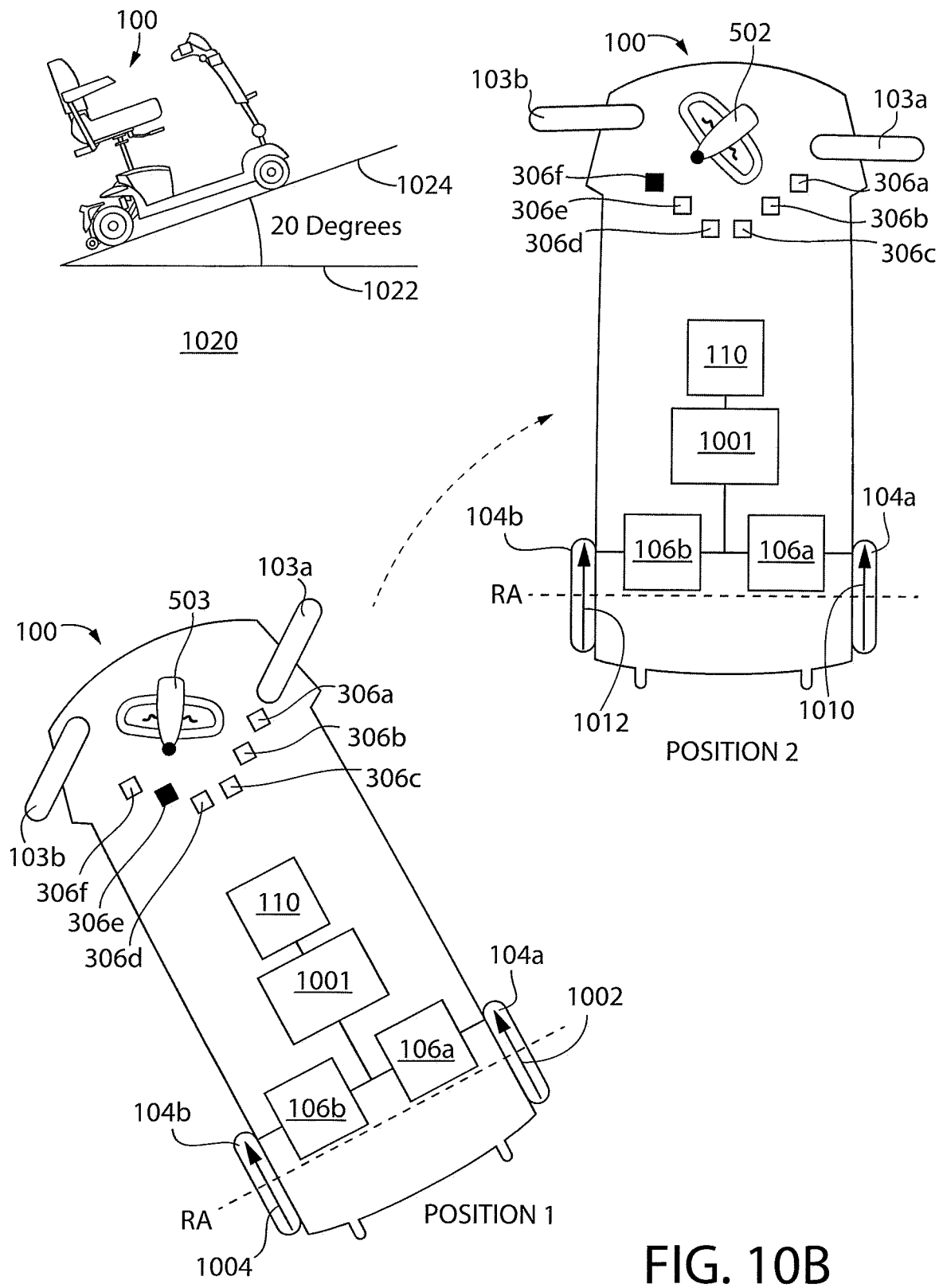

FIGS. 10A-10B are schematic representations of vehicle 100 illustrating exemplary major turn entering functionality based on tilt angle, according to some embodiments of the invention. In some embodiments, vehicle 100 may include a tilt sensor 1001 configured to detect tilt angle (e.g., pitch or roll) of the vehicle 100. In some embodiments, acceleration or deceleration of the vehicle 100 on a flat surface does not affect measurements made by the tilt sensor 1001. Examples of tilt sensors 1001 include accelerometers, gyroscopes, or inclinometers, or MEMS orientation sensors to measure orientation of the vehicle 100.

In FIG. 10A, at position 1, the vehicle 100 is operating in standard drive mode, where the controller 110 causes the first and second drive motors 106*a*-106*b* to drive the right and left drive wheels 104*a*-104*b* at a speed based on a throttle input of the throttle 108. Arrows 1002 and 1004 illustrate the speed and direction of the right and left drive wheels 104*a*-104*b*. The controller 110 may be configured to determine whether the steering indicator meets major turn criteria by also determining whether the tilt angle of the vehicle as detected by the tilt sensor, along the lateral or longitudinal axis, is less than a predetermined tilt angle threshold (e.g., approximately 10° for pitch and approximately 6° for roll). If the controller 110 determines that the tilt angle of the vehicle 100 is less than a predetermined tilt angle threshold (e.g., as shown in FIG. 10A where tilt graphic 1020 illustrates that the vehicle 100 traveling on a flat surface 1022 at an angle of 0°)), the controller 110 determines that the steering indicator meets major turn criteria, and thereby causes the right motor 106*a* and the left motor 106*b* to operate in a major turn mode, as shown in position 2 of FIG. 10A. Arrows 1006 and 1008 illustrate the speed and direction of the right and left drive wheels 104*a*-104*b* at position 2. If the controller 110 determines that the tilt angle of the vehicle 100 is greater than a predetermined tilt angle threshold (e.g., as shown in FIG. 10B where tilt graphic 1020 illustrates that the vehicle 100 traveling up a steep incline 1024 at an angle of 20° relative to flat surface 1022)), the controller 110 determines that the steering indicator does not meet major turn criteria, and thereby causes the right motor 106*a* and the left motor 106*b* to operate in a standard driving mode, as shown in position 2 of FIG. 10B. Arrows 1010 and 1012 illustrate the speed and direction of the right and left drive wheels 104*a*-104*b* at position 2.

By utilizing the above major turn disabling functionality, the vehicle 100 can safely refrain from entering a major turn when the vehicle 100 is excessively tilted.

In some embodiments, the rotational tilt angle threshold is from 1° to 30°; from 5° to 20°; from 10° to 15°; or approximately 10°. In some embodiments, the rotational tilt angle threshold is less than 30°; less than 20°; less than 15°; less than 10°; or less than 5°.

Disabled Major Turn Mode or Reduced Speed in Major Turn Mode—Reverse Driving

In some embodiments, major turn mode functionality may be disabled or modified while the vehicle 100 is traveling in reverse, despite the steering indicators indicating that the vehicle 100 should operate in a major turn mode (e.g., as shown in FIG. 6). For example, if the vehicle 100 is traveling in reverse, operating in major turn mode may make the vehicle 100 difficult to navigate because the user must be looking backwards to see where the vehicle 100 is traveling. In these embodiments, the vehicle 100 can be operated in a standard drive mode, or a reduced speed mode, for safety.

Figure 11A:
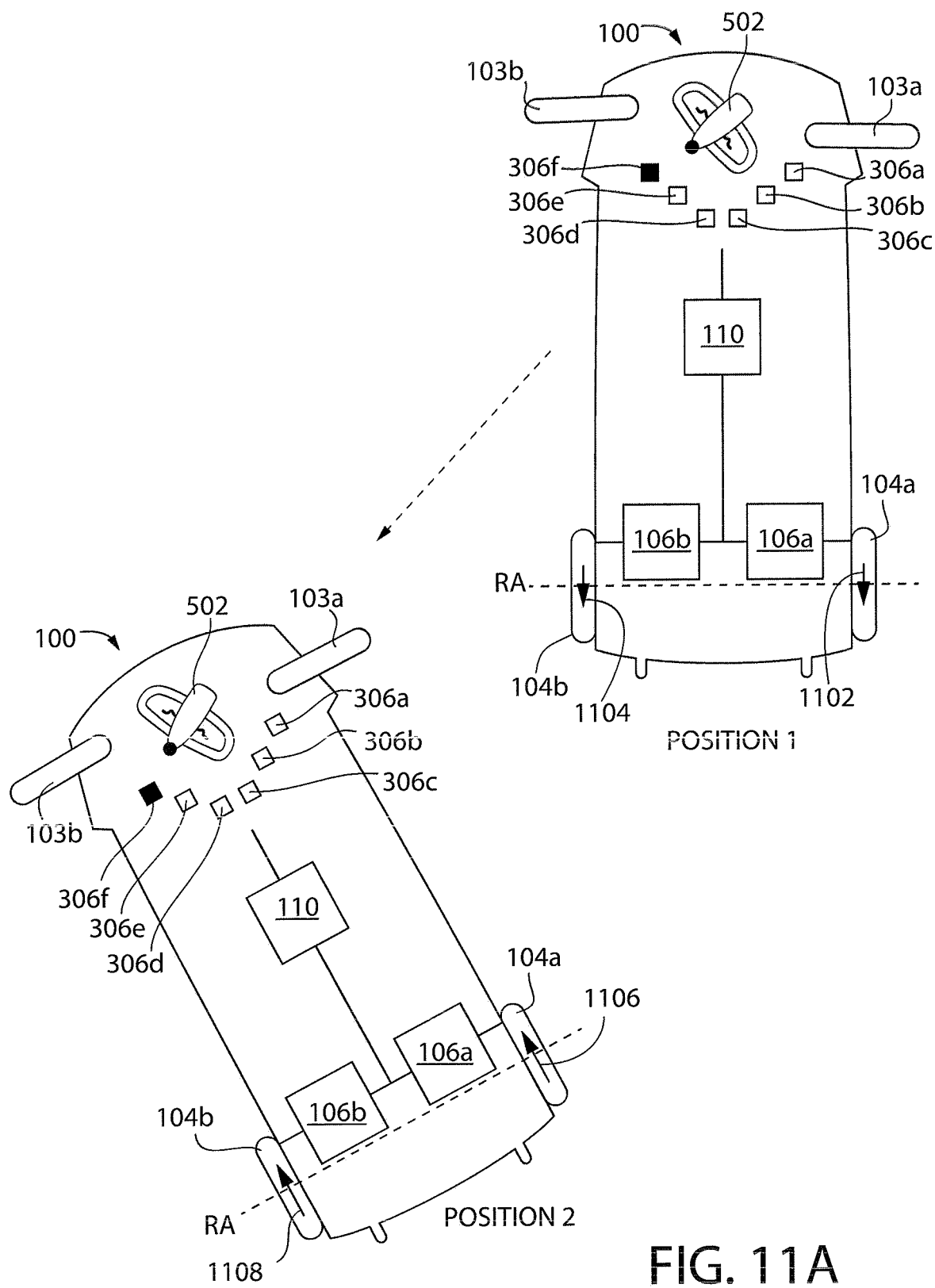
FIG. 11A is a schematic representation of a vehicle illustrating exemplary major turn entering functionality and operating the vehicle at a reduced speed while the vehicle is traveling in reverse, according to some embodiments of the invention including, for example, one or more of the embodiments reflected in the foregoing figures.

FIG. 11A is schematic representations of vehicle 100 illustrating exemplary major turn entering functionality and operating the vehicle 100 at a reduced speed while the vehicle is traveling in reverse, according to some embodiments of the invention.

In FIG. 11A, as shown in position 1, the vehicle 100 is operating in standard drive mode, where the controller 110 causes the right and left drive motors 106*a*-106*b* to drive the right and left drive wheels 104*a*-104*b* at a speed based on a throttle input of the throttle 108. In this example, the controller 110 causes the right and left drive motors 106*a*-106*b* to drive the right and left drive wheels 104*a*-104*b* in a reverse direction. Arrows 1102 and 1104 illustrate the speed and direction of the right and left drive wheels 104*a*-104*b*. The controller 110 may be configured to determine that the steering indicator meets major turn criteria by also determining whether the user speed input device receives a reverse speed input. If the controller 110 determines that the user speed input device receives a reverse speed input, the controller 110 determines that the steering indicator meets major turn criteria, and thereby causes the right motor 106*a* and the left motor 106*b* to operate in a major turn mode, as shown in position 2 of FIG. 11A. In some embodiments, the controller 110 is configured to provide a twelfth drive signal to the left motor 106*b*. The twelfth drive signal may be configured to cause the first motor (e.g., left motor 106*b*) to drive the first drive wheel (e.g., left drive wheel 104*b*) in a direction opposite a direction indicated by the first drive signal, at a twelfth speed that is less than the first speed while the vehicle is operating in major turn mode shown in FIG. 6. In some embodiments, the controller 110 is configured to provide a thirteenth drive signal to the second motor (e.g., right motor 106*a*), the thirteenth drive signal configured to cause the second motor to drive the second drive wheel (e.g., right drive wheel 104*a*) in a direction opposite a direction indicated by the second drive signal, at a thirteenth speed that is less than the second speed while the vehicle is operating in major turn mode shown in FIG. 6. Arrows 1106 and 1108 illustrate the speed and direction of the right and left drive wheels 104*a*-104*b* at position 2.

Figure 11B:
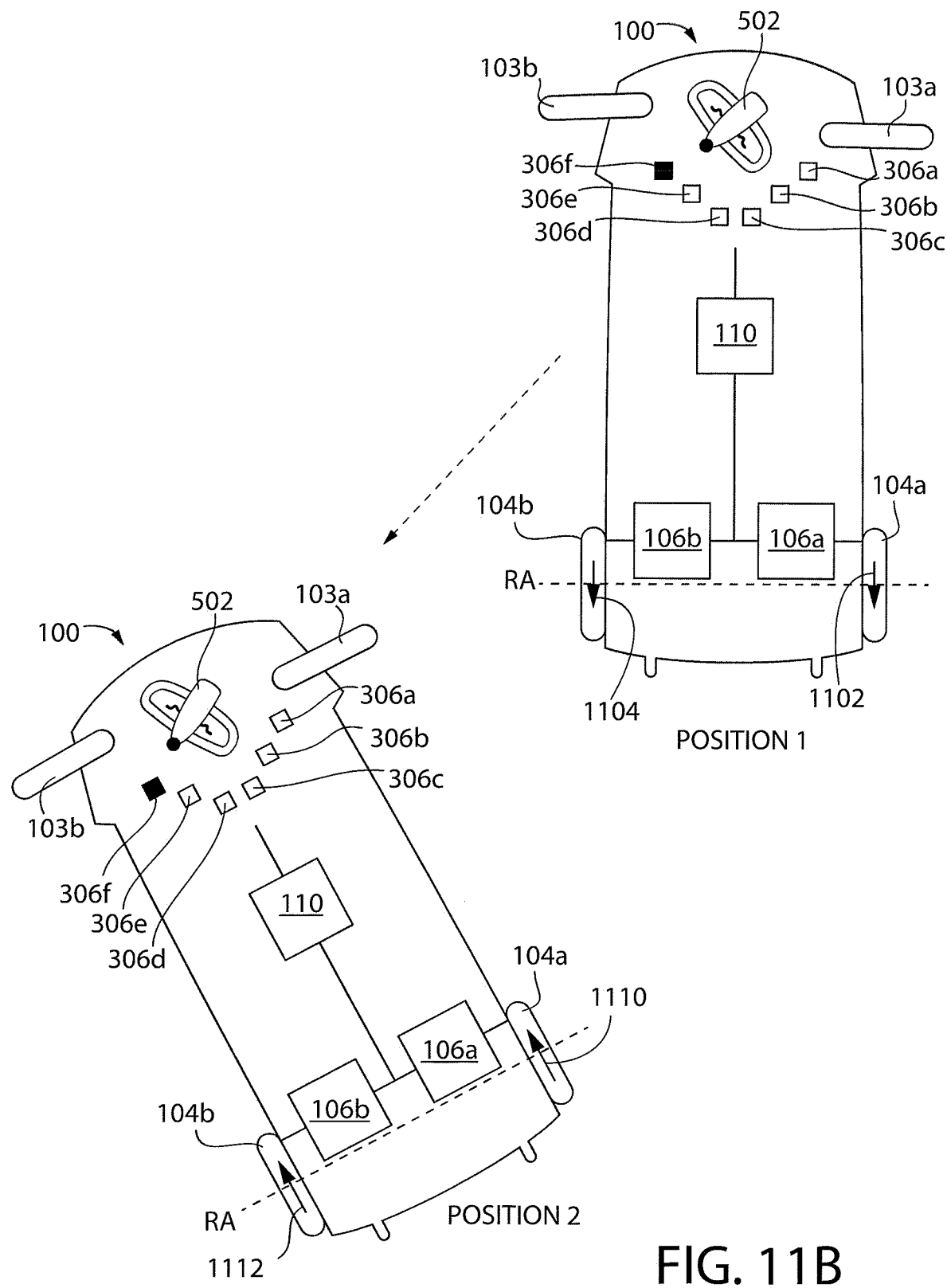
FIG. 11B is a schematic representation of a vehicle illustrating exemplary major turn entering functionality that may be disabled while the vehicle is traveling in reverse, according to some embodiments of the invention including, for example, one or more of the embodiments reflected in the foregoing figures.

FIG. 11B is schematic representations of vehicle 100 illustrating exemplary major turn entering functionality that may be disabled while the vehicle is traveling in reverse, according to some embodiments of the invention.

In FIG. 11B, vehicle 100 is substantially similar to the vehicle 100 in position 1 of FIG. 11A. In FIG. 11B, the controller 110 may be configured to determine that the steering indicator meets major turn criteria by also determining whether the user speed input device does not receive a reverse speed input. If the controller 110 determines that the user speed input device receives a reverse speed input, the controller 110 determines that the steering indicator does not meet major turn criteria, and thereby causes the right motor 106*a* and the left motor 106*b* to operate in a standard drive mode, as shown in position 2 of FIG. 11B. Arrows 1110 and 1112 illustrate the speed and direction of the right and left drive wheels 104a-104b at position 2. In some embodiments, the twelfth drive signal is configured to cause the left motor 106b to drive the left drive wheel 104b at approximately 50 percent of a power of the left motor 106b as caused by the first drive signal. In some embodiments, the thirteenth drive signal is configured to cause the right motor 106a to drive the right drive wheel 104a at approximately 50 percent of a power of the right motor 106a as caused by the second drive signal.

Zero Turn Modes Based on Operator Weight

In some embodiments, major turn mode functionality may be disabled despite the steering indicators indicating that the vehicle 100 should operate in a major turn mode (e.g., as shown in FIG. 6). For example, if the vehicle 100 is subject to an excessive user weight (e.g., >250 lbs), operating in major turn mode may not have sufficient power to drive the vehicle 100. In these scenarios, the controller 110 may need to increase power to the drive wheels 104a-104b to improve usability.

Figure 12A:
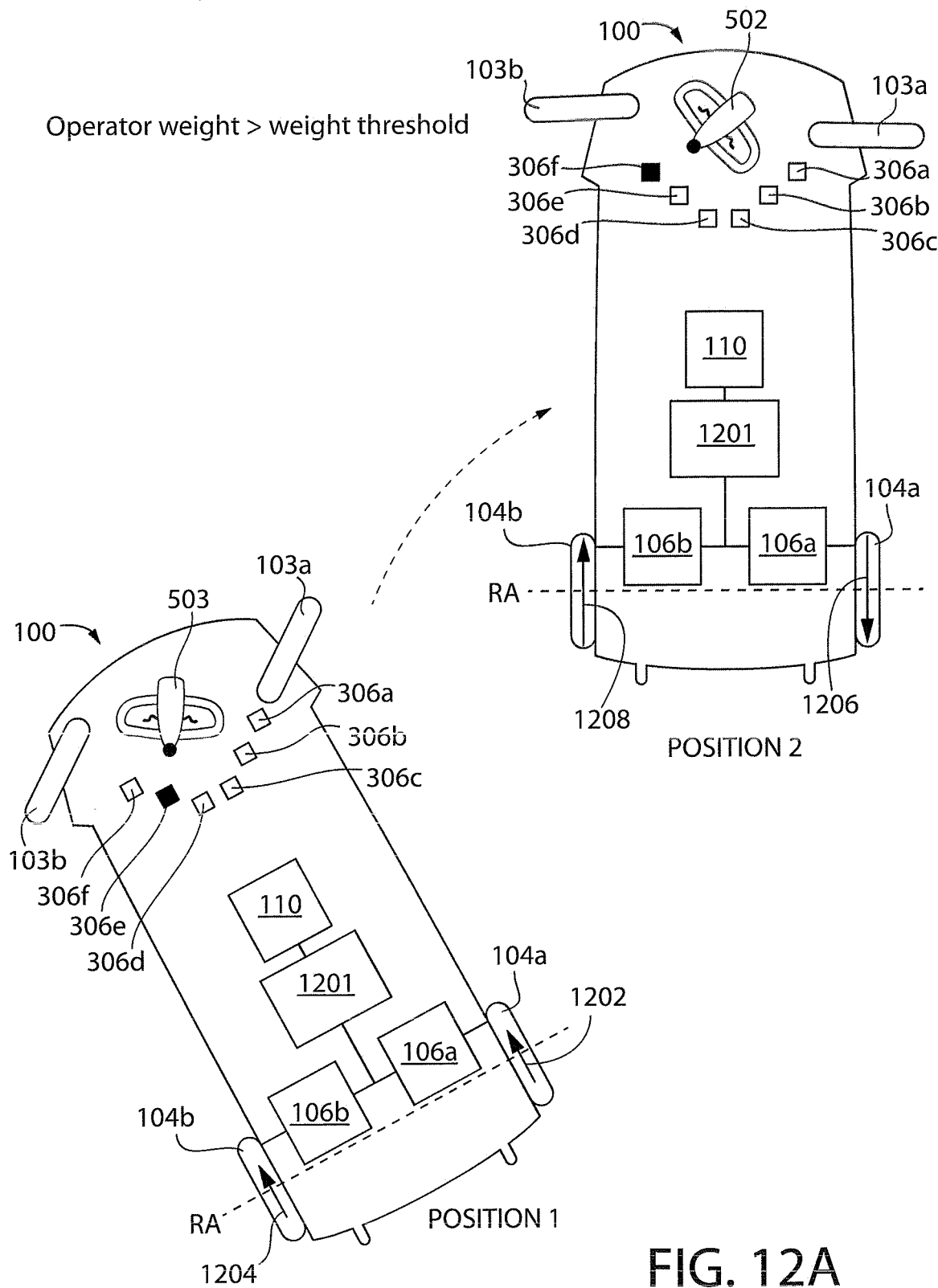
FIGS. 12A-12B are schematic representations of a vehicle illustrating exemplary major turn entering functionality based on user weight, according to some embodiments of the invention including, for example, one or more of the embodiments reflected in the foregoing figures.
Figure 12B:
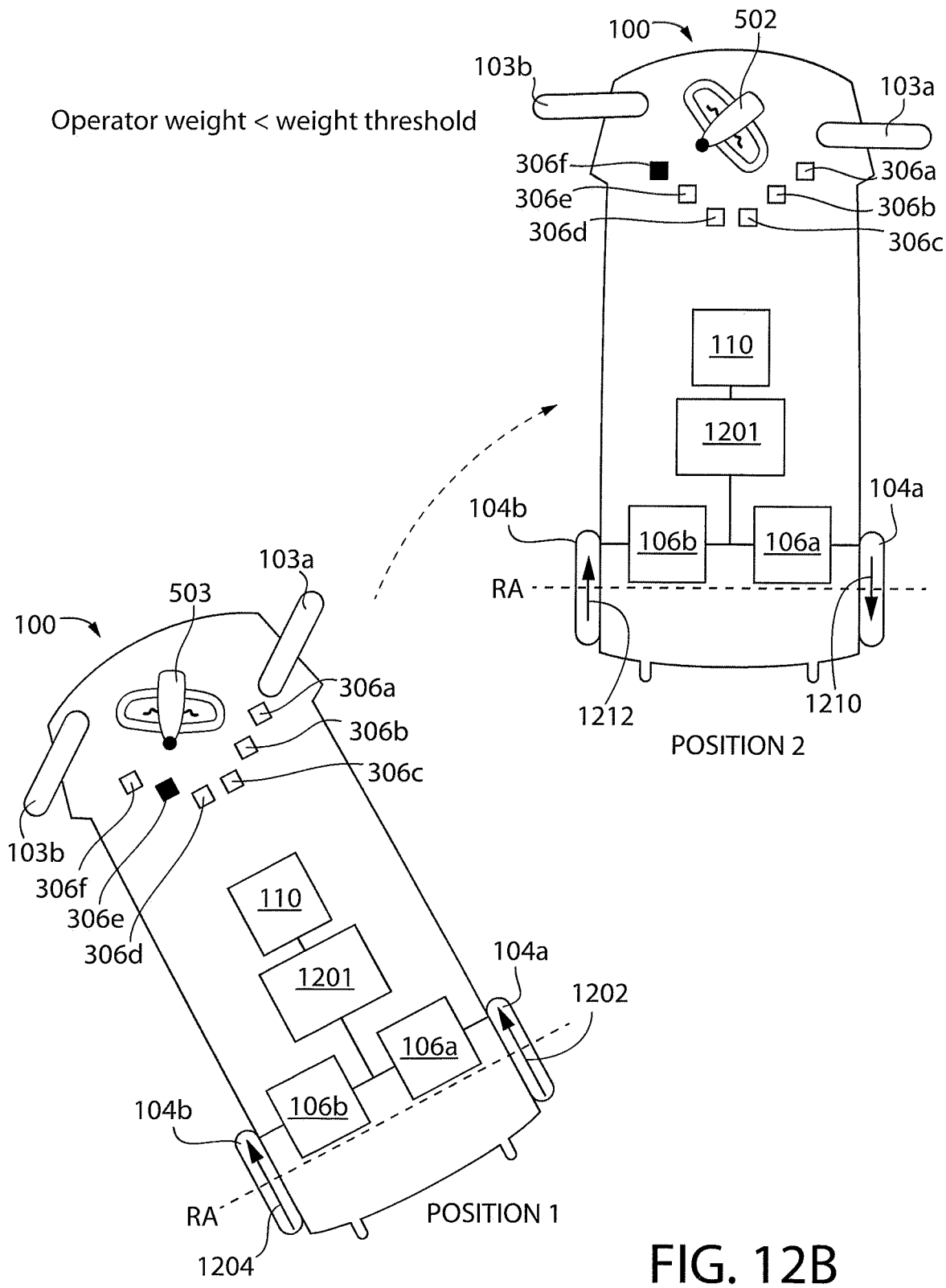

FIGS. 12A-12B are schematic representations of vehicle 100 illustrating exemplary major turn entering functionality based on user weight, according to some embodiments of the invention. In some embodiments, vehicle 100 may include a user weight sensor 1201 configured to detect a weight of a user operating the vehicle. Examples of weight sensor 1201 include an accelerometer, a strain gauge.

In FIG. 12A, at position 1, the vehicle 100 is operating in standard drive mode, where the controller 110 causes the first and second drive motors 106a-106b to drive the right and left drive wheels 104a-104b at a speed based on a throttle input of the throttle 108. Arrows 1202 and 1204 illustrate the speed and direction of the right and left drive wheels 104a-104b. At position 2, the controller 110 determines that the steering indicator meets major turn criteria. The controller 110 may also determine that the weight of an operator of the vehicle 100 is greater than an operator weight threshold. In response to a determination that the steering indicator meets major turn criteria and the weight of an operator of the vehicle 100 is greater than an operator weight threshold, the controller 110 provides a fourteenth drive signal to the first motor (e.g., left motor 106b). The fourteenth drive signal may be configured to cause the first motor to drive the first drive wheel (e.g., left drive wheel 104b) in the forward direction at a fourteenth speed that is greater than the first speed of the first drive wheel while operating in major turn mode as shown in FIG. 6. Also, in response to a determination that the steering indicator meets major turn criteria and the weight of an operator of the vehicle 100 is greater than an operator weight threshold, the controller 110 provides a fifteenth drive signal to the second motor (e.g., right motor 106a). The fifteenth drive signal may be configured to cause the second motor to drive the second drive wheel (e.g., right drive wheel 104a) in the reverse direction at a fifteenth speed that is greater than the second speed of the second drive wheel while operating in major turn mode as shown in FIG. 6. Arrows 1206 and 1208 illustrate the speed and direction of the right and left drive wheels 104a-104b at position 2.

In some embodiments, the fourteenth drive signal and fifteenth drive signal cause the right motor 106a and the left motor 106b to drive the left drive wheel 104b and the right drive wheel 104a, respectively, using approximately twice the power as compared to the first drive signal and the second drive signal, respectively. In some embodiments, the fourteenth drive signal is configured to cause the first motor (e.g., left motor 106b) to drive the first drive wheel (e.g., left drive wheel 104b) at approximately 60 percent of a maximum power of the first motor, and the fifteenth drive signal is configured to cause the second motor (e.g., right motor 106a) to drive the second drive wheel (e.g., right drive wheel 104a) at approximately 30 percent of a maximum power of the second motor. In FIG. 12B, the vehicle 100 at position 1 is substantially similar to the vehicle 100 at position 1 of FIG. 12A. At position 2, if the controller 110 determine that the weight of an operator of the vehicle 100 is less than an operator weight threshold, the controller 110 causes the right motor 106a and the left motor 106b to operate in major turn mode, represented in FIG. 6. In some embodiments, the first drive signal is configured to cause the first motor (e.g., left motor 106b) to drive the first drive wheel (e.g., left drive wheel 104b) at approximately 30 percent of a maximum power of the first motor. The second drive signal is configured to cause the second motor (e.g., right motor 106a) to drive the second drive wheel (e.g., right drive wheel 104a) at approximately 15 percent of a maximum power of the second motor. Arrows 1206 and 1208 illustrate the speed and direction of the right and left drive wheels 104a-104b at position 2.

In some embodiments, the predetermined operator weight threshold is approximately 250 lbs.

In some embodiments, the controller 110 deactivates major turn mode if the controller 110 determines that a time period that the vehicle 100 operates in major turn mode exceeds a major turn mode time limit threshold. In some embodiments, the major turn mode time limit threshold is between 7 and 10 seconds. Deactivation of major turn mode may be necessary to reduce any excess wear on the vehicle 100 that is caused by operating in major turn mode for a prolonged period of time.

In some embodiments, the major turn mode time limit threshold is a function of a weight of an operator of the vehicle. In some embodiments, if an operator weight is above a weight threshold (e.g., 250 lbs), then the major turn mode time limit may be a high value (e.g., 10 seconds) and if the operator weight is below the operator weight threshold, then the major turn mode time limit may be a lower value (e.g., 7 seconds). In some embodiments, the major turn mode time limit threshold when the operator weight is less than the operator weight threshold is half an amount of time as the major turn mode time limit threshold when the weight of the operator of the vehicle is greater than the operator weight threshold.

Indoor/Outdoor Mode

In some embodiments, the vehicle 100 can be operated in an indoor mode or an outdoor mode. While in indoor mode, the user may desire to drive the vehicle 100 at reduced speeds while in major turn mode, as compared to driving the vehicle 100 outdoors. This may be because there are tighter hallways and more objects to avoid while driving indoors as compared to driving outdoors. In some embodiments, in an indoor mode, while the controller 110 operates the vehicle 100 in major turn mode, the controller 110 is configured to cause the first and second motors 106a-106b to drive the first and second wheels 104a-104b at a speed that is approximately 30 percent of a commanded speed indicated by the user speed input device. In some embodiments, in an outdoor mode, while the controller 110 operates the vehicle 100 in major turn mode, the controller 110 is configured to cause the first and second motors 106a-106b to drive the first and second wheels 104a-104b at a speed that is approximately 60 percent of a commanded speed indicated by the user speed input device. In some embodiments, while the controller 110 operates the vehicle 100 in major turn mode and outdoor mode, the controller 110 is configured to cause the first and second motors 106a-106b to drive the first and second wheels 104a-104b at a speed that is approximately twice the speed that the controller 110 is configured to cause the first and second motors 106a-106b to drive the first and second wheels 104a-104b while in major turn mode and indoor mode.

In some embodiments, an environmental mode selection input selectable by a user is provided on the vehicle 100. In some embodiments, the environmental mode selection input is a switch or dial. In some embodiments, the environmental mode selection input may a light sensor, an accelerometer, a temperature sensor or a humidity sensor. In some embodiments, the environmental mode selection input is integrated into the throttle, such that repeatedly engaging and disengaging the throttle causes toggling between indoor and outdoor mode. The environmental mode selection input is configured to cause the controller 110 to operate in the indoor mode or the outdoor mode. In some embodiments, the environmental mode selection input is positioned on the steering input 102. In some embodiments, environmental mode selection input is a switch.

Steering Assembly

In some embodiments, vehicles such as mobility scooters having the functionality described above, are implemented with the steering assemblies and front end configurations as described in the following embodiments. For example, embodiments of the steering assembly 202 are described below and shown in further detail in FIGS. 13A1-13C3. FIG. 13A1 illustrates a bottom front perspective view of a portion of the vehicle 1300 according to at least one embodiment of the invention. FIGS. 13A2-13A3 illustrate top views of a portion of the vehicle 1300 according to at least one embodiment of the invention. FIGS. 13B1-13B2 illustrate bottom views of a portion of the vehicle 1300 according to at least one embodiment of the invention. FIG. 13C1 illustrates a top front perspective view of a portion of the vehicle 1300 according to at least one embodiment of the invention. FIGS. 13C2-13C3 illustrate a top and front views, respectively, of a steering assembly 102 of the vehicle 1300, according to at least one embodiment of the invention.

Turning now to FIG. 13A1, the vehicle 1300 (which, in some embodiments, is similar to vehicle 100) may include a frame 1302. The frame 1302 may be disposed along a longitudinal axis LA. The vehicle 1300 may include steering assembly 202. The steering assembly 202 may be coupled to the frame 1302. The steering assembly 202 may have a left directional control wheel 103b and the right directional control wheel 103a positioned on either side of the longitudinal axis of the frame 1302. The right and left directional control wheels 103a-103b may also be referred to herein as right and left front wheels 103a-103b. The right and left front wheels 103a-103b may be coupled to the steering input 102 via a steering linkage 1308 (also referred to herein as linkage member). In some embodiments, the steering linkage 1308 includes a right tie rod 1308a and a left tie rod 1308b.

The steering linkage 1308 may be configured to pivot in response to movement of the steering input 102. The steering linkage 1308 may be configured and dimensioned such that each of the right front wheel 103a and the left front wheel 103b has a maximum inward turn angle. As used herein, inward turn angle refers to the direction of a wheel relative to the longitudinal axis such that a vector representing the forward direction of the wheel would cross the longitudinal axis. Also as used herein, an outward turn angle refers to the direction of a wheel relative to the longitudinal axis such that a vector representing the forward direction of wheel would diverge from the longitudinal axis. In a vehicle turn, a front wheel having an inward turn angle would be an outside front wheel and the front wheel having an outward turn angle would be an inside front wheel. The maximum inward turn angle may be characterized by a limit to which either the left front wheel 103b or right front wheel 103a can turn inward relative to the longitudinal axis. For example, in FIG. 13A2, while the steering input 102 is positioned in a full-right turn (e.g., major turn position), the left front wheel 103b (e.g., the outside from wheel)) has a maximum inward turn angle of 60° represented in FIG. 13A2 as the angle between longitudinal axis LA and left wheel longitudinal axis LWLA. Each of the left front wheel 103b or right front wheel 103a may be configured to have a firm maximum inward turn angle and corresponding variable outward maximum turn angle. For example, a firm maximum inward turn angle may be caused by rigid members in the steering assembly engaging each other to limit their respective movement. A variable outward maximum turn angle may, in some embodiments have an intermediate maximum outward turn angle and a maximum outward turn angle. In some embodiments, steering assembly 202 includes linkage components that flex through the intermediate maximum outward turn angle to the maximum outward turn angle until the maximum turn limit is reached (by for example, the engagement of rigid members at the maximum outward turn angle. In some embodiments, the maximum outward turn angle is governed by the corresponding front end linkage and can only be achieved when the outside wheel is turned to reach the maximum inward turn angle. In some embodiments, the steering assembly 202 is configured to position the inside wheel to the intermediate maximum outward turn angle when the outside wheel is turned to the maximum inward turn angle. That position can be overcome however to urge the inside wheel to its maximum outward turn angle even while the outside wheel remains at the maximum inward turn angle.

At the maximum inward turn angle, the pivot point at which the tie rod is linked to the steering bracket is positioned rearward of a line passing through the two king pin axes. In some embodiments, each of left front wheel 103b and right front wheel 103a have a maximum inward turn angle and a maximum outward turn angle. In some embodiments, the steering linkage 1308 may be configured and dimensioned such that each of the left front wheel 103b and the right front wheel 103a have an intermediate outward turn angle and a maximum outward turn angle. The maximum outward turn angle may be characterized by a limit to which the front of either the left front wheel 103b or right front wheel 103a can turn away from the longitudinal axis (in some embodiments, while the vehicle 100 is at rest). In some embodiments, when the right and left front wheel 103a-103b (e.g., inner wheel) is turned to a respective right or left maximum inward turn angle, the other of the right and left front wheel 103a-103b (e.g., outer wheel) is turned to an intermediate outward turn angle that is less than the maximum outward angle unless a biasing force is applied to the other of the left front wheel 103b or right front wheel 103a to urge the wheel to the respective maximum outward turn angle. For example, when the tiller may be turned to the greatest degree possible, the steering assembly 202 is configured to position an outside wheel in the maximum inward turn angle while the inside wheel is positioned in the intermediate maximum outward turn angle. Yet, in one example, while both the tiller and the outside wheel have reached the limit of their travel distance, the inside wheel is capably of further rotation to achieve the maximum outward turn angle. In some embodiments, this is due to the flexing of the steering assembly 202 in response to a further biasing force (e.g., beyond the mere motion of the tiller). For example, in FIG. 13A2, and in some embodiments, the intermediate outward turn angle is approximately 88° as represented in FIG. 13A2 as the angle between longitudinal axis LA and right wheel longitudinal axis RWLA and in FIG. 13A3, while the steering input 102 is positioned in a full-right turn, the right front wheel 103a has a maximum outward turn angle of 91°. In FIG. 13A2, while the steering input 102 is positioned in a full-right turn, and the right and left drive wheels 104a-104b is driven in a forward direction, indicated by the representative arrows 1330 and 1327 on the right and left drive wheels 104a-104b, the right front wheel 103a has an intermediate outward turn angle of 88°. While turning the vehicle 100 pivots about intersection point 1333 of the right front wheel axis RFA and the rear axis RA. In FIG. 13A3, when the vehicle 100 is operated in major turn mode to pivot about intersection point 1335 of the right front wheel axis RFA and the rear axis RA, and the right drive wheel 104a is driven in a reverse direction, indicated by the representative arrows 1332 and 1327 on the right and left drive wheels 104a-104b, a biasing force is applied (or increased) to the right front wheel 103a to urge the right front wheel 103a to the respective maximum outward turn angle of 91°. Without wishing to be bound to any one particular theory, in some embodiments, the biasing force is a function of a difference in the relative power levels (e.g., voltage, current) provided to the right motor 106a and the left motor 106b. In some embodiments, the biasing force is attributable to friction on the inside from wheel from the ground surface and/or the relative power levels exerted by right motor 106a and left motor 106b and/or by one of the right motor 106a and left motor 106b.

In some embodiments, the intermediate maximum outward turn angle is different from the maximum outward turn angle by a value of approximately less than 10°, inclusive; less than 8°, inclusive; less than 6° inclusive; less than 4°, inclusive; less than 2°, inclusive. In some embodiments, the intermediate maximum outward turn angle is approximately 83°, approximately 84°, approximately 85°, approximately 86°, approximately 87°, or approximately 88°. In some embodiments, the intermediate maximum outward turn angle is greater than 83°, greater than 84°, greater than 85°, greater than 86°, greater than 87°, or greater than 88°. In some embodiments, the maximum outward turn angle is approximately 90°, approximately 91°, approximately 92°, approximately 93°, approximately 94°, or approximately, 95°. In some embodiments, the maximum outward turn angle is greater than 87°, greater than 88°, greater than 89°, greater than 90°, greater than 91°, greater than 92°, greater than 93°, greater than 94°, or greater than 95°.

In some embodiments, controller 110 is configured to simultaneously drive a first drive wheel (e.g., right drive wheel 104a) and a second drive wheel (e.g., left drive wheel 104b) in opposite directions for at least a portion of time when one of the left front wheel or right front wheel (e.g., right or left front wheel 103a-103b) is in the maximum outward angle.

In some embodiments, the controller 110 is configured to power each of the first drive wheel and the second drive wheel (e.g., right and left drive wheels 104a-104b) at power levels of approximately the same absolute value and in different directions when one of the left front wheel or right front wheel (e.g., right or left front wheel 103a-103b) is in the maximum outward angle.

In some embodiments, the first drive wheel (e.g., right drive wheel 104a) operates at a different revolutions per minute (or angular velocity) than the second drive wheel (e.g., left drive wheel 104b) when the power levels are of approximately the same absolute value. This can arise because of the relative configuration of the steering assembly 202 at the time the wheels are being powered and the geometry of the turn arc.

Turning now to FIGS. 13B1-13B2, the steering assembly 202 may include a steering stem 1310 and/or a stem tab 1312. The stem tab 1312 may be coupled to the steering stem 1310. The stem tab 1312 may rotate about the steering stem 1310 in response to movement of the steering input 102, as illustrated by representative arrow 1334, for example. Steering assembly 202 may include a linkage member 1308 that may be coupled to the stem tab 1312. The linkage member 1308 may be configured to pivot in response to movement of the steering input 102, via the steering stem 1310 and stem tab 1312. The linkage member 1308 may include one or more tie rods, such as right tie rod 1308a and left tie rod 1308b shown in FIGS. 13B1-13B2. The right and left tie rods 1308a-1308b may be pivotably coupled to the stem tab 1312. The right and left tie rods 1308a-1308b may be configured to pivot, via the steering stem 1310 and stem tab 1312, in response to movement of the steering input 102 to cause the right and left front wheels 103a-103b to orient relative to the steering position of the steering input 102. In one embodiment, stem tab 1312 comprises two tie rod connection points 1360a-1360b separated by a distance DST. Stem tab 132 may pivot about a steering stem 1310 at a steering stem pivot point A. In some embodiments, a line from the stem pivot point A and the first tie rod connection point 1360a is approximately. In one embodiment, as shown in FIG. 13B3, the angle between a line from the stem pivot point A and the first tie rod connection point 1360a and a line from the stem pivot point A to the second tie rod connection point 1360b is approximately 20°. In one embodiment, the angle between a line of the stem pivot point A and the first tie rod connection point 1360a and the longitudinal axis LA is approximately 10°.

Turning back to FIGS. 13B1-13B2, the steering assembly 202 may include an axle beam 1314. The axle beam 1314 may be pivotably mounted to the frame 1302. The axle beam 1314 may be substantially perpendicular to the longitudinal axis LA of the vehicle 100. The axle beam 1314 may include a right wheel axle 1318a and a left wheel axle 1318b (which, in some embodiments, may be similar or identical to right and left wheel axles 112a-112b. The right wheel axle 1318a and the left wheel axle 1318b may be rearwardly offset from the axle beam 1314. The right wheel axle 1318a and the left wheel axle 1318b may be are configured to angle rearward of the main body of the vehicle 100. The configuration is selected to allow the inside front wheel during a turn to achieve the maximum outside turn direction while limiting the effect of cam over. In some embodiments, illustrated for example, in FIG. 13F, left tie rod 1308 is pivotably connected to left steering arm 1324a at steering/rod pivot point. Left tie rod 1308 is also pivotably connected to stem tab 1302 at a tab/rod pivot point. If left tie rod 1308 is pivoted such that axis of the tie rod between the steering/rod pivot point and the tab/rod pivot point passes to the rear of the left king pin, there is a risk of significant cam-over effect which is suboptimal for operation of the vehicle at least because it can be more difficult to steer the vehicle out of a major turn. In some embodiments, a bump is provided to limit or prevent that cam-over. In some embodiments, a slight cam over effect is induced which may enhance the biasing force to keep the inside drive wheel at the major outward turn direction. In some embodiments, the bias caused by the cam over can be relieved by altering the motion of one or both drive wheels. For example, the force applied to drive the inner drive wheel may be reduced or eliminated to reduce the cam-over effect.

The steering input 102 may include right king pin 1316a and/or a left king pin 1316-b coupled to the axle beam 1314. The right king pin 1316a and/or a left king pin 1316b may be rotatable about a respective king pin axis 1316c-1316d. The right and left king pins 1316a-1316b may be configured to allow each of the respective right and left front wheels 103a-103b to pivot along one the respective king pin axes 1316c-1316d. The right and left tie rod 1308a-1308b may be pivotably coupled to a respective right and left king pin 1316a-1316b.

In some embodiments, such as in FIGS. 13C1-13C3, the steering assembly 202 may include right steering arm 1324a and/or a left steering arm 1324b to couple the right and left king pins 1316a-1316b to the right and left tie rods 1308a-1308b. The right and left steering arms 1324a-1324b may couple to the respective right and left king pins 1316a-1316b via right and left king pin sleeves 1317a-1317b. Each of the left steering arm 1324a and a left steering arm 1324b may be rotatable about and projecting from the right and left kingpin axes 1316c-1316d, respectively. In some embodiments, the right steering arm 1324a and/or a left steering arm 1324b is configured to project a distance that is configured to achieve the maximum outward turn angle without confronting the inside of the inside wheel. In this configuration, movement of the steering input 102 causes the right and left front wheels 103a-103b to reorient accordingly.

As shown in FIGS. 13B1, 13B2 and 13C2, the steering assembly 202 may comprise a right stop 1315a and a left stop 1315b. Right stop 1315a and left stop 1315b are configured to prevent elements (e.g., tie rods) of steering assembly 202 from passing beyond right stop 1315a and left stop 1315b respectively, in some embodiments. By limiting movement of components of steering assembly 202, the respective right wheel and left wheel reach their respective maximum turn angle. In some embodiments, right stop and left stop are configured as retractable steering stops such as described in more detail below such as in connection with FIGS. 13G1-13G4. In some embodiments, right stop 1315a and a left stop 1315b are positioned on axle beam 1314. In some embodiments, as the right tie rod 1308a and/or left tie rod 1308b pivot, the right tie rod 1308a or left tie rod 1308b may engage the right stop 1315a or left stop 1315b respectively when one of the right or left front wheels 103a-103b reaches the respective maximum outward turn angle. The right stop 1315a and left stop right stop 1315b may be configured to prevent the right front wheel 103a and the left front wheel 103b from turning beyond the respective maximum outward turn angle. FIG. 13B2 illustrates a vehicle 100 in a full right turn. The right tie rod 1308b is pivoted and has engaged the right stop 1315a such that the right front wheel 103a is at a maximum outward turn angle.

As shown in FIG. 13C1, in some embodiments, the axle beam 1314 may be coupled to the frame 1302 by at least one suspension member. The suspension member may be configured to allow each of the right front wheel 103a and left front wheel 103b to translate (or move vertically) relative to the frame 1302 substantially along a vertical axes (illustrated by representative arrow 1340) of the vehicle 1300. The suspension member may include at least one spring, such as springs 1320a-1320b shown in FIG. 13C. The suspension member may include a swing arm 1322 pivotably coupled to the frame 1302 and fixed to the axle beam 1314. The suspension member may be configured to allow the right front wheel 103a and the right front wheel 103b to translate (or move vertically) along a vertical axes (illustrated by representative arrow 1340) of the vehicle 1300. For example, the springs 1320a-1320b shown in FIG. 13C1 may compress and expand in response to an increase or decrease of force applied to the right front wheel 103a and the left front wheel 103b. The swing arm 1322 shown in FIG. 13C may pivot in response to an increase or decrease of force applied to the right front wheel 103a and the right front wheel 103b. In some embodiments, each of right and left front wheels 103a-103b are translatable relative to the frame by no more than a value between 0.25 inches and 1 inch. In some embodiments, the degree of suspension member travel is selected to accommodate an inside wheel maximum outward turn angle. For example, in some embodiments, a suspension that is too soft may hamper the linkage in achieving the desired maximum turn angles.

In some embodiments, such as in FIGS. 13C2-13C3, the steering assembly 202 includes a right wheel axle 1326a and left wheel axle 1326b coupled to the right and left kingpin 1316a-1316b respectively. Each of the right and left wheel axles 1326a-1326b being rotatable about and projecting from the right and left kingpin axis 1316c-1316d respectively. The right front wheel 103a and left front wheel 103b may be rotatable about the respective right and left wheel axle 1326a-1326b, respectively.

In some embodiments, each of the right steering arm 1324a and left steering arm 1324b is fixed relative to the right and left wheel axle 1326a-1326b respectively at an angle between 60° and 100°; an angle between 70° and 90°; an angle of approximately 68°, approximately 69°, approximately 70°, approximately 71°, approximately 72°, approximately 73°, approximately 74°, approximately 75°, approximately 76°, approximately 77°, approximately 78, approximately 79° or an angle of approximately 80°. For example, in FIG. 13C4, an angle between right steering arm 1324a and right wheel axle 1326a is shown as 73°, and in some embodiments, can be an angle between 68 and 78 degrees. In some embodiments, each of the right and left steering arms 1324a-1324b includes a tie rod connection point. For example, in FIG. 13C4, the right steering arm 1324a includes a tie rod connection point 1362. A distance between a center of a tie rod connection point 1362 and a king pin axis 1316c of king pin 1316a is approximately 1.9 (e.g., 1.89 inches in FIG. 13C4). Referring to FIGS. 13B3 and 13C4, in some embodiments, a ratio between (i) a distance between a center of a tie rod connection point 1362 and a kingpin axis 1316a and (i) a distance between a tie rod connection point 1360 and a steering axis A is approximately 1.2, or in some embodiments, between 1.1 and 1.3.

In some embodiments, the axle beam 1314 may comprise one or more cutouts, such as right and left cutouts 1342a-1342b shown in FIG. 13C2. When the right or left front wheel 103a-103b is at a maximum inward turn angle, the respective right or left steering arm 1324a-1324b is configured to register within the respective right and left cutout 1342a-1342b.

Wheel Axes Intersection Point

Figure 13D:
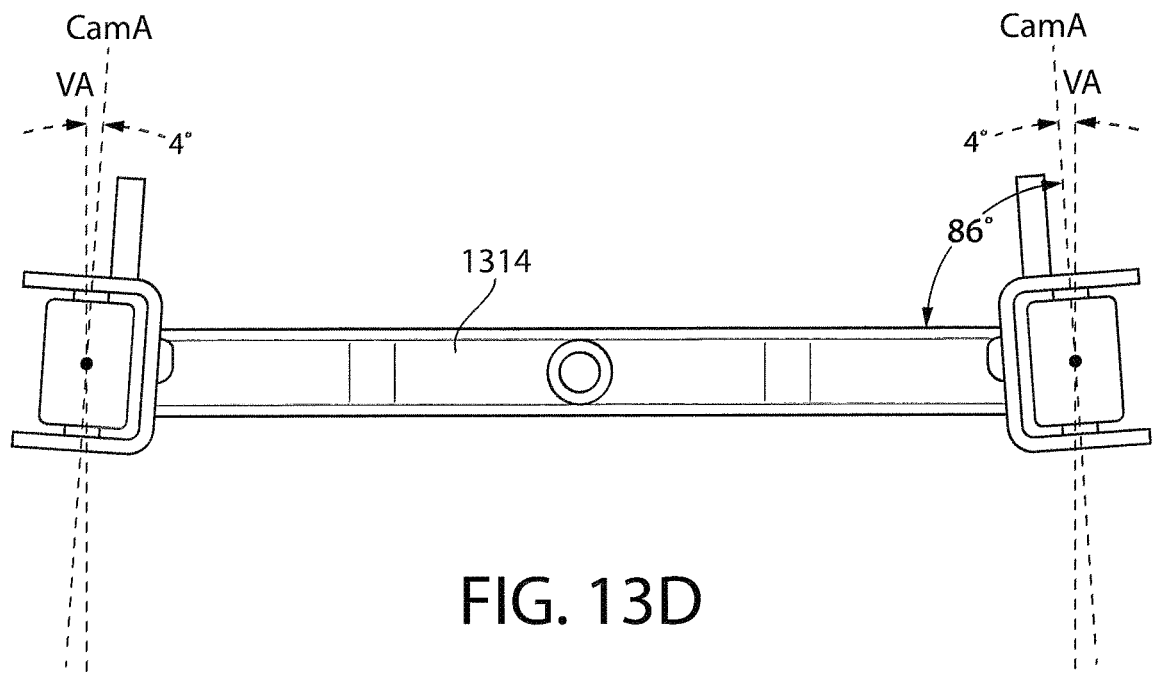
FIGS. 13D-13E are front views of a portion of the steering input, according to at least one embodiment of the invention; including, for example, one or more of the embodiments reflected in the foregoing figures
Figure 13E:
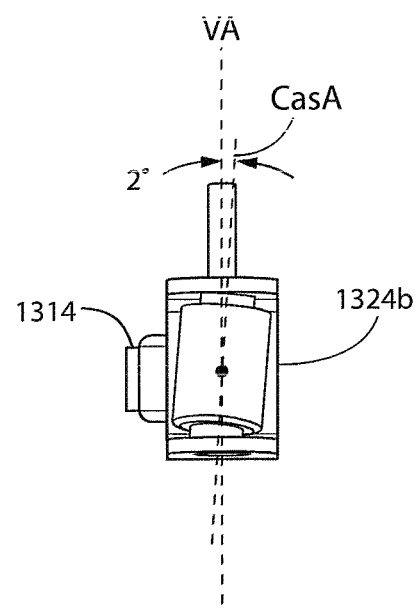

FIGS. 13D-13E are front and left side views, respectively of a portion of the steering input 102, according to at least one embodiment of the invention. In some embodiments, the steering assembly 202 includes an axle beam 1314, a right steering arm 1324a, a right kingpin 1316a, a left steering arm 1324b and a left kingpin 1316b. The right steering arm 1324a and the left steering arm 1324b may be oriented relative to a plane defined by the longitudinal axis and the vertical axis of the vehicle 1300 at a camber angle of approximately 4°, a camber angle of approximately 3°, a camber angle between 3° and 5°, inclusive or a camber angle between 2° and 6°, inclusive. As used herein, camber angle may be the angle between the vertical axis of the vehicle and the vertical axis of the wheels when viewed from the front of the vehicle. In some embodiments, the right kingpin 1316*a*, and left kingpin 1316*b* may be oriented relative to a plane defined by the lateral axis and the vertical axis of the vehicle 1300 at a caster angle of approximately 2°, a caster angle of approximately 3°, a caster angle between 1° and 3°, or a caster angle between 1° and 4°. As used herein, caster angle may be an angular displacement of the steering axis of the wheels from the vertical axis of a vehicle. FIG. 13D illustrates an axle beam 1314 having a camber angle of 4° as illustrated by vertical axis VA and camber axis CamA. FIG. 13E illustrates a left side view of left steering arm 1324*b* having a caster angle of 2° as illustrated by vertical axis VA and caster axis CasA.

Figure 13F:
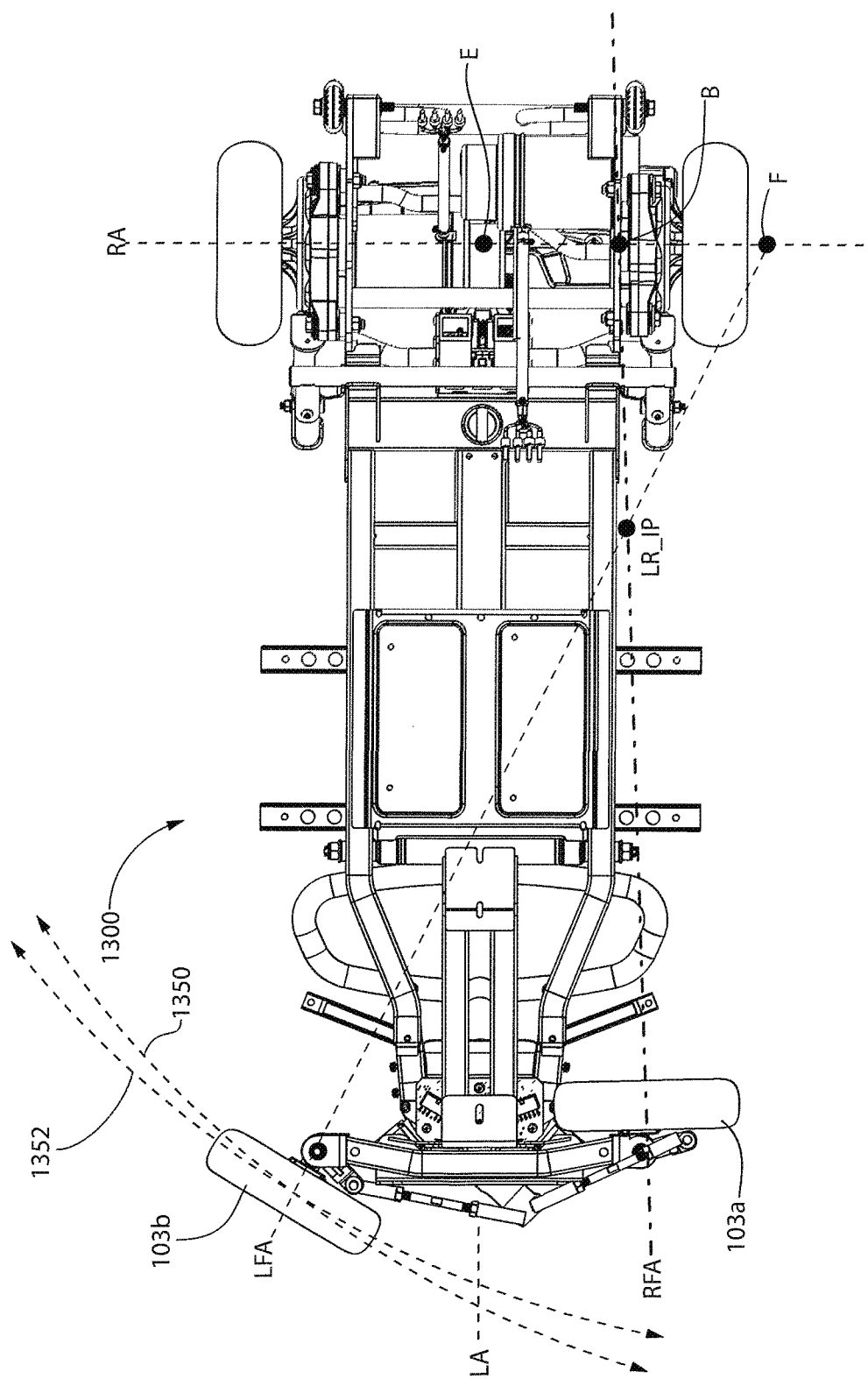
FIG. 13F is a bottom view of a portion of a vehicle in a major turn mode configuration, according to at least one embodiment of the invention including, for example, one or more of the embodiments reflected in the foregoing figures.

FIG. 13F is a bottom view of a portion of the vehicle 1300 in a major turn mode configuration, according to at least one embodiment of the invention. In FIG. 13F, right and left drive wheels 104*a*-104*b* (not shown) rotate about a rear wheel axis RA. Right front wheel 103*a* rotates about a right front wheel axis RFA. Left front wheel 103*b* rotates about a left front wheel axis LFA. While the right front wheel 103*a* is at a maximum outward turn angle, as shown in FIG. 13F, projections of the right front wheel axis RFA and left front wheel axis LFA intersect at a vertical projection intersection point LR_IP that is forward of the rear wheel axis RA. In some embodiments, the left front wheel axis LFA and right front wheel axis RFA projections intersect at a point that is set off from a longitudinal axis LA on the left side of the frame 1302 when the left front wheel is at the maximum outward turn angle. By configuring the right and left front wheels 103*a*-103*b* such that the vertical projection intersection point LR_IP is inside the inner drive wheel, a tight turning radius about a pivot point can be achieved. For example, in some embodiments, the pivot point of the vehicle 100 is proximate the inside drive wheel (e.g., vertical axis B proximate right drive wheel 104*a* in FIG. 13F). In some embodiments, the pivot point is between the two drive wheels (e.g., right and left drive wheels 104*a*-104*b*). In some embodiments, the pivot point is at a center point between two drive wheels (e.g., vertical center point axis E between right and left drive wheels 104*a*-104*b*). In some embodiments, the pivot point is on or near or proximate to the drive wheel axis RA. In some embodiments, the pivot point is between a center point between two drive wheels (e.g., center point E) and an inside edge of the inner drive wheel (e.g., inside edge 1344 of right drive wheel 104*a* during a right turn or inside edge 1346 of left drive wheel 104*b* during a left turn). In some embodiments, while the vehicle 100 operates in major turn mode, the turning radius is substantially controlled by the inside wheel. The steering assembly 202 may be configured to permit the outside wheel (e.g., left front wheel 103*b*) to slide and thereby not influence or only minimally influence turn radius of the vehicle 100.

In some embodiments, a distance between the vertical projection intersection point LR_IP and the rear axis RA increases as the one of the right and left front wheel 103*a*-103*b* rotates from an intermediate maximum turn angle towards a maximum outward turn angle. In some embodiments, the distance between the vertical projection intersection point LR_IP and the rear axis RA is a value between 93 inches and 117 inches, when the one of the right and left front wheel 103*a*-103*b* is rotated at an angle between an intermediate maximum turn angle towards a maximum outward turn angle. In some embodiments, a distance between vertical projection intersection point LR_IP and the longitudinal axis decreases as the one of the right and left front wheel 103*a*-103*b* rotates from an intermediate maximum turn angle towards a maximum outward turn angle. In some embodiments, the distance between the vertical projection intersection point LR_IP and the longitudinal axis LA is a value between 56 inches and 76 inches, when the one of the right and left front wheel 103*a*-103*b* is rotated at an angle between an intermediate maximum turn angle towards a maximum outward turn angle. In some embodiments, the distance between vertical projection intersection point LR_IP and the rear axle RA varies linearly as the one of the right and left front wheel 103*a*-103*b* pivots from an intermediate maximum turn angle towards a maximum outward turn angle.

In some embodiments, the vertical projection intersection point LR_IP is at, near or proximate to the rear axle RA.

In some embodiments, the outside drive wheel (e.g., left front wheel 103*b*) may follow an arc 1350 about an intersection point B between the inner wheel axis (e.g., right front wheel 103*a*) and the rear axis RA rather than following an arc 1352 about an intersection point F between the outside wheel axis (e.g., left front wheel axis LFA) and the rear axis RA, due to the inside drive wheel (e.g., right drive wheel 104*a*) being driven in a reverse direction.

Retractable Steering Stops

In some embodiments, when performing at or near a major turn, vehicle 1300 may have certain disadvantages when encountering obstacles while at or near the maximum steering angle. For example, when an inside front wheel at the maximum steering angle contacts obstacles such as driving surface irregularities (e.g., small curbs or sidewalk irregularities), forces act upon the inside front wheel to cause the inside front wheel to be undesirably forced toward the maximum outside steering angle. In some embodiments, where the tiller handle has a higher sweep angle, for example, the result of contacting a surface irregularity may result in a force against a wheel that translates to the tiller and result in an abrupt change that startles the user.

In one embodiment, the vehicle 1300 may include a steering stop configured to prevent the inner front wheel from transitioning to a maximum outward turn angle. In some embodiments, the steering stop permits the inner wheel to achieve an intermediate maximum turn angle but not a maximum outward turn angle. In some embodiments the steering stop is configured to include an engageable position where the steering stop prevents maximum outward turn angle and a nonengageable position where the steering stop does not prevent movement into the maximum outward turn angle. In some embodiments, the steering stop is retractable.

The steering stop is preferably configured to prevent unintended forces from being applied to the steering input 102 by the irregular driving surface. For example, in FIGS. 13G1-13G2, the vehicle 1300 includes a retractable right stop 1328*a* and a retractable left stop 1328*b*. The retractable right and left stops 1328*a*-1328*b* may each toggle between an engagement ready position 1329 and a retraction position. The retractable right and left stops 1328*a*-1328*b* may each be configured to restrict pivoting movement of one of the right or left steering arm 1324*a*-1324*b* relative to the axle beam 1314 when the respective retractable steering stop is in an engagement ready position. In some embodiments, the retractable right and left stops 1328*a*-1328*b* may be configured to allow pivoting movement of one of the right or left steering arm 1324*a*-1324*b* relative to the axle beam 1314 when the corresponding retractable right and left stops 1328*a*-1328*b* is in a retracted position. In some embodiments, the vehicle 1300 includes a retraction means, such as a controller, solenoid, motor, foot lever, hand lever, etc. or other means of manual or powered retraction.

The retraction means may be configured to cause at least one of the retractable right and left stops 1328*a*-1328*b* to toggle from the engagement ready position (e.g., left stop 1328*b* in an engagement ready position 1329 as shown in FIG. 13G2) to a retracted position (e.g., left stop 1328*b* in a retracted position 1331 as shown in FIG. 13G1) based upon at least one of: a user command (e.g., speed input, user actuation of a command controller, a switch), the position of the steering input 102, position dwell time, and the rate of change of position of steering input 102. In some embodiments, the retraction means is configured to cause at least one of the retractable right or left stops 1328*a*-1328*b* to be in a retracted position when the speed of the vehicle 1300 is greater than a speed threshold. In some embodiments, the retraction means is configured to cause the at least one of the retractable right and left stops 1328*a*-1328*b* to be in an engagement ready position when the speed of the vehicle 1300 is less than a speed threshold. In some embodiments, the retraction means is configured to cause at least one of the retractable right and left stops 1328*a*-1328*b* to be in a retracted position in response to a user command. In some embodiments, the retraction means is configured to cause at least one of the retractable right and left stops 1328*a*-1328*b* to be in a retracted position when a position of the steering input 102 is in a major turn position. In some embodiments, the retraction means is configured to cause at least one of the retractable right and left stops 1328*a*-1328*b* to be in an engagement ready position when a position of the steering input 102 is in a position other than a major turn position. By utilizing a retractable stop, the vehicle 1300 can minimize the impact of contacting surface irregularities when the vehicle 1300 is in a compromising configuration, while also otherwise providing full turning capabilities to the user in other configurations.

In one embodiment the retractable steering stop is positioned at or near a steering arm (e.g., right or left steering arm 1324*a*-1324*b*) such that the steering arm is configured to prevent the steering stop from further rotation relative to the axle beam. For example, in FIG. 13G1, right retractable steering stop 1328*a* is positioned at right steering arm 1324*a* and left retractable steering stop 1328*b* is positioned at left steering arm 1324*b*. In one embodiment, the steering stop is rotatably coupled (e.g., fixed to, integral with) to the steering arm. In one embodiment, the steering stop is rotatably coupled to (e.g., fixed to, integral with) the axle beam 1314. In one embodiment, the steering stop is rotatably coupled to (e.g., fixed to, integral with) the king pin bracket.

In one embodiment, the steering stop is engageable with an abutment member (e.g., right and left abutment members 1354*a*-1354*b*) to prevent movement of the inner wheel to the maximum outward turn angle. For example, in FIG. 13G2, left retractable steering stop 1328*b* is engaged with an abutment member 1354*b* while left retractable steering stop 1328*b* is in an engagement-ready position. An enlarged view 1353 at the left steering arm 1324*b* further illustrates left retractable steering stop 1328*b* engaging with abutment member 1354*b*. The enlarged view 1353 also shows a cable 1356 that connects the left retractable steering stop 1328*b* to the controller 110. The cable 1356 may be connected to a biasing member 1357 (e.g., a spring) that is configured to be urged into one of a biased position (e.g., as shown in FIG. 13G1 where spring 1357 is compressed) or an unbiased position by a force exerted from cable 1356 and controller 110. The biasing member 1357 may be configured to move to an unbiased position (e.g., as shown in FIG. 13G2 when spring 1357 is released) when the force exerted from cable 1356 and controller 110 ceases. In FIG. 13G1, left retractable steering stop 1328*b* is in a retracted position, such that the left retractable steering stop 1328*b* will not engage the left abutment member 1354*b* when the left wheel 103*a* moves to a maximum outward turn angle. The steering stop and/or abutment member may include an angled contact surface of 4°, 6°, 8° or 15°. The enlarged view 1353 also shows the abutment member 1354*b* having an angled contact surface at 4°. In one embodiment, the abutment member is coupled to one of the steering arm, axle beam, king pin bracket, or king pin collar and the steering stop is coupled to another of the steering arm, axle beam, king pin bracket, or king pin collar (or sleeve). For example, in FIG. 13G1, the abutment member 1354*b* is coupled to king pin sleeve 1317*b* and the left retractable steering stop 1328*b* is coupled to left steering arm 1324*b*. In one embodiment, the steering stop is configured to have a first position in which the inside wheel during a turn is prevented from turning beyond an intermediate maximum turn angle and/or a second position in which the inside wheel is permitted to extend beyond the intermediate maximum turn angle, but not beyond the maximum outward turn angle.

In one embodiment, the steering stop is configured to automatically enter an engageable position (e.g., a position in which an inside wheel is prevented from turning beyond the intermediate maximum turn angle) from a non-engageable position as the inside wheel moves from a maximum outward turn angle to an intermediate maximum turn angle. In one embodiment, the steering stop includes a release that prevents the steering stop from staying in a non-engageable position when the inside wheel transitions from a maximum outward turn angel to an intermediate maximum turn angle.

FIGS. 13G3-13G4 are enlarged views 1353 of the left steering stop 1328*b* in sub-positions of the engagement-ready position, specifically an engaged and engageable sub-position, respectively, according to at least some embodiments of the invention. FIG. 13G4 is an enlarged view 1353 of the left steering stop 1328*b* in an engageable sub-position, according to at least one embodiment of the invention. in FIG. 13G3, force exerted by the biasing member 1357 when the biasing member 137 is in the released position causes left steering stop 1328*b* to move toward left abutment member 1354*b*. Once left abutment member 1354*b* moves, because of movement of the wheel, for example, the left steering stop 1328*b* continues moving toward the area previously occupied by the left abutment member 1354*b* until the left steering stop 1328*b* is in the engaged sub-position shown in FIG. 13G4. In the engaged sub-position, left steering stop 1382*b* prevents the movement of the abutment member 1357 from one side to the other side of the left steering stop 1328*b*. In some embodiments, after the left steering stop 1328*b* has engaged the abutment member 1354*b*, the left steering stop 1328*b* may be commanded to move back into a retracted position to allow the abutment member 1357 to move freely. To reduce the friction caused by the movement of the left steering stop 138*b* while contacting the abutment member 1354*b*, the surfaces of the left steering stop 1328*b* and the abutment member 1357 that contact may have a hardening process applied to reduce friction. In some embodiments, to reduce friction, a bearing may be positioned on the surface of the left steering stop 1328b or the abutment member 1357.

Turn Radius Embodiments

FIGS. 14-18 are schematic representations of turning radii of vehicles operating in different drive modes and steering configurations according to some embodiments of the invention.

Figure 14:
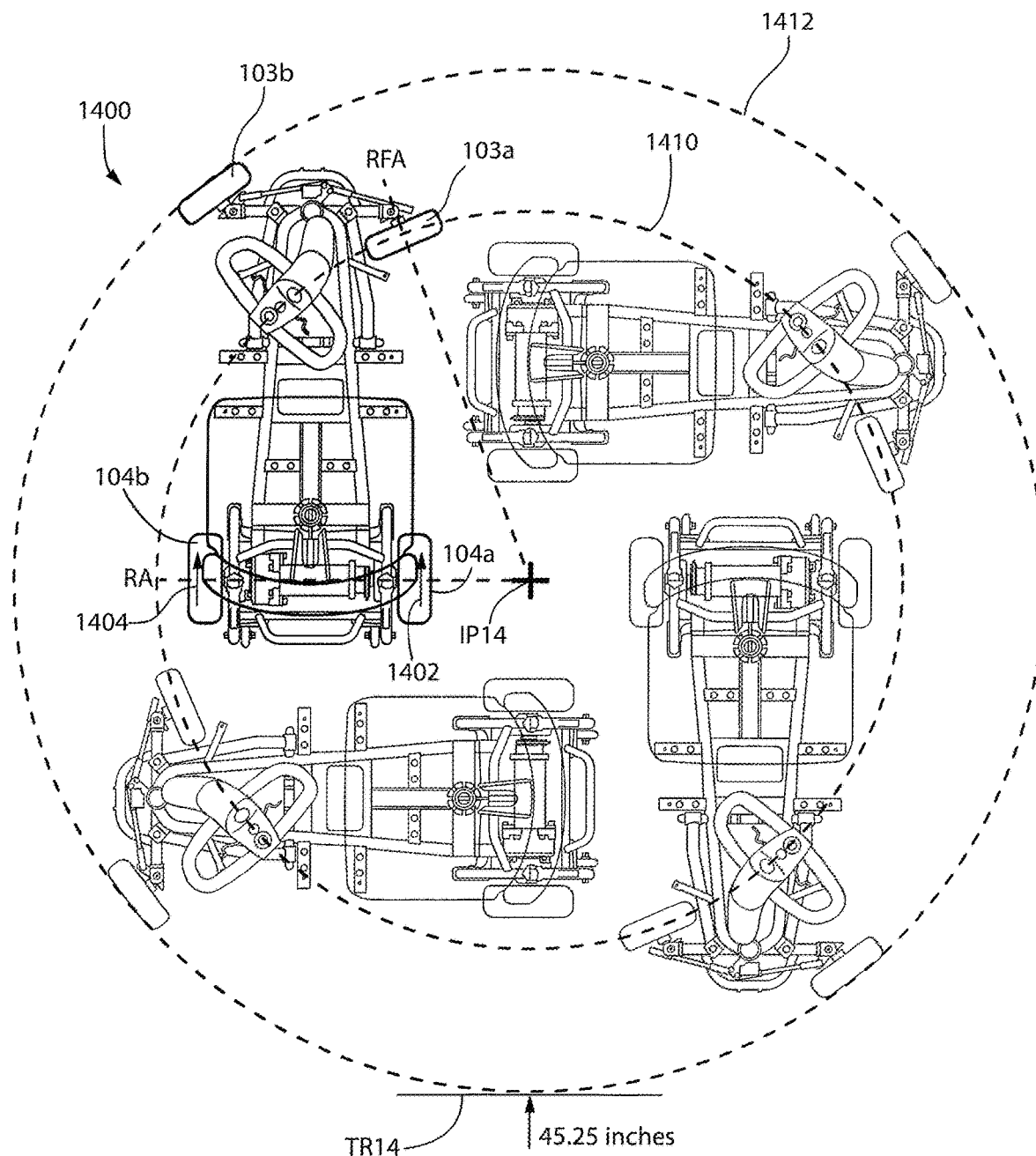
FIG. 14 is a schematic representation of a turn radius of a vehicle conducting a right turn while operating in a drive mode where the inner wheel is at a turn angle less than an intermediate outward turn angle, and the vehicle is not operating in major turn mode, according to some embodiments of the invention including, for example, one or more of the embodiments reflected in the foregoing figures.

FIG. 14 is a schematic representation of a turn radius of a vehicle 1400 conducting a right turn while operating in a drive mode where the inner wheel is at a turn angle less than an intermediate outward turn angle, and the vehicle 1400 not operating in major turn mode, according to some embodiments of the invention. In FIG. 14, the left front wheel 103b and the right front wheel 103a are in a right turn configuration, with the right front wheel 103a corresponding to the inner wheel. The right front wheel 103a is at an outward turn angle that is less than an intermediate maximum outward turn angle (e.g., less than 88°). The front right wheel 103a rotates about a right front wheel RFA14. The right and left drive wheels 104a-104b are being driven in a forward direction, as represented by arrows 1402 and 1404, respectively. While the vehicle 1400 is conducting a right turn, a projection of the right front wheel RFA14 and rear axis RA intersect at a vertical projection intersection point IP14. While the vehicle 1400 is conducting a right turn, the vehicle 1400 turns around vertical projection intersection point IP14. The right front wheel 103a may follow an arced path 1410. The left front wheel 103b may follow an arced path 1412. In some embodiments, a turn radius TR14 of vehicle 1400, measured as a distance from intersection point IP14 to an outside directional control wheel (e.g., left front wheel 103b), is approximately 45.25 inches.

Figure 15:
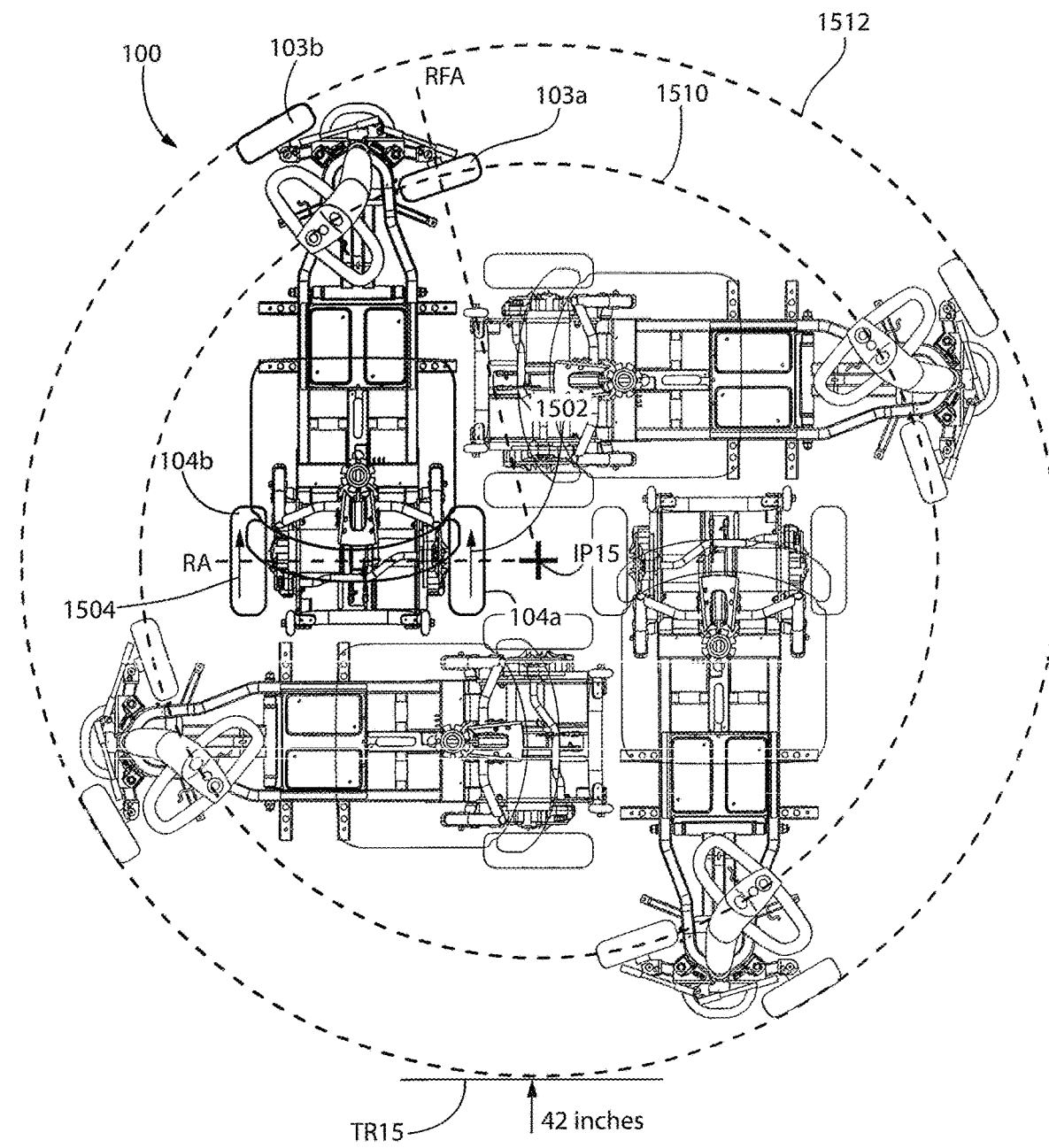
FIG. 15 is a schematic representation of a turn radius of the vehicle conducting a turn with the inner wheel at a maximum outward turn angle, and without operating in major turn mode according to some embodiments of the invention including, for example, one or more of the embodiments reflected in the foregoing figures.

FIG. 15 is a schematic representation of a turn radius of the vehicle 100 conducting a turn with the inner wheel at a maximum outward turn angle, and without operating in major turn mode according to some embodiments of the invention. In FIG. 15, the left front wheel 103b and the right front wheel 103a are in a right turn configuration, with the right front wheel 103a corresponding to the inner wheel. The right front wheel 103a is at an intermediate maximum outward turn angle (e.g., 88°). The front right wheel 103a rotates about a right front wheel RFA. The right and left drive wheels 104a-104b are being driven in a forward direction, as represented by arrows 1502 and 1504, respectively. While the vehicle 100 is conducting a right turn, a projection of the right front wheel RFA and rear axis RA intersect at a vertical projection intersection point IP15. While the vehicle 100 is conducting a right turn, the vehicle 100 turns around vertical projection intersection point IP15. The right front wheel 103a may follow an arced path 1510. The left front wheel 103b may follow an arced path 1512. In some embodiments, such as the embodiment shown in FIG. 15, a turn radius TR15 of vehicle 100, measured as a distance from intersection point IP15 to an outside directional control wheel (e.g., left front wheel 103b), is approximately 42 inches.

Figure 16:
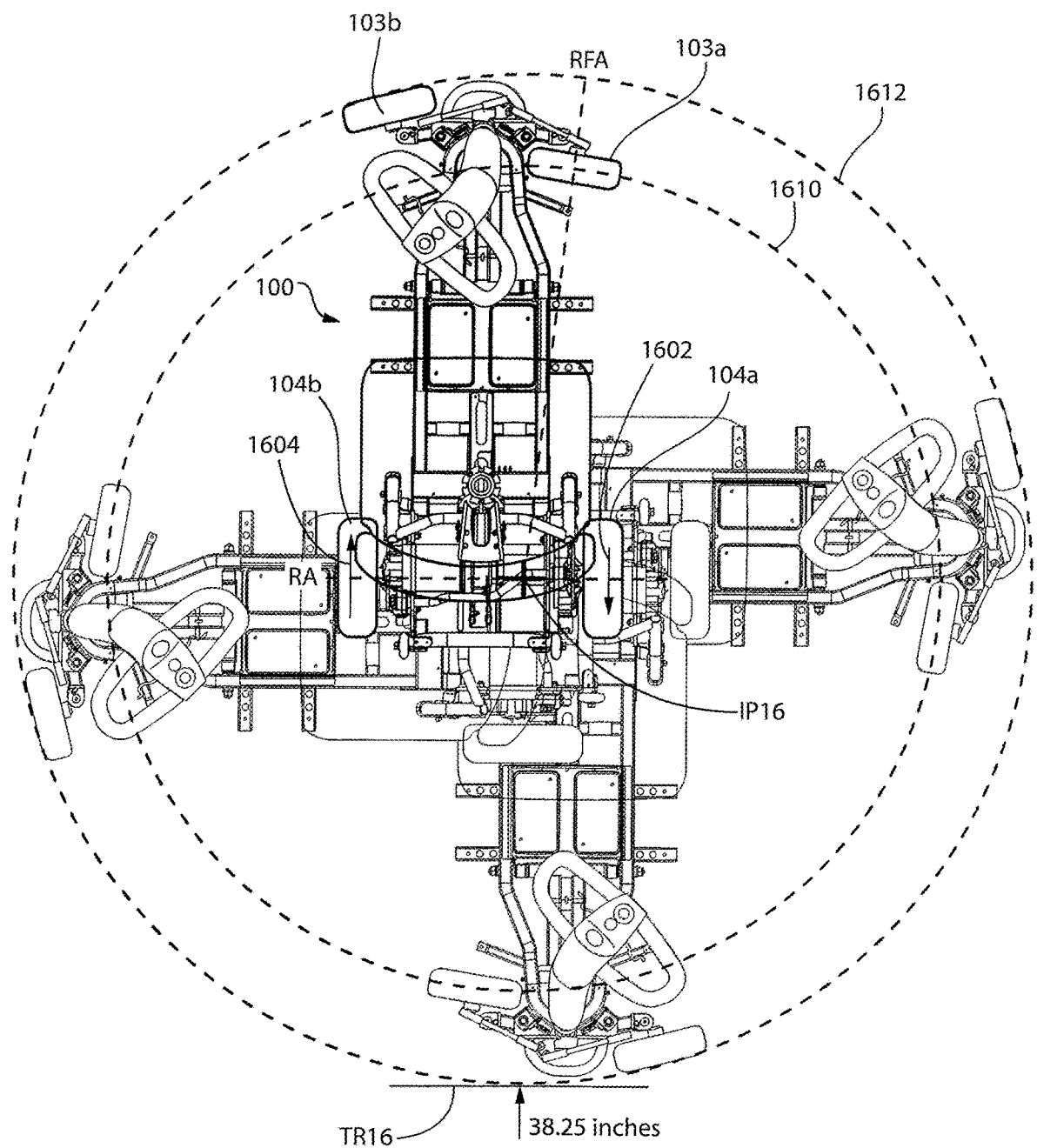
FIG. 16 is a schematic representation of a turn radius of the vehicle while operating in major turn mode, according to some embodiments of the invention including, for example, one or more of the embodiments reflected in the foregoing figures.

FIG. 16 is a schematic representation of a turn radius of the vehicle 100 while operating in major turn mode, according to some embodiments of the invention. The left front wheel 103b and the right front wheel 103a are in a right turn configuration, with the right front wheel 103a corresponding to the inner wheel. The right front wheel 103a is at a maximum outward turn angle (e.g., 91°). The front right wheel 103a rotates about a right front wheel RFA. The left drive wheel 104b is being driven in a forward direction, as represented by arrow 1604. The right drive wheel 104a is being driven in a reverse direction, as represented by arrow 1602. While the vehicle 100 is conducting a right turn, a projection of the right front wheel RFA and rear axis RA intersect at a vertical projection intersection point IP16. While the vehicle 100 is conducting a right turn, the vehicle 100 turns around vertical projection intersection point IP16. The right front wheel 103a may follow an arced path 1610. The left front wheel 103b may follow an arced path 1612. In some embodiments, such as the embodiment shown in FIG. 16, a turn radius TR16 of vehicle 100, measured as a distance from intersection point IP16 to an outside directional control wheel (e.g., left front wheel 103b), is approximately 38 inches (e.g., 38.25 inches).

Figure 17:
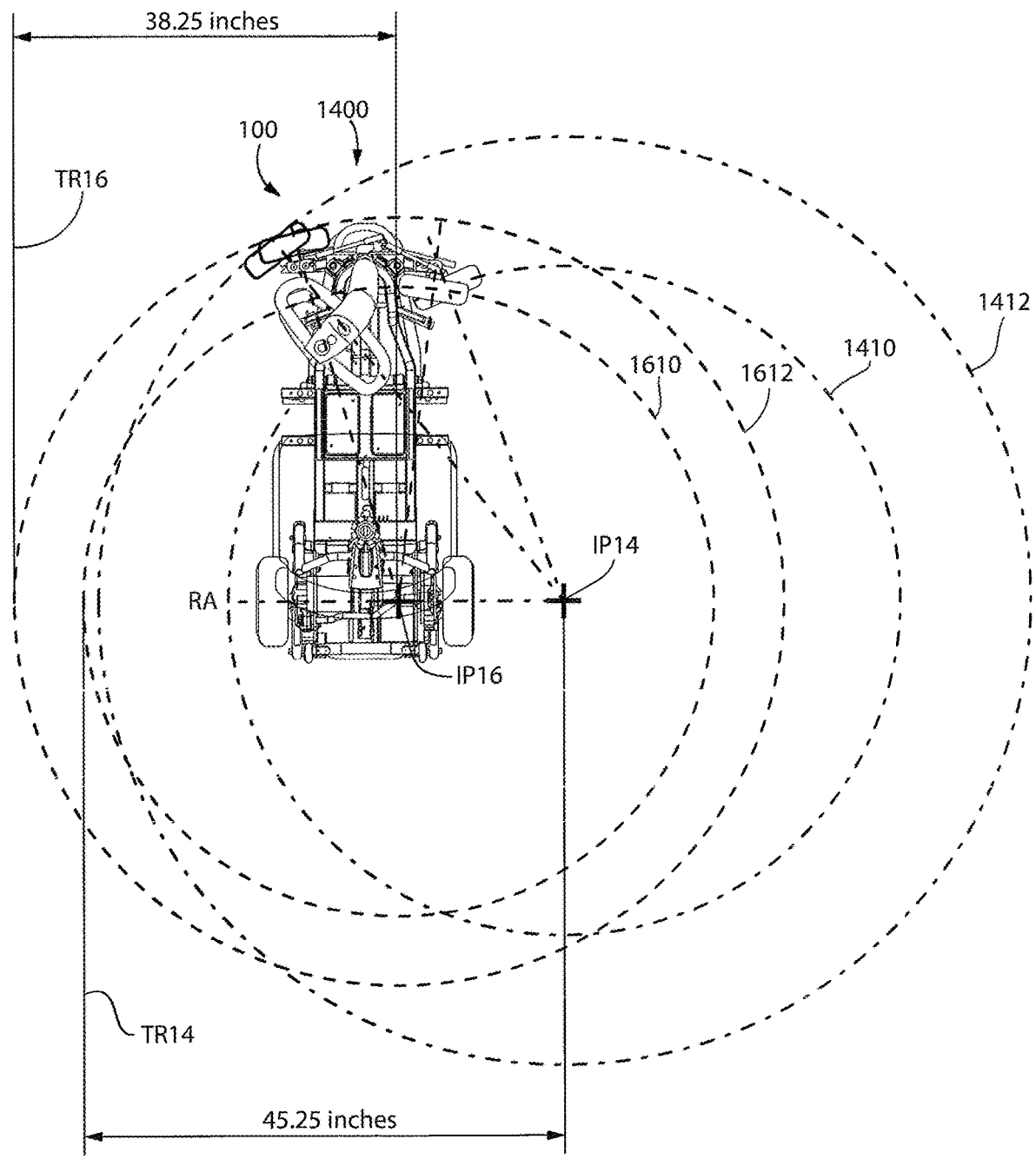
FIG. 17 is a schematic representation comparing the turn radius of the vehicle in FIG. 14 to the turn radius of the vehicle in FIG. 16 including, for example, one or more of the embodiments reflected in the foregoing figures.

FIG. 17 is a schematic representation comparing the turn radius of the vehicle 1400 in FIG. 14 to the turn radius of the vehicle 100 in FIG. 16. In FIG. 17, vehicle 1400 and vehicle 100 are shown as overlapping. The turn radius TR14 of vehicle 1400 is 44.75 inches while the turn radius TR16 of vehicle 100 is 38.25 inches.

Figure 18:
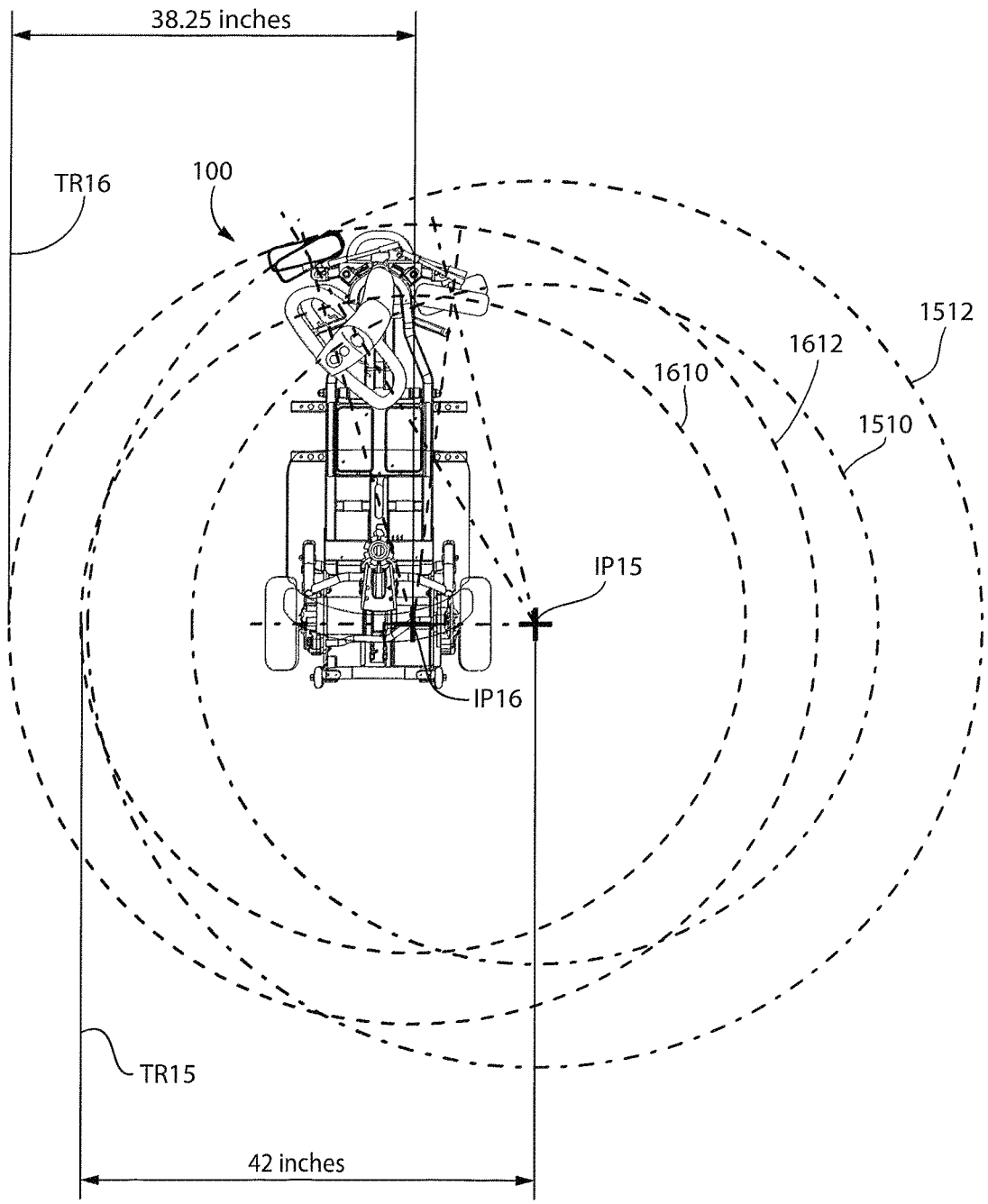
FIG. 18 is a schematic representation comparing the turn radius of the vehicle in FIG. 15 to the turn radius of the vehicle in FIG. 16 including, for example, one or more of the embodiments reflected in the foregoing figures.

FIG. 18 is a schematic representation comparing the turn radius of the vehicle 100 in FIG. 15 to the turn radius of the vehicle 100 in FIG. 16. In FIG. 18, the vehicles 100 are shown as overlapping. The turn radius TR15 of vehicle 100 shown in FIG. 15 is 42 inches while the turn radius TR16 of vehicle 100 shown in FIG. 16 is 38.25 inches.

Pivot Point Embodiments

Figure 19A:
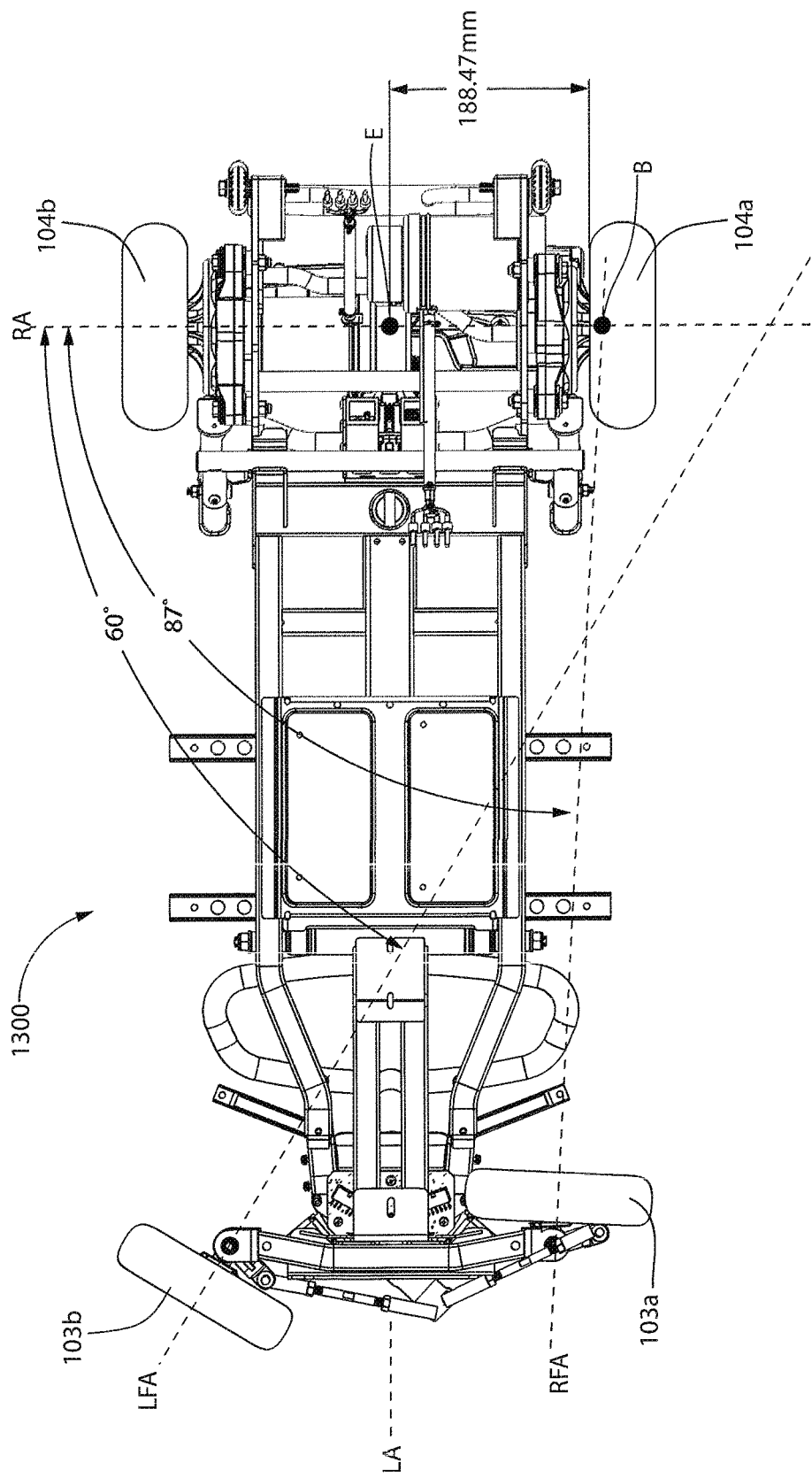
FIGS. 19A-19F illustrate a bottom view of a vehicle showing a relationship between a position of a pivot point of a vehicle during a major turn and different outward turn angles of the inside directional control wheel, in accordance with some embodiments of the invention including, for example, one or more of the embodiments reflected in the foregoing figures.
Figure 19B:
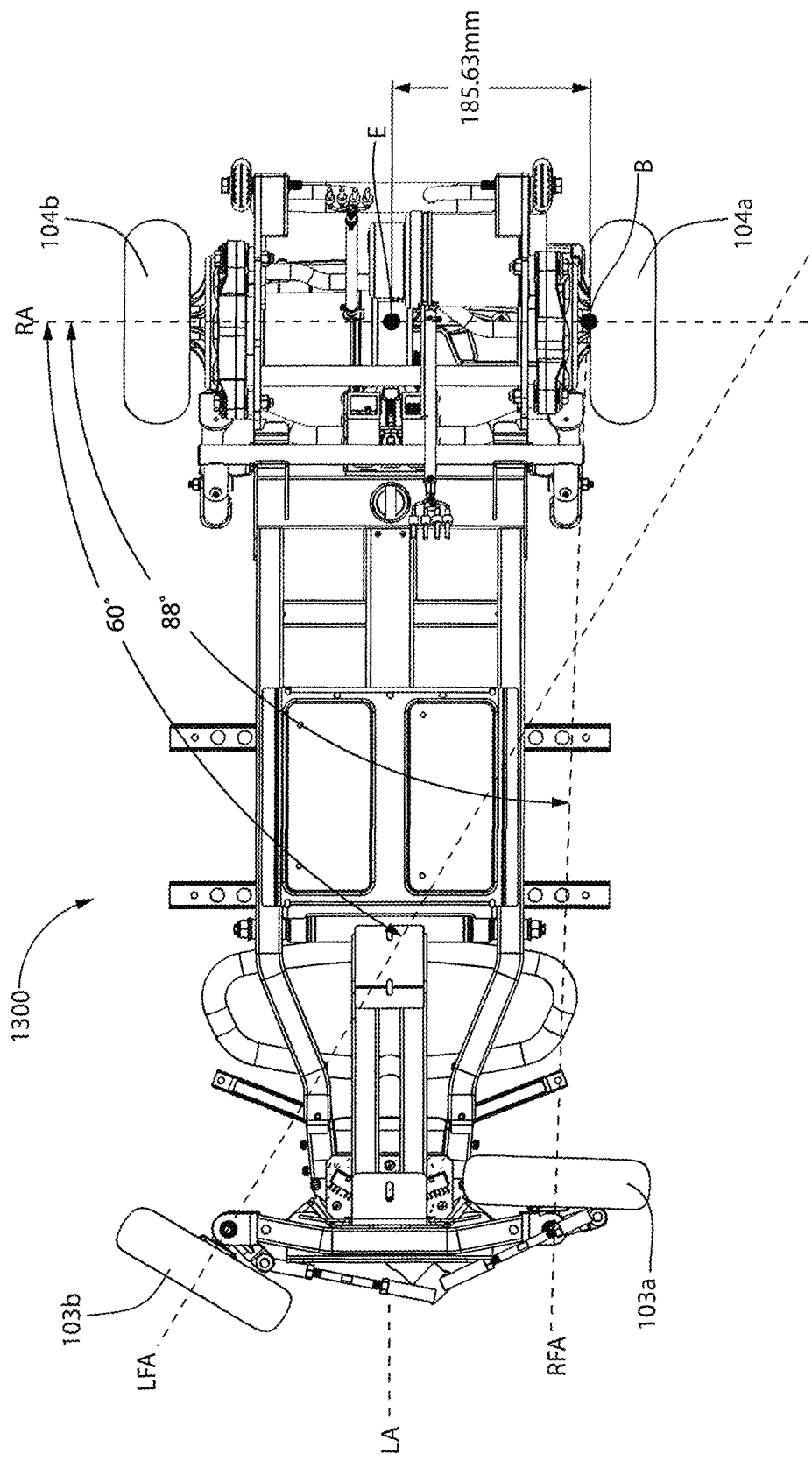
Figure 19C:
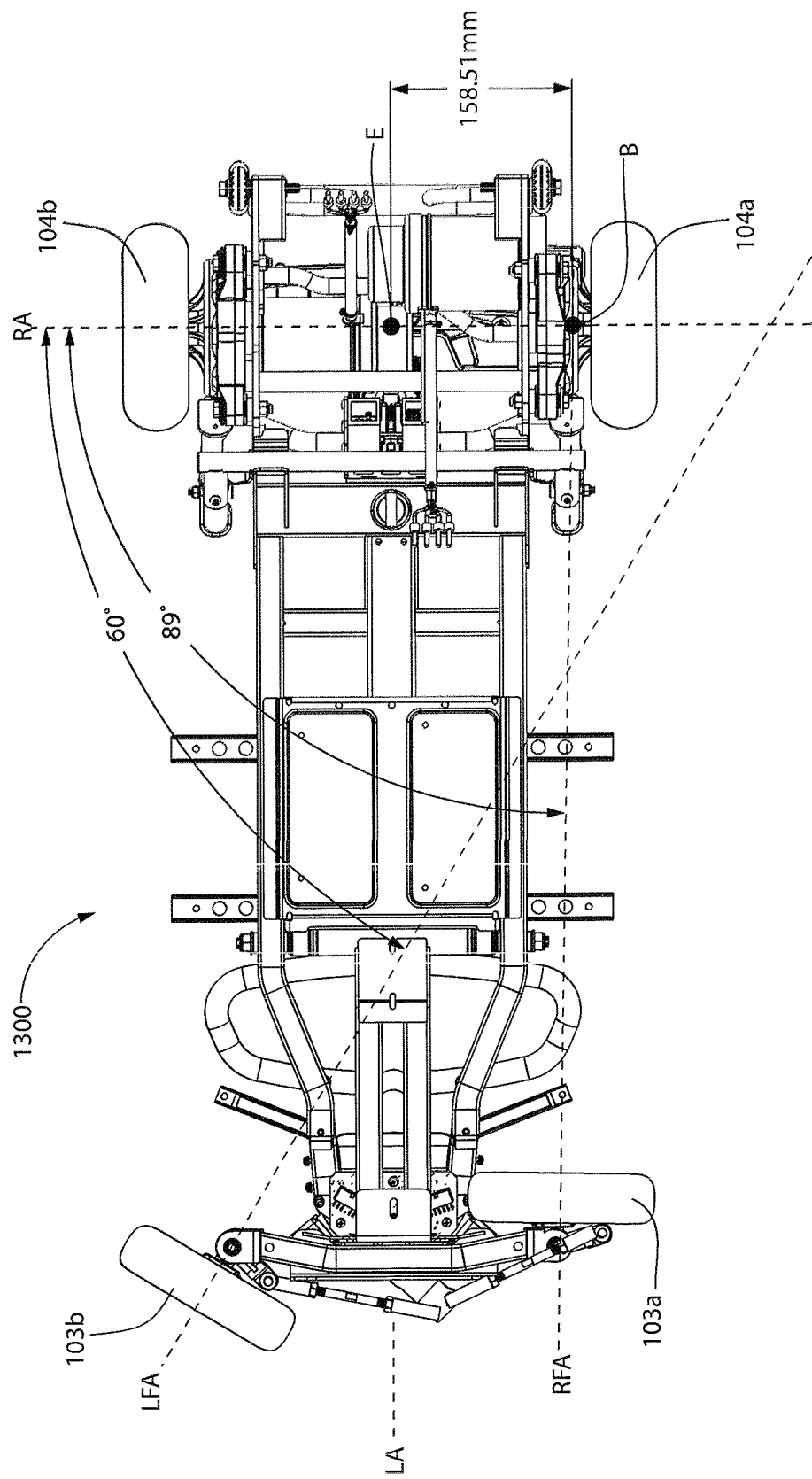
Figure 19D:
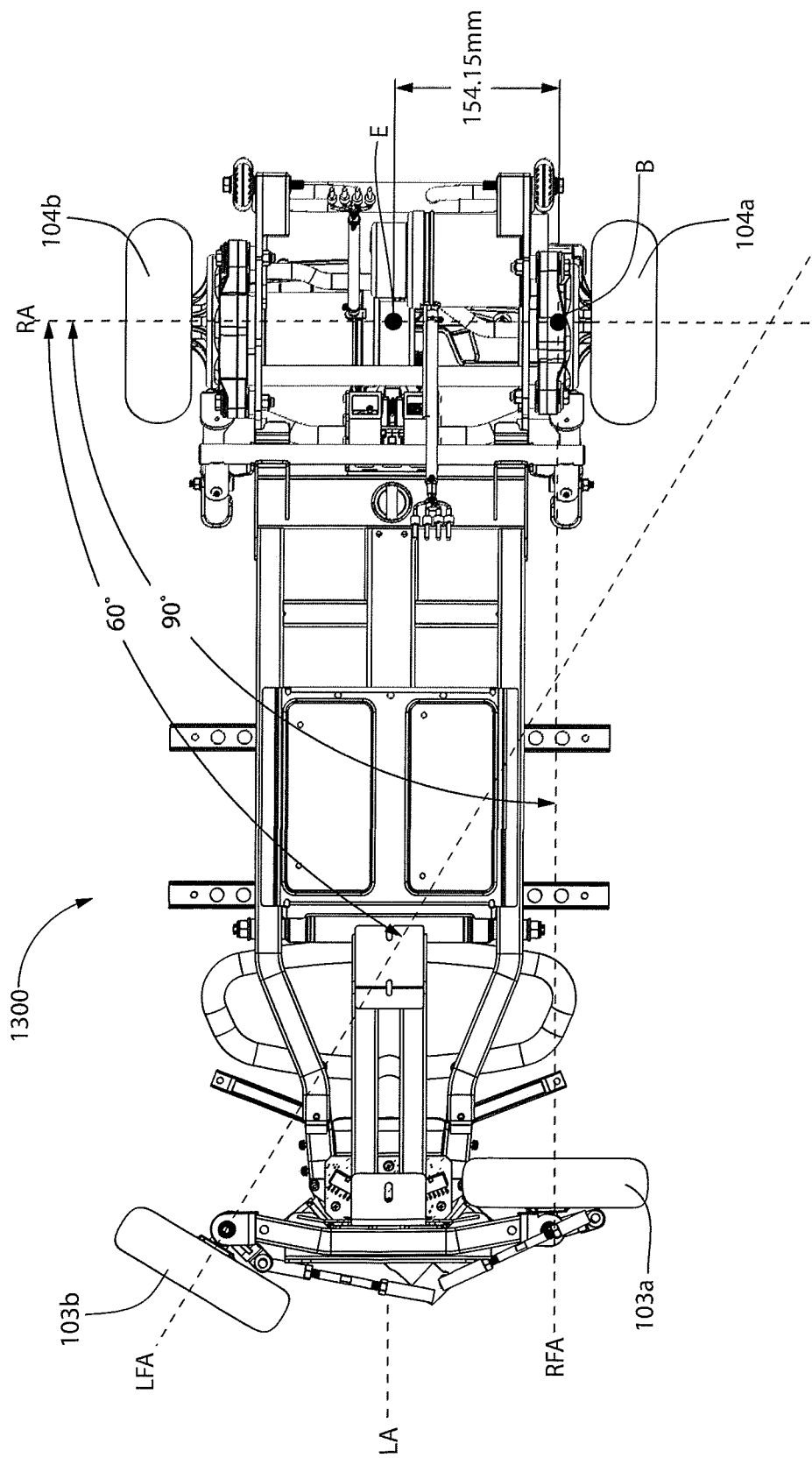
Figure 19E:
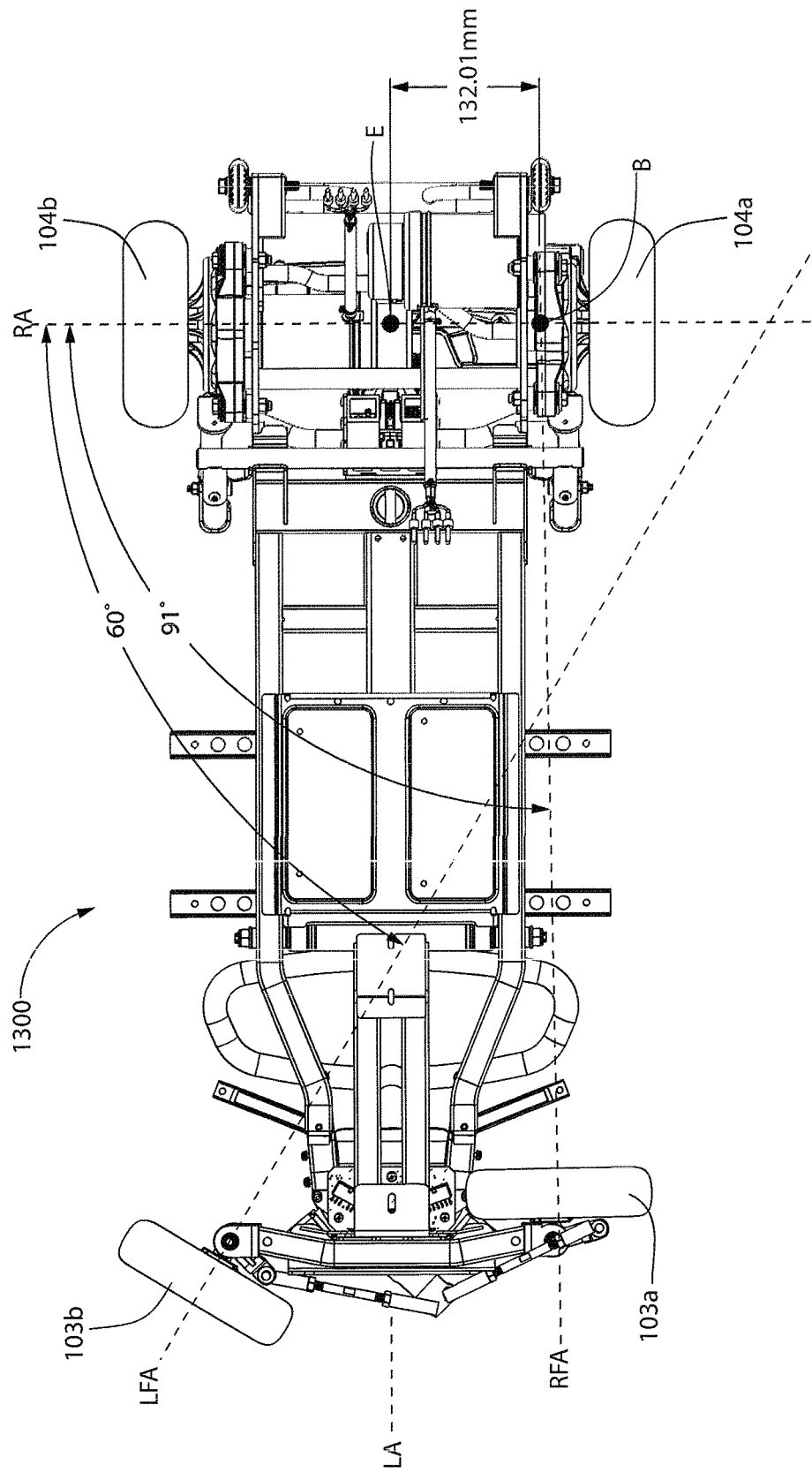
Figure 19F:
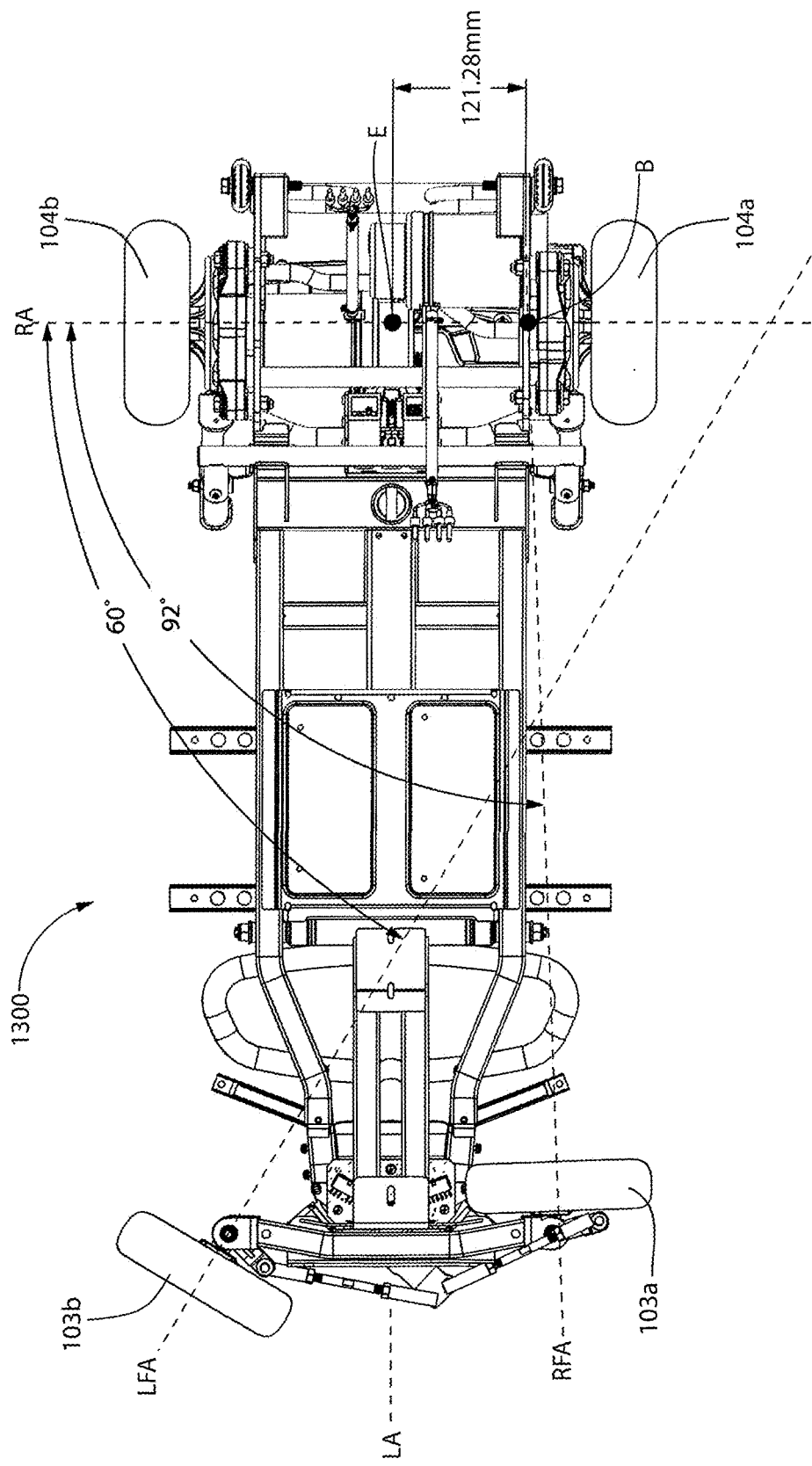

FIGS. 19A-19F illustrate a bottom view of vehicle 100 showing a relationship between a position of a pivot point of a vehicle during a major turn and different outward turn angles of the inside directional control wheel, in accordance with some embodiments of the invention. In some embodiments, the position of a pivot point of vehicle 100 during a major turn is based on the maximum outward turn angle of the inside directional control wheel. In some embodiments, as the maximum outward turn angle of the directional control wheel increases, a distance between the pivot point and the center point E decreases. In FIGS. 19A-19F, the vehicle 100 is making a right turn so right front wheel 103a corresponds to the inside directional control wheel and left front wheel 103b corresponds to the outside directional control wheel. In FIG. 19A, the right front wheel 103a is at a maximum outward turn angle of 87° and the distance between pivot point B and center point E is 188.47 mm (7.42 inches). In FIG. 19B, the right front wheel 103a is at a maximum outward turn angle of 88°, and the distance between pivot point B and center point E is 185.63 mm (7.3 inches). In FIG. 19C, the right front wheel 103a is at a maximum outward turn angle of 89°, and the distance between pivot point B and center point E is 158.51 mm (6.2 inches). In FIG. 19D, the right front wheel 103a is at a maximum outward turn angle of 90°, and the distance between pivot point B and center point E is 154.15 mm (6.0 inches). In FIG. 19E, the right front wheel 103a is at a maximum outward turn angle of 91°, and the distance between pivot point B and center point E is 132.01 mm (5.1 inches). In FIG. 19F, the right front wheel 103a is at a maximum outward turn angle of 91°, and the distance between pivot point B and center point E is 121.28 mm (4.7 inches).

Figure 20:
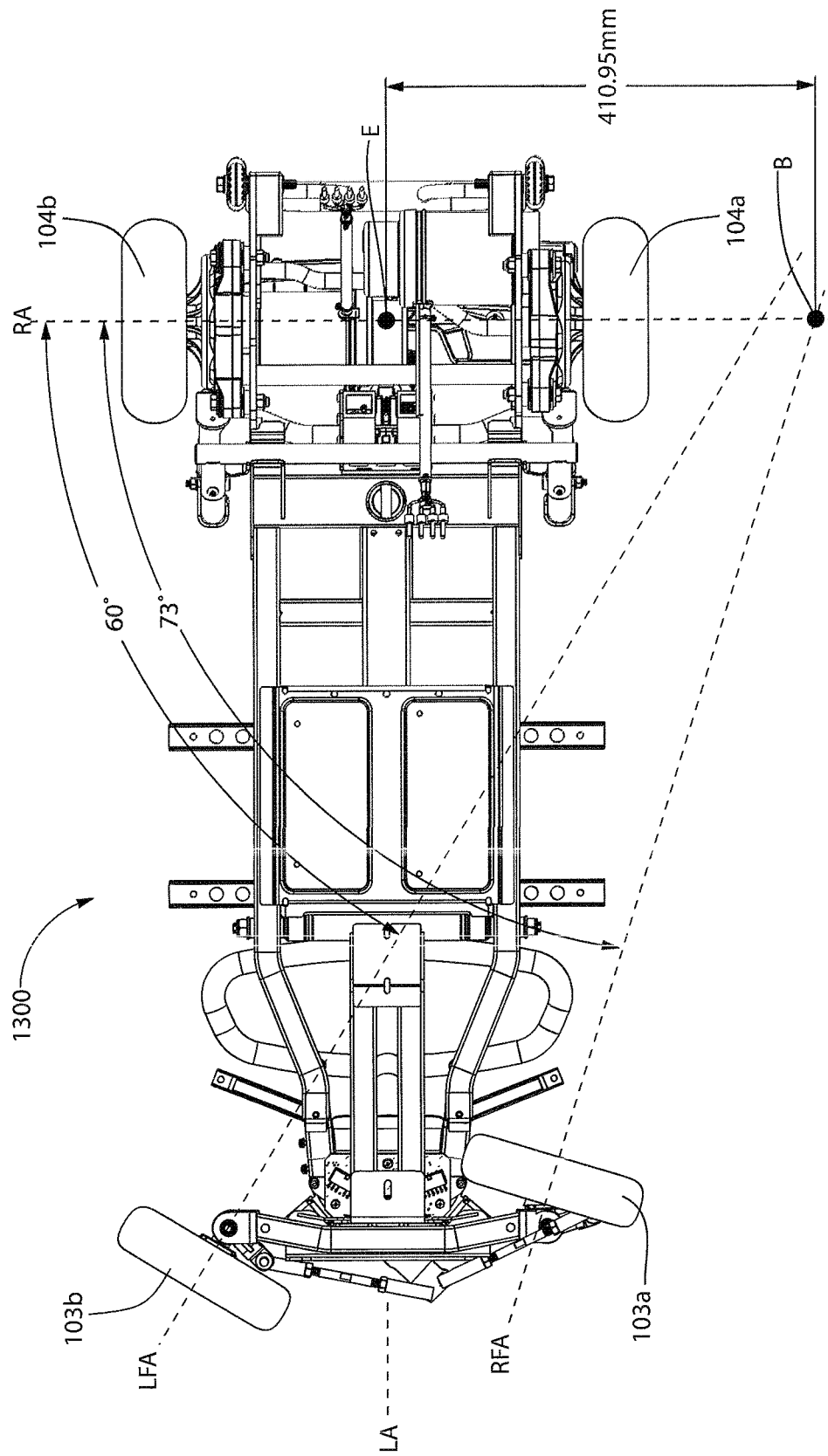
FIG. 20 is a bottom view of vehicle showing a relationship between a position of a pivot point of a vehicle and the intermediate outward turn angle of the inside wheel, in accordance with some embodiments of the invention including, for example, one or more of the embodiments reflected in the foregoing figures.

FIG. 20 illustrates a bottom view of vehicle 100 showing a relationship between a position of a pivot point of a vehicle and the intermediate outward turn angle of the inside wheel, in accordance with some embodiments of the invention. In FIG. 20, the vehicle 100 is making a right turn so right front wheel 103a corresponds to the inside directional control wheel and left front wheel 103b corresponds to the outside directional control wheel. The right front wheel 103a is at a maximum intermediate outward turn angle of 73° and the distance between pivot point B and center point E is 410.95 mm (1.6 inches).

Additional Embodiments

In at least one embodiment, there is included one or more computers having one or more processors and memory (e.g., one or more nonvolatile storage devices). In some embodiments, memory or computer readable storage medium of memory stores programs, modules and data structures, or a subset thereof for a processor to control and run the various systems and methods disclosed herein. In one embodiment, a non-transitory computer readable storage medium having stored thereon computer-executable instructions which, when executed by a processor, perform one or more of the methods disclosed herein.

It will be appreciated by those skilled in the art that changes could be made to the exemplary embodiments shown and described above without departing from the broad inventive concept thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention and features of the disclosed embodiments may be combined. The words "right", "left", "lower" and "upper" designate directions in the drawings to which reference is made. The words "inwardly" and "outwardly" refer to directions toward and away from, respectively, the geometric center of the vehicle 100 or any component of the vehicle 100. Unless specifically set forth herein, the terms "a", "an" and "the" are not limited to one element but instead should be read as meaning "at least one". As used herein, the term "about" or "approximately" may refer to + or −15% of the value referenced. For example, "about 9" is understood to encompass 7.6 and 10.4.

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Further, to the extent that the method does not rely on the particular order of steps set forth herein, the particular order of the steps should not be construed as limitation on the claims. The claims directed to the method of the present invention should not be limited to the performance of their steps in the order written, and one skilled in the art can readily appreciate that the steps may be varied and still remain within the spirit and scope of the present invention.

What is claimed is:

1. A mobility scooter comprising:
a frame having a longitudinal axis;
at least one drive wheel rotatable about a drive wheel axis; and
a steering assembly, coupled to the frame, that includes:
a steering stem;
a stem tab rotatable about the steering stem in response to input from a steering input;
a front inside wheel pivotable relative to the frame to a maximum outward turn angle,
a steering stop, and
a tie rod, pivotably coupled to the stem tab at a stem tab tie rod connection and pivotably coupled to the front inside wheel, the tie rod configured to move relative to the stem tab to pivot the front inside wheel relative to the frame in response to movement of the steering input,
wherein the steering stop is configured to control an extent of a cam over effect of the front inside wheel pivoted relative to the frame to the maximum outward turn angle.

2. The mobility scooter of claim 1, wherein the front inside wheel is configured to pivot to the maximum outward turn angle only in further response to a biasing force applied to the front inside wheel.

3. The mobility scooter of claim 2, wherein the front inside wheel is configured to achieve the maximum outward turn angle when the biasing force is applied to the front inside wheel independently of the movement of the steering input when the steering input has turned the front inside wheel to an intermediate outward turn angle.

4. The mobility scooter of claim 3, wherein the biasing force includes a force exerted by a ground surface.

5. The mobility scooter of claim 4, wherein the maximum outward turn angle differs from the intermediate outward turn angle by approximately 10°.

6. The mobility scooter of claim 2, wherein the mobility scooter is operable to turn about a first axis of rotation when the front inside wheel is turned to the maximum outward turn angle and to turn about a second axis of rotation, that is different from the first axis of rotation, when the front inside wheel is turned to an intermediate outward turn angle.

7. The mobility scooter of claim 1, wherein the at least one drive wheel comprises two drive wheels and includes a controller configured to simultaneously drive the two drive wheels in opposite directions when the front inside wheel is in the maximum outward turn angle.

8. The mobility scooter of claim 7, wherein the controller is further configured to power each of the two drive wheels at power levels of approximately the same magnitude and in different directions when the front inside wheel is in the maximum outward angle.

9. The mobility scooter of claim 8, wherein the two drive wheels are configured to operate at different angular velocities when the power levels are at a substantially identical magnitude and when the front inside wheel is in the maximum outward turn angle.

10. The mobility scooter of claim 9, wherein the controller is further configured to power the two drive wheels at a substantially identical magnitude and opposite polarities when the front inside wheel is in the maximum outward turn angle.

11. The mobility scooter of claim 10, wherein the controller is further configured to apply torque in opposite directions to each of the two drive wheels when the front inside wheel is in the maximum outward turn angle.

12. The mobility scooter of claim 11, wherein the controller is configured to apply a torque magnitude applied to one of the drive wheels that is different from a torque magnitude applied to the other of the drive wheels when the front inside wheel is in the maximum outward turn angle.

13. The mobility scooter of claim 7, wherein based on a detection of a turn condition, the controller is configured to cause one of the two drive wheels to operate at greater than 0 revolutions per minute and to cause the other of the two drive wheels to operate at 0 revolutions per minute.

14. The mobility scooter of claim 1, wherein the steering assembly further comprises an axle member pivotably mounted to the frame by a suspension member configured to allow the front inside wheel to translate relative to the frame.

15. The mobility scooter of claim 1, wherein the mobility scooter is operable to turn about an axis of rotation that is substantially aligned with the drive wheel axis when the front inside wheel is at the maximum outward turn angle.

16. The mobility scooter of claim 1, further comprising a controller that is configured to detect a rate of change signal of a position of the steering input and to cause the at least one drive wheel to operate based on the detected rate of change of the position of the steering input.

17. The mobility scooter of claim 16, wherein the controller is further configured to detect a throttle input signal and to cause the at least one drive wheel to operate based on the detected rate of change of the position of the steering input and the detected throttle input.

18. The mobility scooter of claim 17, further comprising a tilt sensor wherein the controller is further configured to receive a tilt signal from the tilt sensor and to restrict operation of the mobility scooter based on the tilt signal.

19. The mobility scooter of claim 14, wherein the front inside wheel is translatable relative to the frame by a magnitude of from 0.25 inches to 1 inch.

20. The mobility scooter of claim 1, further comprising at least one turn sensor and a controller configured to receive a turn signal from the turn sensor that indicates the mobility scooter is being commanded to operate in a major turn mode and wherein the controller is configured to restrict operation of the mobility scooter based on the received turn signal.

21. The mobility scooter of claim 1, wherein the steering assembly further comprises a steering arm extending from and rotatable about a kingpin axis, the steering arm pivotably coupled to the tie rod at a steering arm tie rod connection spaced apart from the kingpin axis.

22. The mobility scooter of claim 21, wherein a first distance measured from the steering arm tie rod connection to the kingpin axis is less than a second distance measured from the stem tab tie rod connection to the steering stem.

23. The mobility scooter of claim 22, wherein a ratio between the first distance and the second distance is greater than 1:1.

24. The mobility scooter of claim 21, wherein the stem tab tie rod connection is positioned forward of the steering arm tie rod connection relative to the frame along the longitudinal axis.

* * * * *